US010986310B2

(12) United States Patent
Koike et al.

(10) Patent No.: US 10,986,310 B2
(45) Date of Patent: Apr. 20, 2021

(54) INFORMATION PROCESSING APPARATUS, INFORMATION PROCESSING METHOD, AND PROGRAM

(71) Applicant: SONY CORPORATION, Tokyo (JP)

(72) Inventors: Ryusei Koike, Kanagawa (JP); Atsushi Izumihara, Kanagawa (JP); Koji Furusawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/762,308

(22) PCT Filed: Aug. 27, 2018

(86) PCT No.: PCT/JP2018/031552
§ 371 (c)(1),
(2) Date: May 7, 2020

(87) PCT Pub. No.: WO2019/097802
PCT Pub. Date: May 23, 2019

(65) Prior Publication Data
US 2020/0275055 A1   Aug. 27, 2020

(30) Foreign Application Priority Data
Nov. 14, 2017   (JP) .............................. JP2017-219062

(51) Int. Cl.
H04N 7/14   (2006.01)
H04N 5/445   (2011.01)

(52) U.S. Cl.
CPC ......... H04N 7/147 (2013.01); H04N 5/44504 (2013.01)

(58) Field of Classification Search
CPC ............. H04N 7/14; H04N 5/545; H04N 7/15
(Continued)

(56) References Cited

U.S. PATENT DOCUMENTS

2018/0332254 A1* 11/2018 Sakai ..................... G06F 3/011

FOREIGN PATENT DOCUMENTS

| JP | 2001-313915 A | 11/2001 |
| JP | 2001313915 A | * 11/2001 |
| WO | WO 2017/098780 A1 | 6/2017 |

OTHER PUBLICATIONS

Aug. 20, 2008, pp. 51-54, (Kaji et al . , Applications for t—Room based on s hared virtual space and playback of recorded activities, FIT 2008 : Seventh Forum on Information Technology 2008) , nonofficial transla ti on (Fourth volüme . Papers with refereed/ general papers . Network security, ubiquito.*

(Continued)

*Primary Examiner* — Melur Ramakrishnaiah
(74) *Attorney, Agent, or Firm* — Paratus Law Group, PLLC

(57) ABSTRACT

There is provided an information processing apparatus, an information processing method, and a program capable of looking back on the past two-way communication while maintaining connection between spaces in real time. The information processing apparatus controls two-way communication between a first space and a second space, and includes: a control unit that performs control to display first image information and second image information in the first space and performs control to display third image information and fourth image information in the second space, in which the first image information is current image information regarding the second space, the second image information is past image information regarding the second space, the third image information is current image information regarding the first space, and the fourth image information is past image information regarding the first space in the same time zone as that of the second image information.

13 Claims, 35 Drawing Sheets

(58) Field of Classification Search
USPC .......................................... 348/14.01–14.16
See application file for complete search history.

(56) References Cited

OTHER PUBLICATIONS

Katsuhiko Kaji et al., Applications for t-Room Based on Shared Virtual Space and Playback of Recorded Activities, 2008 Forum on Information Technology, Sep. 2-7, 2008, pp. 1-6.

* cited by examiner

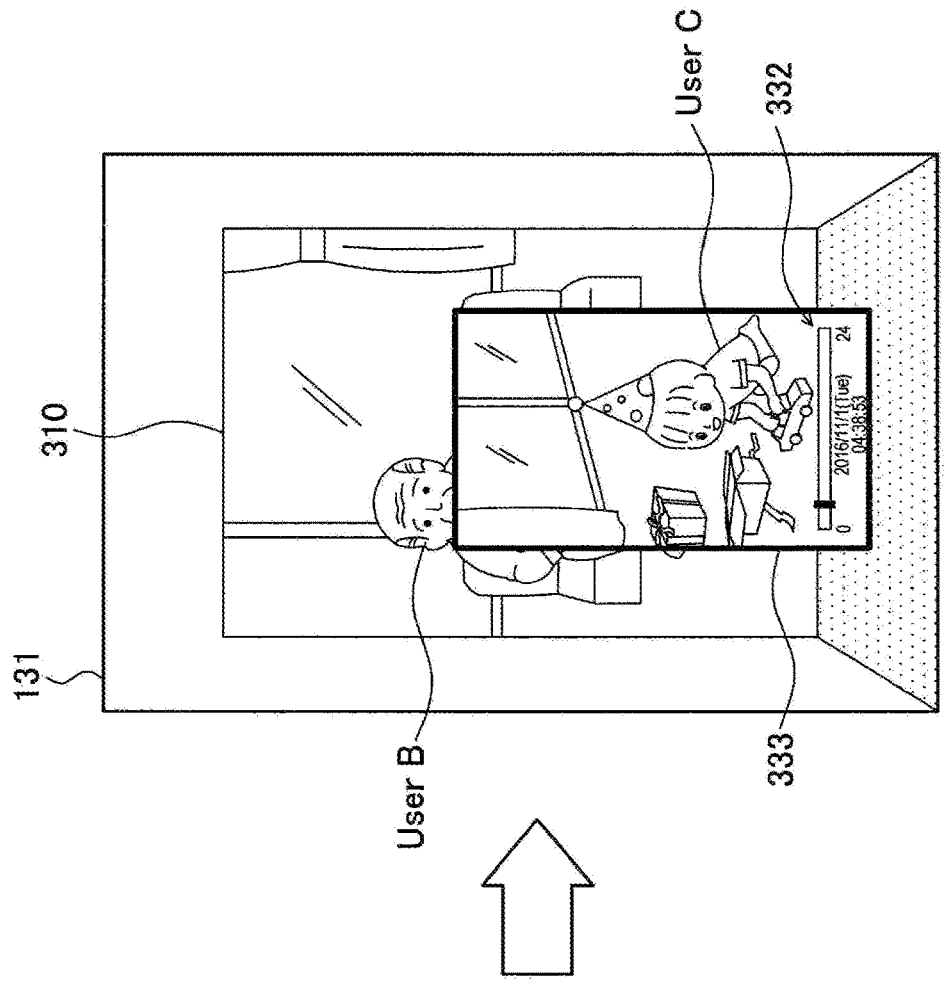
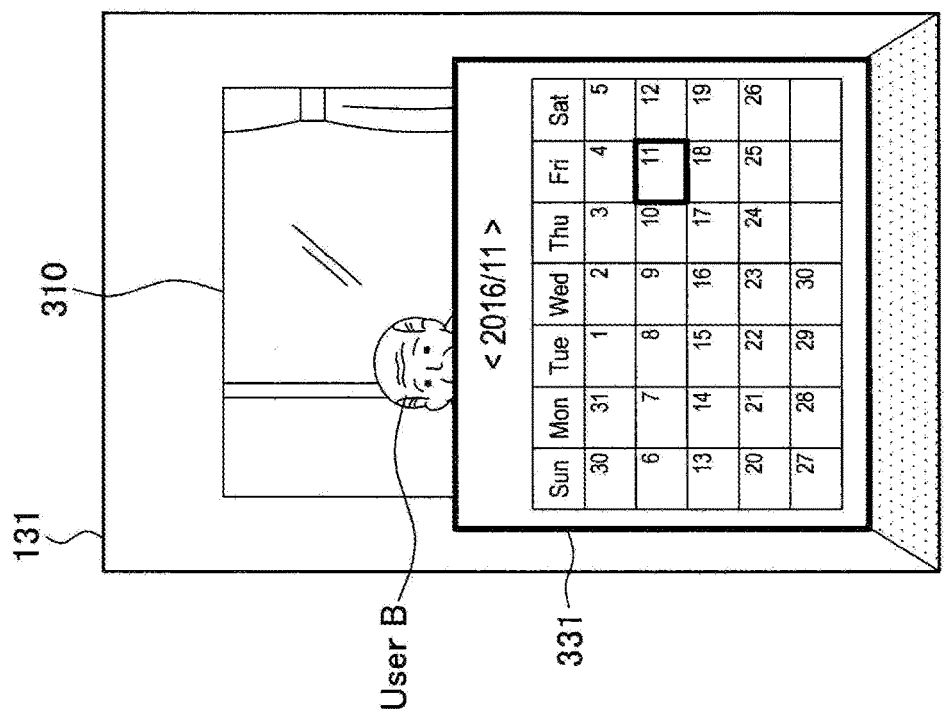

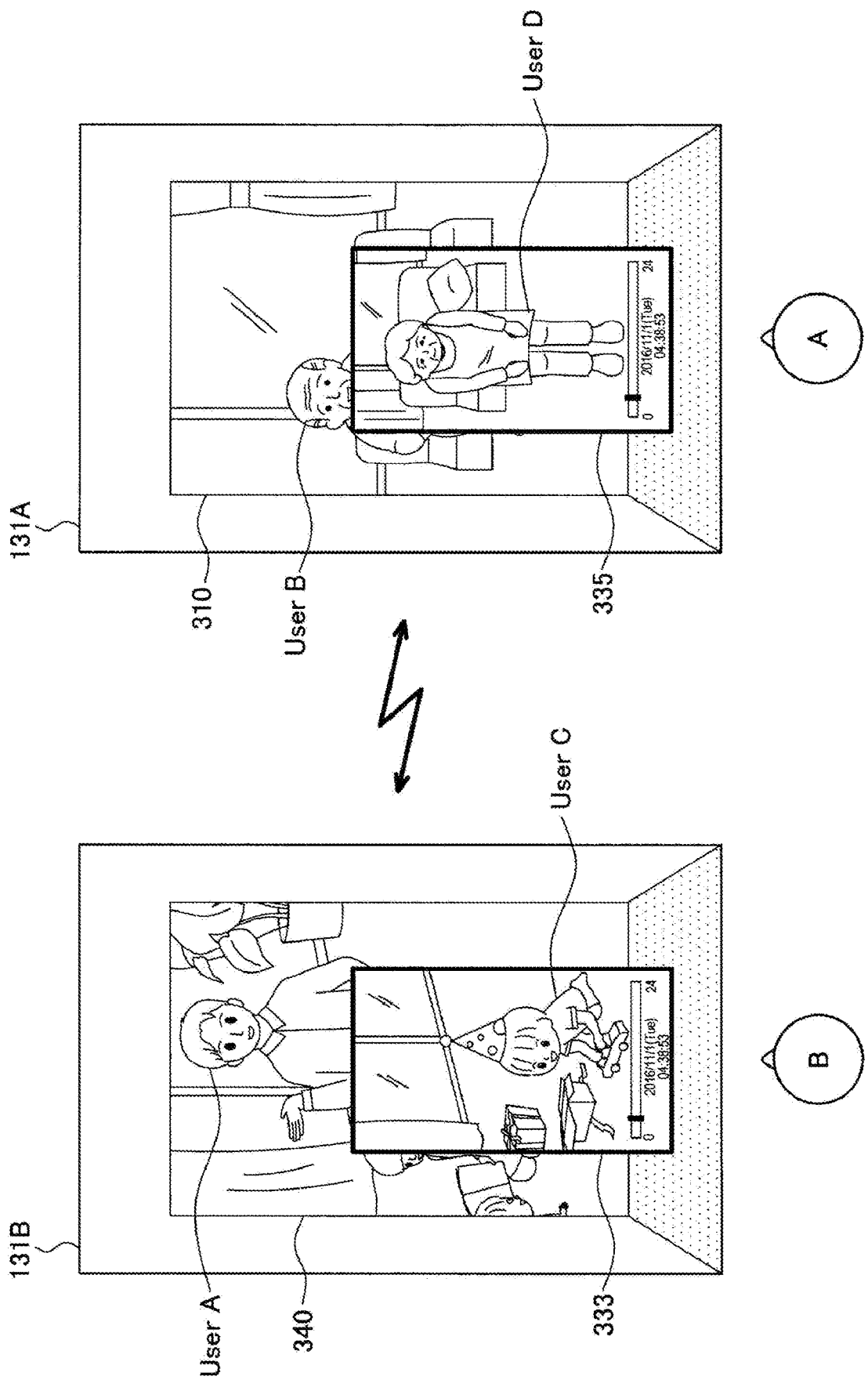

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/031552 (filed on Aug. 27, 2018) under 35 U.S.C. § 371, which claims priority to Japanese Patent Application No. 2017-219062 (filed on Nov. 14, 2017), which are all hereby incorporated by reference in their entirety.

FIELD

The present disclosure relates to an information processing apparatus, an information processing method, and a program.

BACKGROUND

With the development of information processing technology in recent years, various information processing systems that support an operation of various types of meetings such as a conference, a seminar, a lecture meeting, or the like, performed in a company or an educational place have been proposed.

For example, a remote conference system is an example of a conference support system. In the remote conference system, display apparatuses, cameras, microphones, and speakers are installed in a plurality of conference rooms located remotely, and a video and an audio acquired in each conference room are transmitted to other conference rooms and output in real time, such that it becomes possible to simultaneously advance a conference between the plurality of conference rooms located remotely.

Further, from the viewpoint of sharing of contents in real time by a plurality of persons who are at different places, for example, Patent Document 1 discloses a content sharing system in which a plurality of users can view the same content in real time and also share a scroll or a mouse cursor with each other in real time. With such a system, it is possible to realize communication in which the plurality of users chat about a topical web page.

Further, Patent Document 2 discloses a content processing system capable of reproducing a state of a meeting together with an actually used material image by associating a moving image obtained by capturing the state of the meeting and a presentation material image referred to in the meeting with each other while synchronizing the moving image and the presentation material image with each other on a time axis. With such a system, a viewer can view a video and a material screen while comparing the video and the material screen in the same time zone with each other.

CITATION LIST

Patent Literature

Patent Literature 1: Japanese Patent No. 5857443
Patent Literature 2: JP 2005-260512 A

SUMMARY

Technical Problem

However, the remote conference system described above or the content sharing system described in Patent Document 1 is technology for sharing a phenomenon occurring in real time, such as viewing the same content in real time or seeing states of each other's conference rooms, and did not share the past phenomenon.

Further, in Patent Document 2, it is possible to view a video of the past meeting and the material screen in the same time zone, but reproduction of two-way communication is not mentioned. In particular, it was not considered to reproduce the past two-way communication while maintaining current connection between a plurality of spaces.

Therefore, the present disclosure proposes an information processing apparatus, an information processing method, and a program capable of looking back on the past two-way communication while maintaining connection between spaces in real time.

Solution to Problem

According to the present disclosure, there is provided an information processing apparatus that controls two-way communication between a first space and a second space, including: a control unit that performs control to display first image information and second image information in the first space and performs control to display third image information and fourth image information in the second space, in which the first image information is current image information regarding the second space, the second image information is past image information regarding the second space, the third image information is current image information regarding the first space, and the fourth image information is past image information regarding the first space in the same time zone as that of the second image information.

According to the present disclosure, there is provided an information processing apparatus in which control of two-way communication between a first space and a second space is performed, including: a control unit that performs control to display first image information and second image information in the first space, in which the first image information is current image information regarding the second space, and the second image information is past image information regarding the second space and is image information of the same time zone as that of past image information regarding the first space displayed in the second space.

According to the present disclosure, there is provided an information processing method that controls two-way communication between a first space and a second space, including: performing control to display first image information and second image information in the first space and performing control to display third image information and fourth image information in the second space, by a processor, in which the first image information is current image information regarding the second space, the second image information is past image information regarding the second space, the third image information is current image information regarding the first space, and the fourth image information is past image information regarding the first space in the same time zone as that of the second image information.

According to the present disclosure, there is provided a program that causes a computer to function as an information processing apparatus that controls two-way communication between a first space and a second space, in which the program causes the computer to further function as a control unit that performs control to display first image information and second image information in the first space and performs control to display third image information and fourth image information in the second space, the first image information being current image information regarding the second space, the second image information being past image information regarding the second space, the third image information being current image information regarding the first space, and the fourth image information being past image information regarding the first space in the same time zone as that of the second image information.

According to the present disclosure, there is provided an information processing method in which control of two-way communication between a first space and a second space is performed, including: performing control to display first image information and second image information in the first space, by a processor, in which the first image information is current image information regarding the second space, and the second image information is past image information regarding the second space and is image information of the same time zone as that of past image information regarding the first space displayed in the second space.

According to the present disclosure, there is provided a program that causes a computer to function as an information processing apparatus in which control of two-way communication between a first space and a second space is performed and causes the computer to further function as a control unit that performs control to display first image information and second image information in the first space, in which the first image information is current image information regarding the second space, and the second image information is past image information regarding the second space and is image information of the same time zone as that of past image information regarding the first space displayed in the second space.

Advantageous Effects of Invention

As described above, according to the embodiment of the present disclosure, it is possible to look back on the past two-way communication while maintaining connection between spaces in real time.

Note that the effect described above is not necessarily restrictive, and any effect set forth in the present specification or other effects that can be grasped from the present specification may be accomplished together with or instead of the effect described above.

BRIEF DESCRIPTION OF DRAWINGS

FIG. 6 is a diagram illustrating an example of a method of selecting the past video in a case where a recollection function according to the present embodiment is selected.

FIG. 7 is an example of each displaying the past videos that have been seen from each other bidirectionally in each space using the recollection function according to the present embodiment.

DESCRIPTION OF EMBODIMENTS

Figure 1:
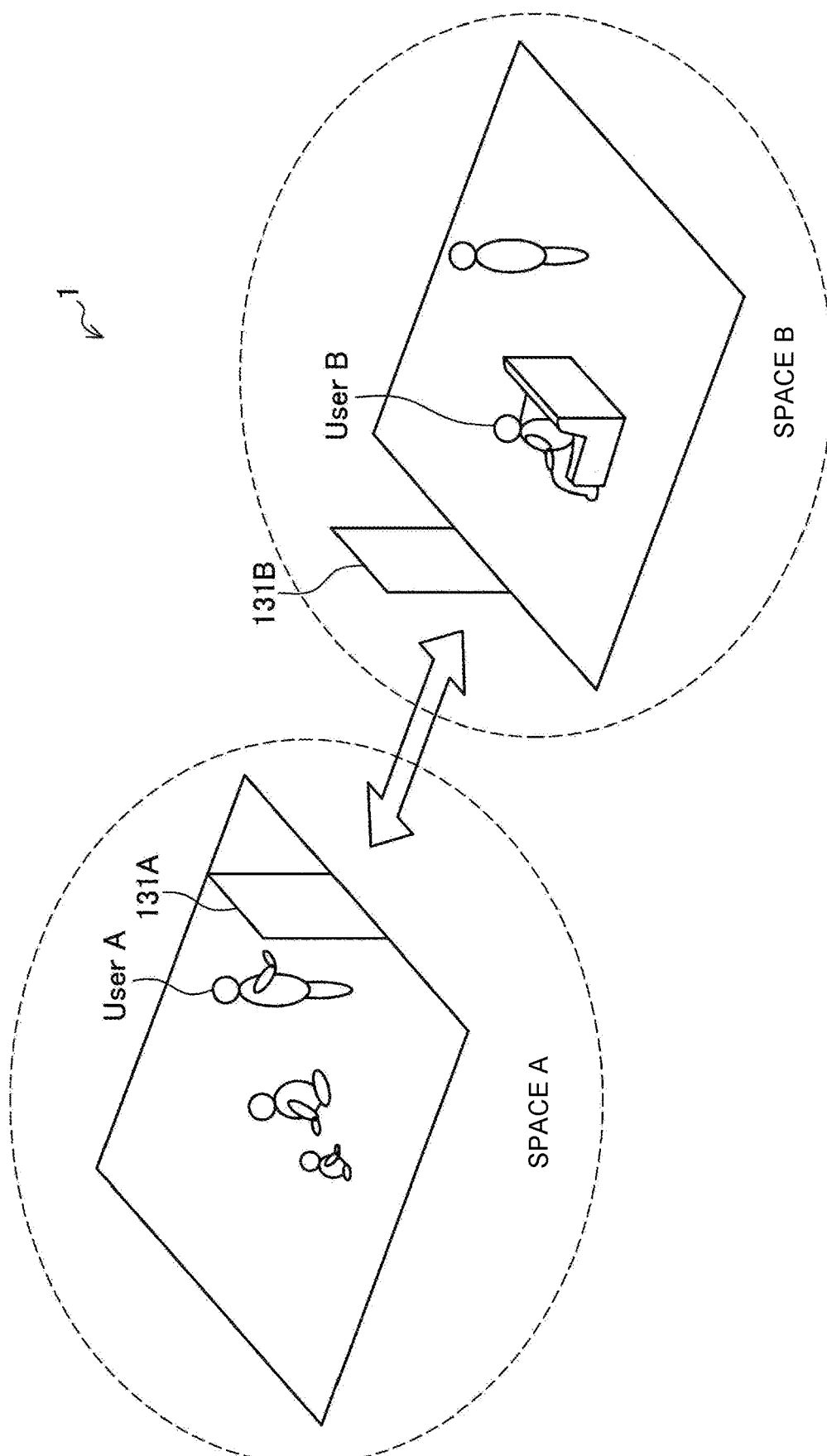
FIG. 1 is a diagram for describing an overview of an information processing system according to an embodiment of the present disclosure.

Hereinafter, preferred embodiments of the present disclosure will be described in detail with reference to the accompanying drawings. Note that, in the present specification and the drawings, components having substantially the same functional configuration will be denoted by the same reference numerals and an overlapping description will be omitted.

Further, a description will be given in the following order.
1. Overview of information processing system according to an embodiment of the present disclosure
2. Configuration
2-1. Configuration of information processing apparatus 10
2-2. Configuration of server 20
3. Operation processing
3-1. Operation processing of information processing apparatus 10A regarding execution of recollection function
3-2. Operation processing of server 20 regarding execution of recollection function
4. Another system configuration example
4-1. First embodiment
4-2. Second embodiment
4-3. Third embodiment
4-4. Fourth embodiment
5. Hardware configuration
6. Summary

1. Overview of Information Processing System According to an Embodiment of the Present Disclosure FIG. 1 is a diagram for describing an overview of an information processing system according to an embodiment of the present disclosure. As illustrated in FIG. 1, an information processing system 1 according to the present embodiment is a space adjacent telepresence system that connects spaces (for example, space A and space B) located at distant places to each other by a video, an audio, or other information channels.

Specifically, for example, when space information (videos and audios) is obtained by cameras and microphones (not illustrated) installed, respectively, in space A and space B, the space information is transmitted to a space of a counterpart side in real time, and is output from a display 131 and a speaker (not illustrated) installed on, for example, a wall of a living room, a dining room or the like of the counterpart space. The display 131 is a virtual window (or a door or an entrance) connected to the counterpart space and a state of the space of the counterpart side can be seen from the virtual window. Therefore, a user can feel as if the space of the counterpart side is the immediately next room to feel as if he/she is at the same place as a place where a counterpart user is. Here, a state of communication using the information processing system according to the present embodiment will be described with reference to FIG. 2.

Figure 2:
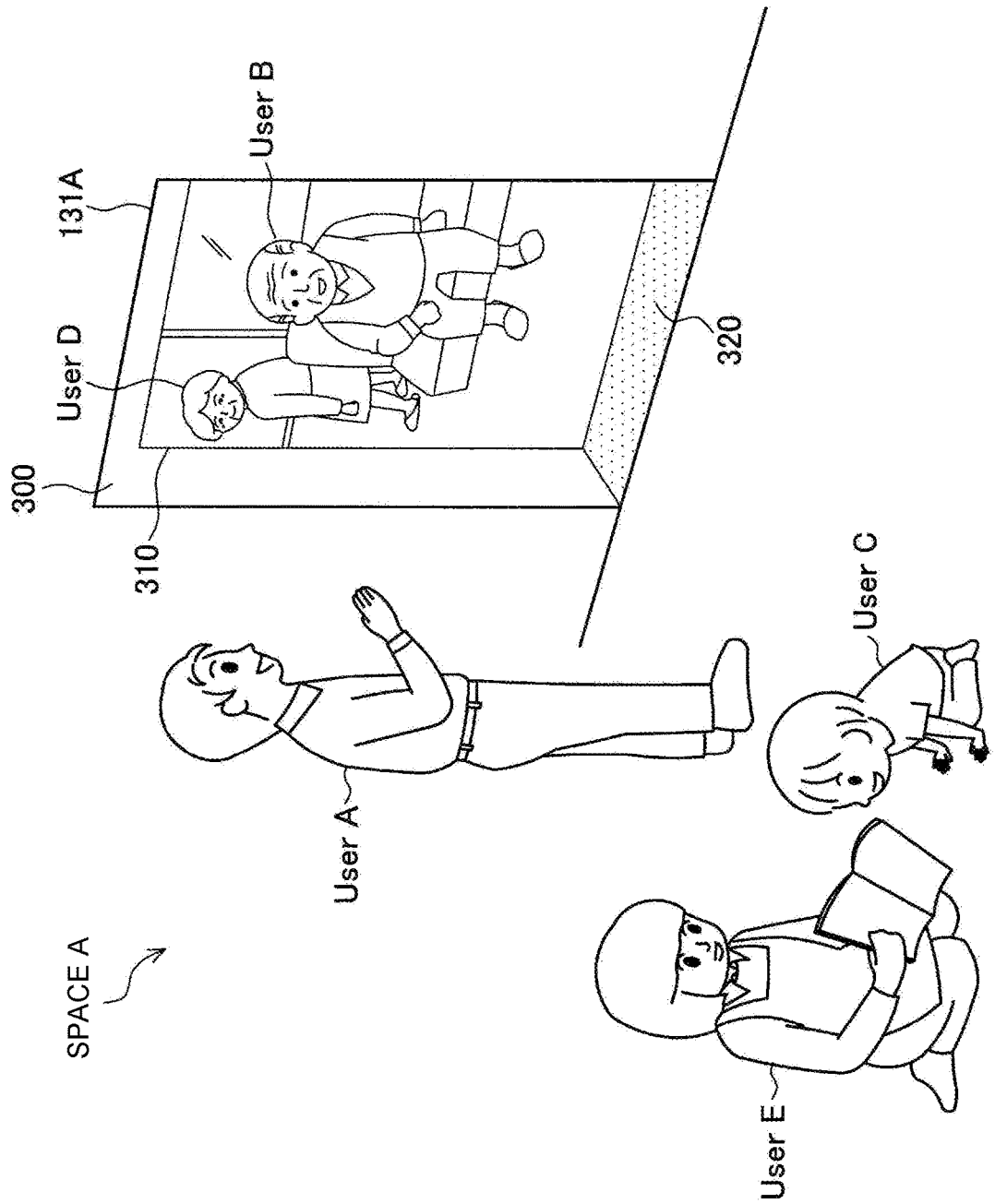
FIG. 2 is a diagram for describing a state of communication using the information processing system according to the present embodiment.

As illustrated in FIG. 2, for example, in space A, a large display 131A is installed on a wall or the like of a room. A camera, a microphone, and a speaker are installed around the display 131A or on the display 131A. A plurality of cameras, a plurality of microphones, and a plurality of speakers may also be provided. Further, arrangement places of the camera, the microphone, and the speaker are not particularly limited, but it is preferable that the camera captures an image of a state of space A using a direction from the display 131A toward an interior of the room as an image capturing direction. Note that, in space B, a display, a camera, a microphone, and a speaker are similarly installed.

On the display 131A, a video acquired in space B to which space A is connected is displayed in real time. On the display 131A, a video 310 of space B may be displayed on the entire screen (in this case, a user feels as if space B exists immediately next to space A through a wall of space A), or as illustrated in FIG. 2, a video 310 of space B may be displayed at a slightly distant place by giving a depth to the video 310 and a virtual space may be generated between space A and space B. In a case where the virtual space is generated, for example, a passage image 320 may be displayed so that the video 310 of space B and a virtual window (a frame of the display 131A) of space A are seen adjacent to each other.

Further, a size and an installation position of the display 131A are not particularly limited. For example, as illustrated in FIG. 2, the display 131A may be larger than a human and a lower side of the display 131A may be located near a floor, or the display 131A may have about a size of the upper body of a human and a lower side of the display 131A may be located at about a height of the waist of the human.

Further, the camera, the microphone, and the speaker are installed around the display 131A. Since an audio (that is not limited to an uttered voice, but is various environmental sounds including a living sound such as a sound of door opening and closing or a television, a footstep sound, and the like) acquired in the counterpart space is output from the speaker (not illustrated), even though a figure of a counterpart is not visible, the user can feel an atmosphere or a sign of the counterpart space. Particularly, in a case of always connecting rooms of family living apart from each other to each other, each other's situations can be confirmed at any time, and anxiety that does not know each other's states in remote places is thus reduced, such that a sense of security can be obtained.

Further, as a conventional example, in a video chat using an information communication terminal such as a smartphone, a personal computer (PC) or the like, a conversation with a purpose has been made by calling the counterpart when there is a thing to do, but in the space adjacent telepresence system according to the present embodiment, a space is basically always connected to the counterpart space, and it is thus easy to feel free to start to talk or casually make a conversation, such that an effect increasing communication occurs. Further, since a voice of the counterpart is heard even in a state where a face of the counterpart is not seen from the virtual window, it is possible to make a conversation without seeing the face.

(Background)

Here, in the space adjacent telepresence system, it is possible to easily perform communication by connecting the space to the counterpart space in real time, but it is also conceivable to later recollect a daily state or a special event that has occurred in that place and performs communication such as looking back on the past with a connection counterpart.

Therefore, in the present embodiment, in the space adjacent telepresence system, it becomes possible to look back on a state of the past event (that is, the past two-way communication) that has occurred in that space while maintaining an effect that it seems that the spaces are adjacent to each other in real time.

Specifically, by storing space information such as videos, audios and the like of each space, synchronizing states (past videos) of counterpart spaces that have been seen from virtual windows of each other's spaces with each other on a time axis, and playing back the states (past videos) in each space, it is possible to look back on the past states (past two-way communication) of the counterpart spaces that have been seen in the respective spaces at the same timing. Such a function of looking back on the past state is provided as a "recollection function" in the space adjacent telepresence system according to the present embodiment.

Figure 3:
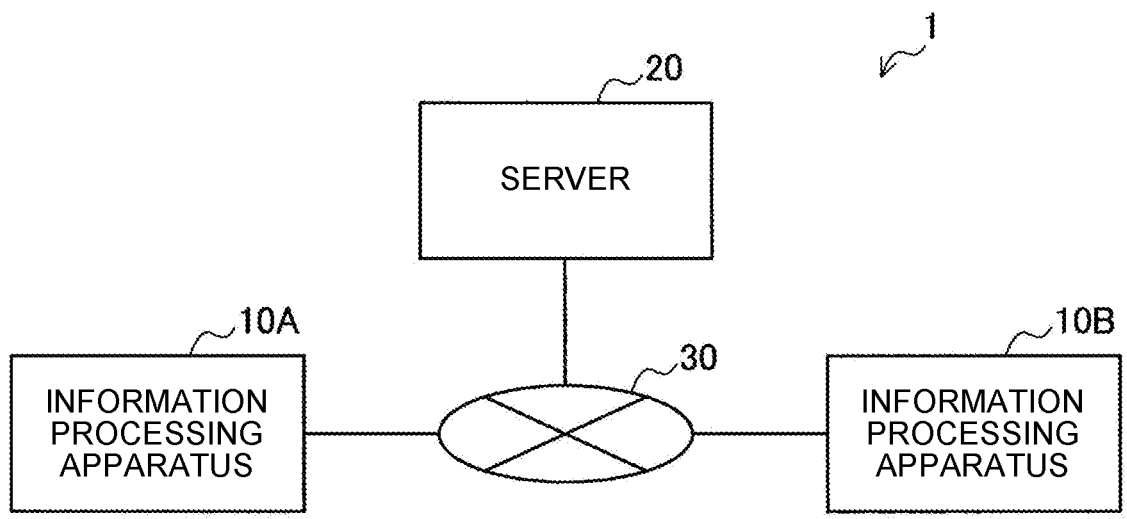
FIG. 3 is a diagram illustrating an example of an entire configuration of the information processing system according to the present embodiment.

Such an information processing system according to the present embodiment has, for example, a configuration as illustrated in FIG. 3. FIG. 3 is a diagram illustrating an example of an entire configuration of the information processing system according to the present embodiment.

As illustrated in FIG. 3, the information processing system 1 according to the present embodiment includes a plurality of information processing apparatuses 10 (10A and 10B) and a server 20. The information processing apparatus 10A, the information processing apparatus 10B, and the server 20 are connected to each other through a network 30.

Each information processing apparatus 10 controls input and output of space information using an input unit and an output unit provided in each space. Specifically, the information processing apparatus 10A acquires space information such as a video or an audio of space A from an input unit installed in space A, and transmits the acquired space information to the server 20 or the information processing apparatus 10B. Further, the information processing apparatus 10A performs control to output space information (a video and an audio) of the information processing apparatus 10B received from the information processing apparatus 10B or the server 20 from an output unit provided in space A.

The server 20 stores the space information of each space transmitted from each information processing apparatus 10. Further, in a case where look-back on the past of the two-way communication is performed in the space adjacent telepresence system, the server 20 performs control to appropriately transmit the accumulated past space information to the information processing apparatus 10A and the information processing apparatus 10B or control to synchronize the past space information of each space with each other on the time axis.

The information processing system according to the embodiment of the present disclosure has been described hereinabove. Next, a specific configuration of each apparatus included in the information processing system according to the present embodiment will be described with reference to the drawings.

2. Configuration 2-1. Configuration of Information Processing Apparatus 10

Figure 4:
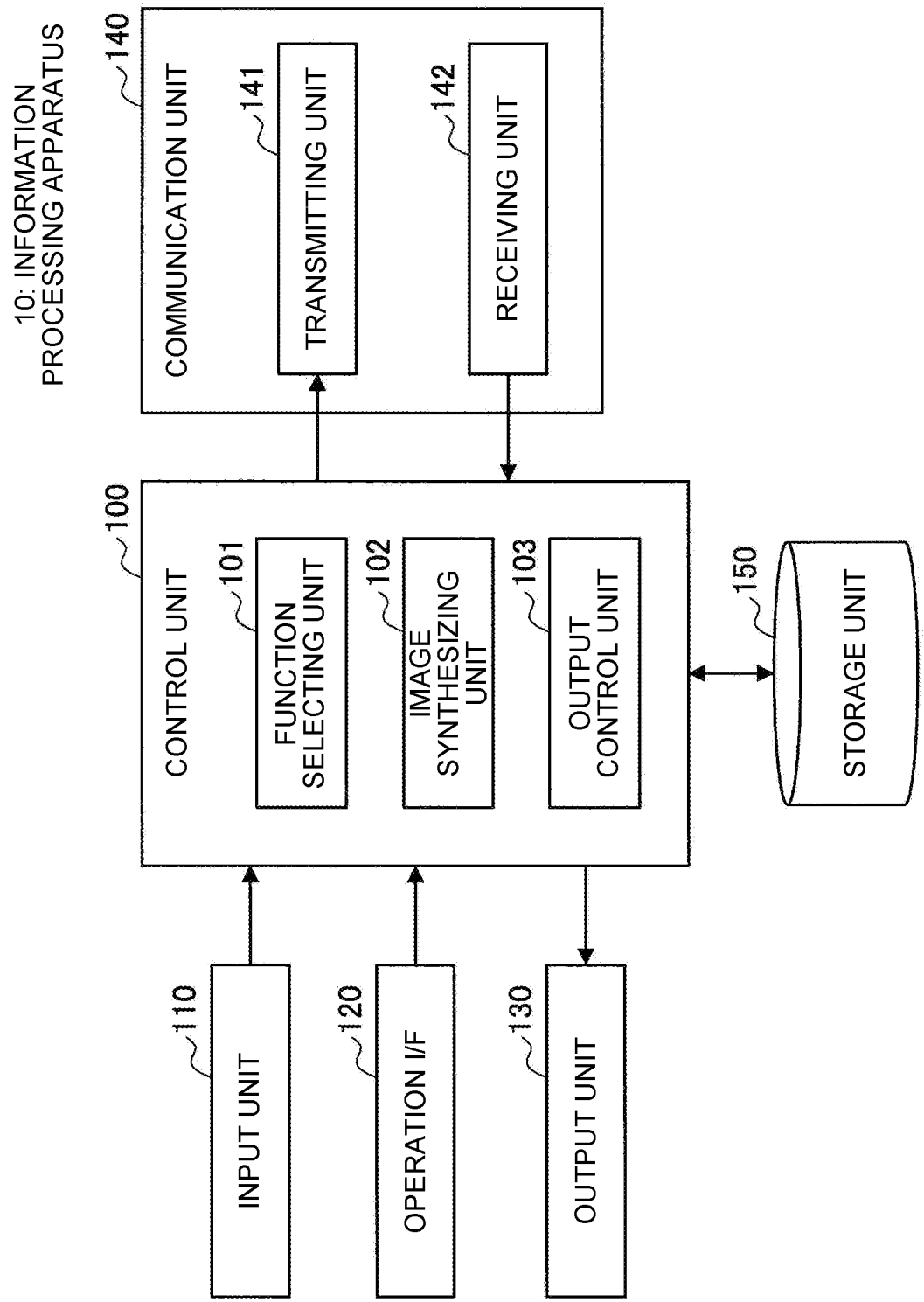
FIG. 4 is a block diagram illustrating an example of a configuration of an information processing apparatus according to the present embodiment.

FIG. 4 is a block diagram illustrating an example of a configuration of an information processing apparatus 10 according to the present embodiment. As illustrated in FIG. 4, the information processing apparatus 10 includes a control unit 100, an input unit 110, an operation interface (I/F) 120, an output unit 130, a communication unit 140, and a storage unit 150.

(Control Unit 100)

The control unit 100 functions as an arithmetic processing device and a control device, and generally controls an operation in the information processing apparatus 10 according to various programs. The control unit 100 is realized by, for example, an electronic circuit such as a central processing unit (CPU), a microprocessor or the like. Further, the control unit 100 may include a read only memory (ROM) storing programs, operation parameters or the like that are used and a random access memory (RAM) temporarily storing parameters or the like that are appropriately changed.

The control unit 100 performs control to acquire various space information from the input unit 110, accumulate the acquired space information in the storage unit 150, and transmit the acquired space information from a transmitting unit 141 to the server 20. From the input unit 110, for example, a video, an audio, depth information, and the like are obtained. The control unit 100 may allow information on which predetermined processing such as noise processing or compression, or the like, has been performed to be accumulated and transmitted.

Further, the control unit 100 can also perform user recognition on the basis of the various space information obtained from the input unit 110. As the user recognition, for example, user identification to identify who a user is by comparison with a previously registered face image or situation recognition such as a position (where the user is in a room), a posture (whether the user are walking, sitting, standing, or the like), emotion (whether the user is laughing, angry, or the like), behavior (what the user is doing), or the like, of the user is assumed.

Further, the control unit 100 can recognize an uttered voice of the user on the basis of audio information obtained from the input unit 110.

Further, the control unit 100 can recognize an environment (for example, object recognition (a position and a type of object) of the space on the basis of the various space information obtained from the input unit 110.

The control unit 100 may accumulate such various recognition results in the storage unit 150 or transmit such various recognition results from the transmitting unit 141 to the server 20 in a state of including such various recognition results in the space information.

Further, the control unit 100 according to the present embodiment also functions as a function selecting unit 101, an image synthesizing unit 102, and an output control unit 103.

The function selecting unit 101 selects a function that can be used in the space adjacent telepresence system according to the present embodiment. For example, the function selecting unit 101 acquires information of a user operation performed using a remote controller or the like, from the operation I/F 120, and selects a function according to the user operation. As available functions, for example, an album function of viewing a captured image captured by a digital camera or the like together with a counterpart user, a game function of playing a certain game with the counterpart user, a recollection function (function of looking back on the state of the past according to the present embodiment) of looking back on two-way communication with a counterpart space with the counterpart user, and the like, are assumed. Here, a method of selecting a menu will be described with reference to FIG. 5.

Figure 5:
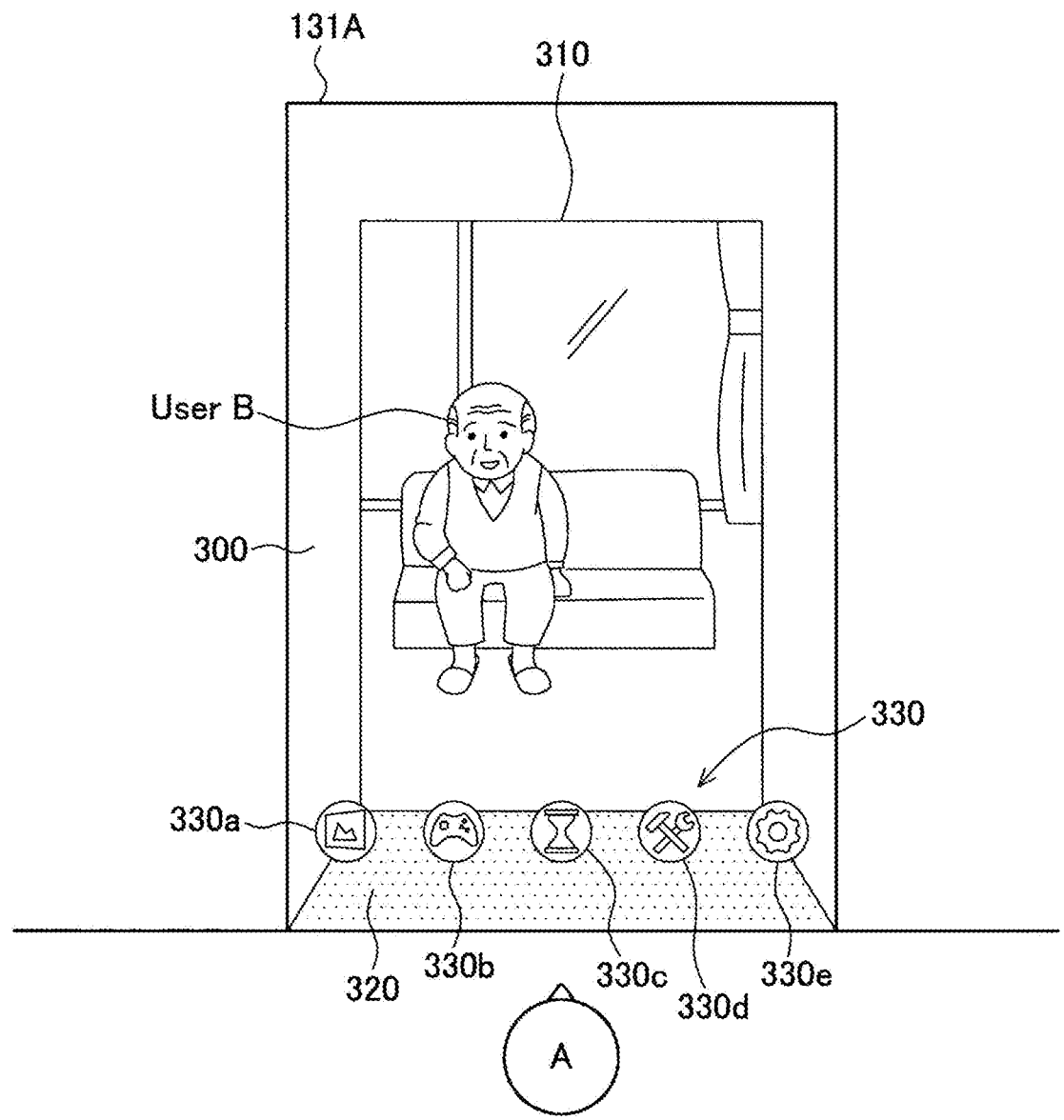
FIG. 5 is a diagram illustrating an example of a menu selection screen displayed in a virtual space according to the present embodiment.

As illustrated in FIG. 5, an image 300 including the video 310 of the always connected counterpart space and the passage image 320 of a virtual space connecting the counterpart space and a user side to each other is displayed on the display 131. At this time, according to a predetermined trigger operation (for example, a gesture, a voice, a touch operation, a button operation, or an operation by a remote controller of the user), a menu icon 330 is displayed on the virtual space and in front of the video 310 of the counterpart space, as illustrated in FIG. 5. An image of the icon illustrated in FIG. 5 is an example, and the present embodiment is not limited thereto. For example, an icon 330a is an icon for the album function, an icon 330b is an icon for the game function, an icon 330c is an icon for the recollection function, an icon 330d is an icon for a tool function, and an icon 330e is an icon for a setting function. The user selects the icon by a remote controller (not illustrated), a gesture, a voice, a touch operation on a screen of the display 131, an operation of an operation unit (not illustrated) such as a button or the like provided around the screen, or the like.

Here, an example of a method of selecting the past video in a case where, for example, the icon 330c for the recollection function is selected will be described with reference to FIG. 6. In a case where the icon 330c for the recollection function is selected, a calendar image 331 is displayed, for example, as illustrated on the left side of FIG. 6. When a date to perform look-back is selected from the calendar image 331, a seek bar 332 for searching the past video of the selected date is displayed as illustrated on the right side of FIG. 6. The user operates the seek bar 332 to select a time zone to perform look-back while confirming the past video 333 displayed correspondingly. The past video 333 to be searched may be a video of the counterpart space that has been seen from a space of an own side or may be a video of a space of an own side that has been seen from the space of the counterpart side. Note that the method of searching and selecting the past video illustrated in FIG. 6 is an example, the present embodiment is not limited thereto, and the method of searching and selecting the past video may be another method as long as a date or a time can be designated.

When the past video of the time zone selected by the recollection function is transmitted from the server 20, the image synthesizing unit 102 performs processing for synthesizing the past video with a real time video of the currently connected counterpart space. From the server 20, in addition to the past video of the counterpart space, a processed content (for example, an image or a 3D model in which only a person is extracted from the past video) generated on the basis of the past video, or a synchronized content in which the past video of the counterpart space and the past video of the space of the own side are synchronized with each other on the time axis can be received.

The output control unit 103 performs control to output real-time space information of the always connected counterpart space, received by a receiving unit 142, from the output unit 130. For example, the output control unit 103 performs control to display a real-time video captured in space B on the display 131 provided in space A and output a real-time audio collected in space B from the speaker (not illustrated) provided in space A. The display 131 is a large display unit installed on the wall or the like or the like of the room, for example, as illustrated in FIG. 2, and the video of the counterpart space displayed on such a display 131 is a video captured at an appropriate angle of view so as to be seen without any discomfort in a case where the display 131 is the virtual window. Such an arrangement of the display 131 and such display of the video of the counterpart space by the display 131 are similarly performed in the counterpart space. Therefore, it seems that each other's spaces are adjacent to each other, such that each user can perform communication bidirectionally through the display 131.

The output control unit 103 may display the video of the counterpart space in an expression arranged in the virtual space (that is, display the video of the counterpart space with a distance from an adjacent space) or display the video of the counterpart space over the entire screen of the display 131 without providing the virtual space (that is, without a distance from an adjacent space), on the display 131. Various setting contents such as which display method to select, or how far to be distant from the virtual space or how to set a scene in the virtual space in a case where the virtual space is provided, and the like, may be set automatically (by default) or may be selected by the user. Further, such a setting may be shared with a display method in the counterpart space.

Further, the output control unit 103 can perform control for displaying the image synthesized by the image synthesizing unit 102 described above on the display 131. Here, FIGS. 7 to 16 illustrate specific examples of synthesis of the past videos and the like when the recollection function is used. Which display method is used may be set automatically (by default) by a system side or may be arbitrarily selected and changed by the user. Further, a display method selected by any user can be shared between space A and space B.

FIG. 7 is an example of each displaying the past videos that have been seen from each other bidirectionally in each space. In this case, as illustrated in FIG. 7, on a display 131B of space B where user B is, the past video 333 of space A that has been seen from space B is arranged on a virtual space in front of a current real-time video 340 of space B. On the other hand, on a display 131A of space A where user A is, the past video 335 of space B that has been seen from space A is arranged on a virtual space in front of a current real-time video 310 of space B. These past videos 333 and 335 are the past videos of the same time zone, and are played simultaneously in each space. Therefore, each user can look back on the past two-way communication while maintaining connection between the spaces in real time (that is, while conversing with a user of the counterpart space in real time). For example, user A is the son of user B, and can show a state of a birthday party of a grandson (user C) performed in space A to user B who was not at that place. Here, the two-way past videos are displayed, respectively, but the past audios collected at the same time can also be output.

Figure 8:
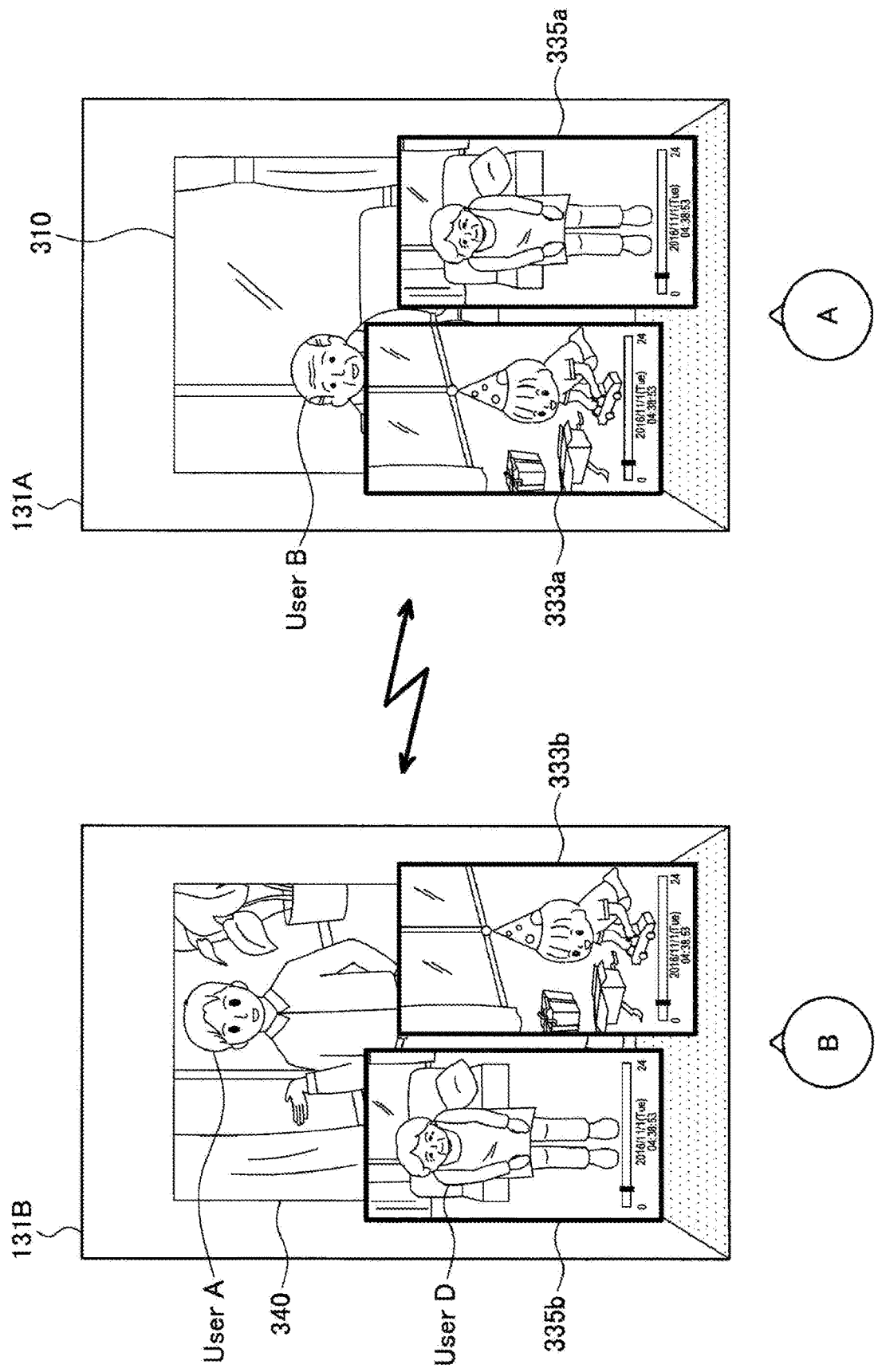
FIG. 8 is an example of displaying both the past videos that have seen from each other in each space using the recollection function according to the present embodiment.

FIG. 8 is an example of displaying both the past videos that have been seen from each other in each space. In this case, as illustrated in FIG. 8, on the display 131B of space B where user B is, the past video 333b of space A that has been seen from space B and the past video 335b of space B that has been seen from space A are arranged on the virtual space in front of the current real-time video 340 of space B. The past video 333b and the past video 335b simultaneously displayed on the display 131B are the past videos of the same time zone, and are synchronized contents that have been synchronized with each other on the time axis by the server 20. On the other hand, on the display 131A of space A where user A is, the past video 335a of space B that has been seen from space A and the past video 333a of space A that has been seen from space B are arranged on the virtual space in front of the current real-time video 310 of space B. The past video 333a and the past video 335a simultaneously displayed on the display 131A also are the past videos of the same time zone, and are synchronized contents that have been synchronized with each other on the time axis by the server 20. Each synchronized content is played simultaneously in each space. Therefore, each user can look back on the videos of both sides that have been seen from each other in the past two-way communication while maintaining connection between the spaces in real time (that is, while conversing with a user of the counterpart space in real time). In this case, for example, user B can see not only the past state of the counterpart space (space A), but also the past state of the space (space B) of the own side in the same time zone, and can thus simultaneously see a state of user D who is in space B, seeing a state of space A in which the grandson (user C) opens a present and plays, for example. Further, here, naturally, not only the display of the two-way past videos but also the past audios collected at the same time can be output.

Figure 9:
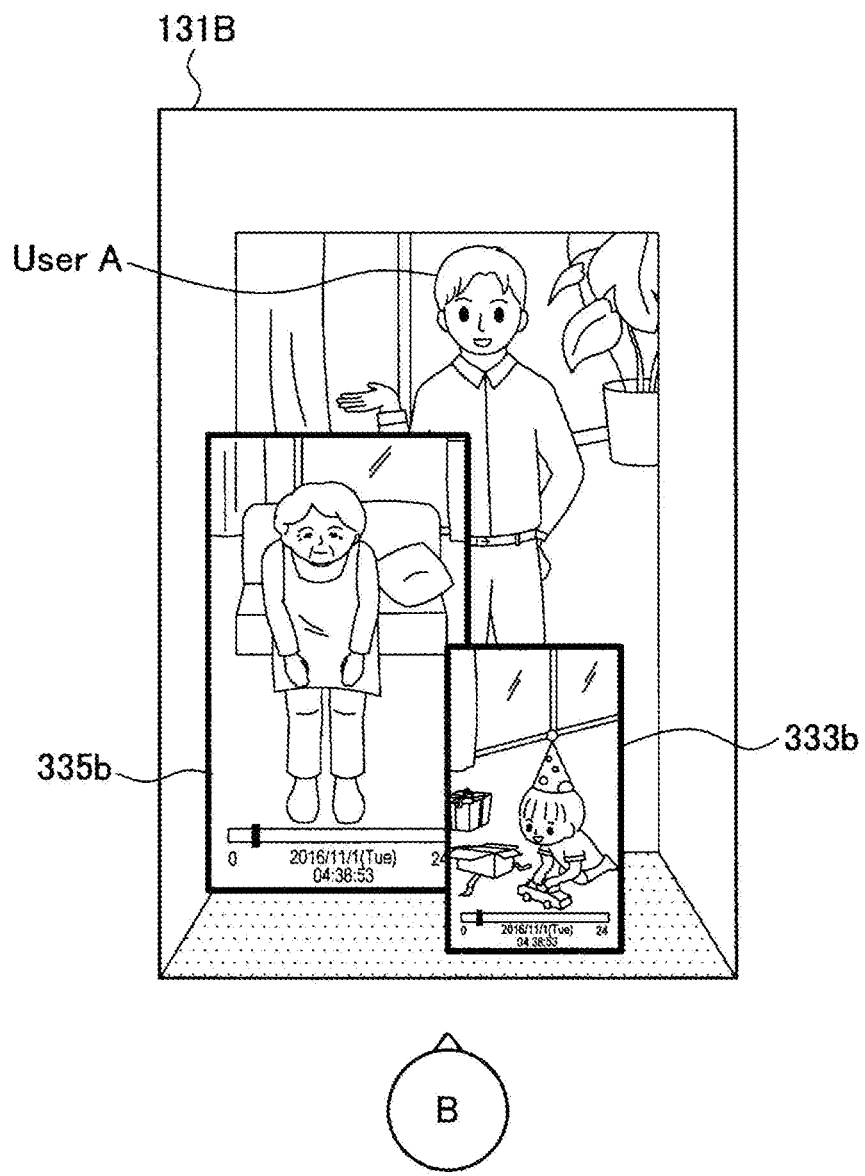
FIG. 9 is a diagram illustrating another example of a display size in a case of displaying both the past videos illustrated in FIG. 8.
Figure 10:
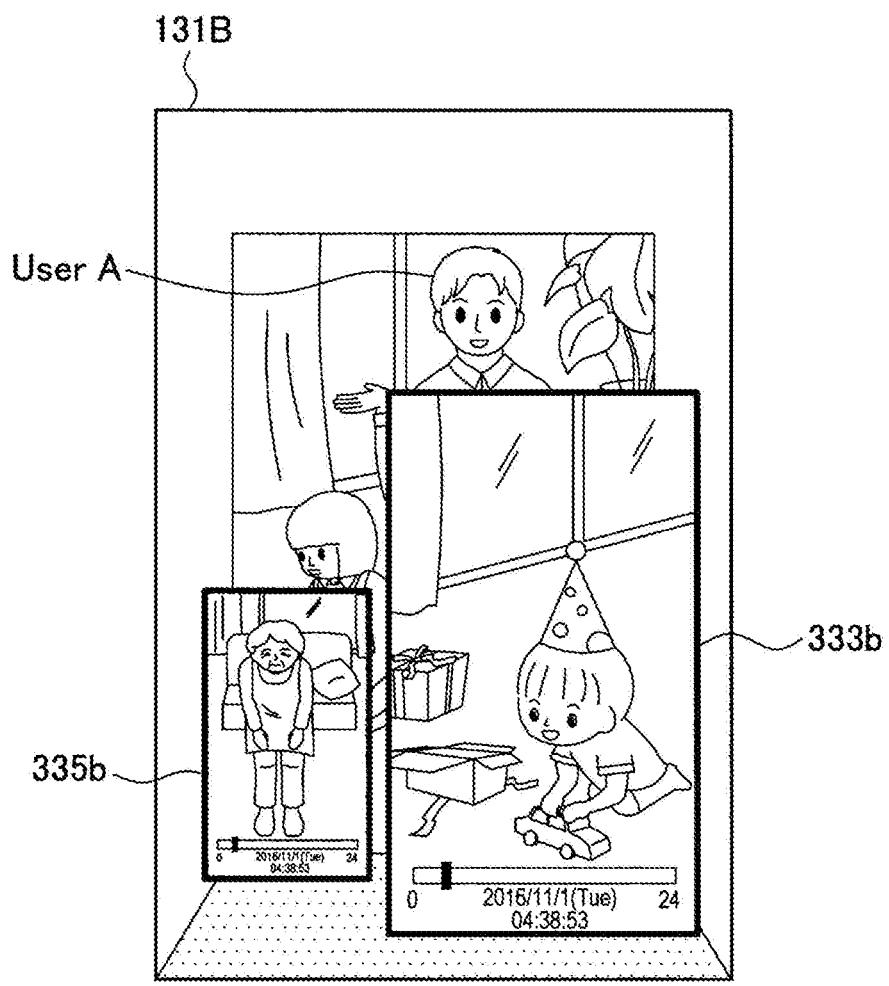
FIG. 10 is a diagram illustrating another example of a display size in a case of displaying both the past videos illustrated in FIG. 8.

In the example illustrated in FIG. 8, sizes or arrangements of the display of the past videos can be appropriately changed by a user operation or the like. For example, in the example illustrated in FIG. 8, the past video of the counterpart space is arranged in front of the past video of the space of the own side on the virtual space, but the past video of the counterpart space and the past video of the space of the own side may be moved forward and backward on the virtual space while maintaining a positional relationship therebetween. Further, a balance of the display size may be changed as illustrated in FIG. 9 or FIG. 10 while maintaining a front and rear positional relationship.

Figure 11:
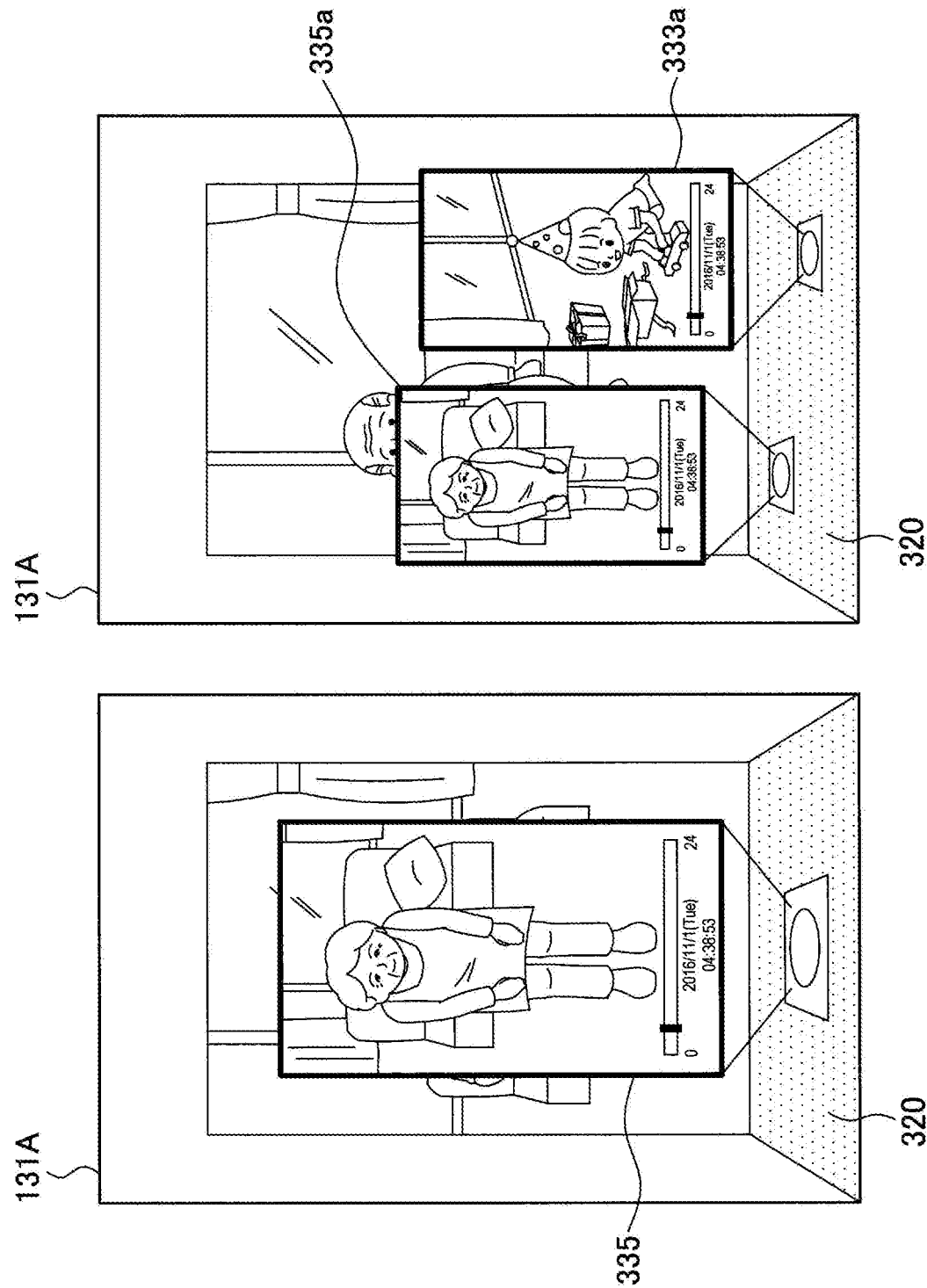
FIG. 11 is a diagram for describing a variation of a display method of displaying the past videos in each space using the recollection function according to the present embodiment.
Figure 12:
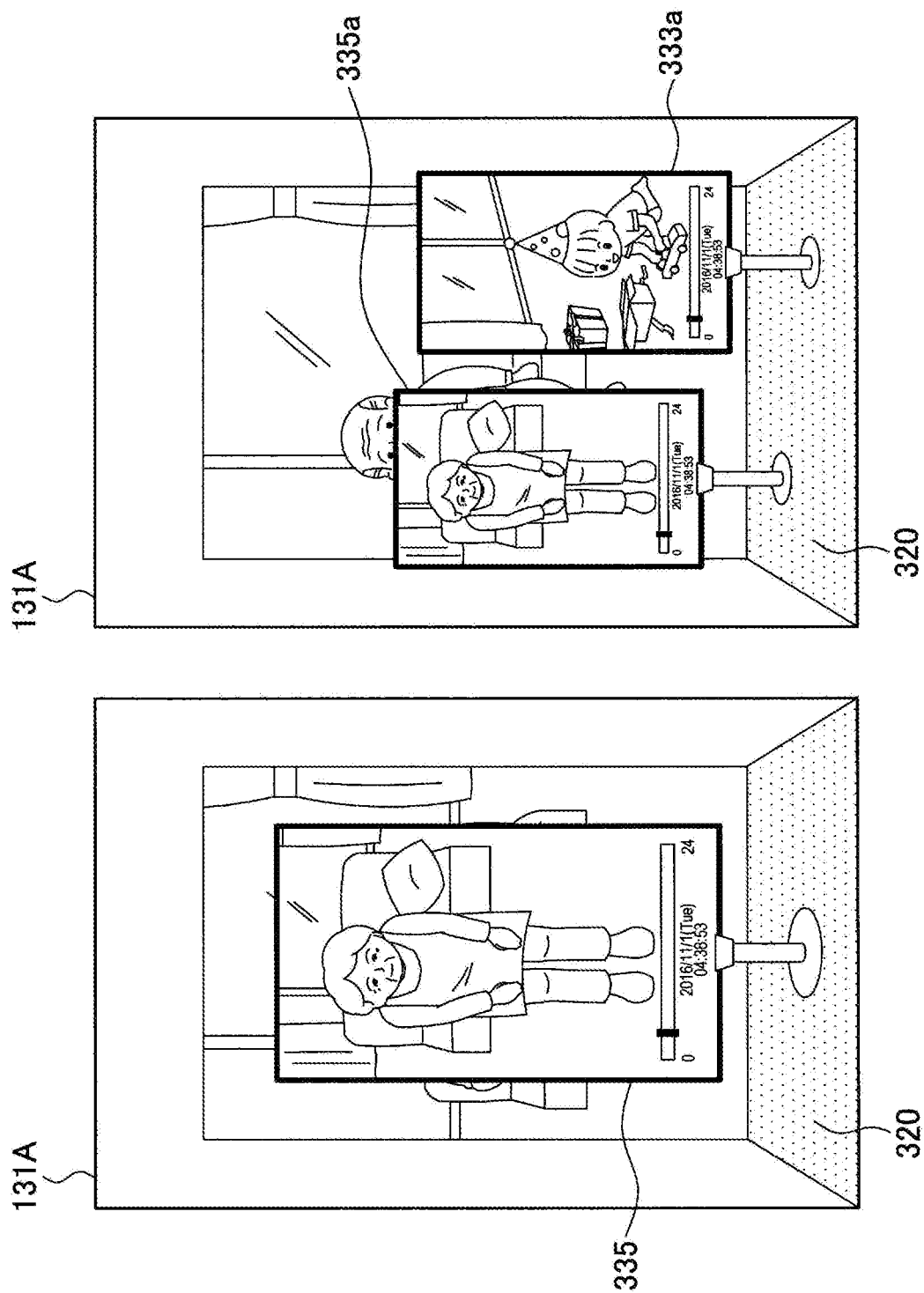
FIG. 12 is a diagram for describing a variation of a display method of displaying the past videos in each space using the recollection function according to the present embodiment.

Further, as a variation of a method of displaying the past video on the virtual space, in addition to arranging the past video simply on the virtual space as illustrated in FIGS. 7 to 10, the past video may be expressed so as to be projected upward from an apparatus placed on the passage image 320 of the virtual space, as illustrated in FIG. 11, or may be expressed so as to be put in a photo frame placed on the passage image 320 of the virtual space, as illustrated in FIG. 12.

Figure 13:
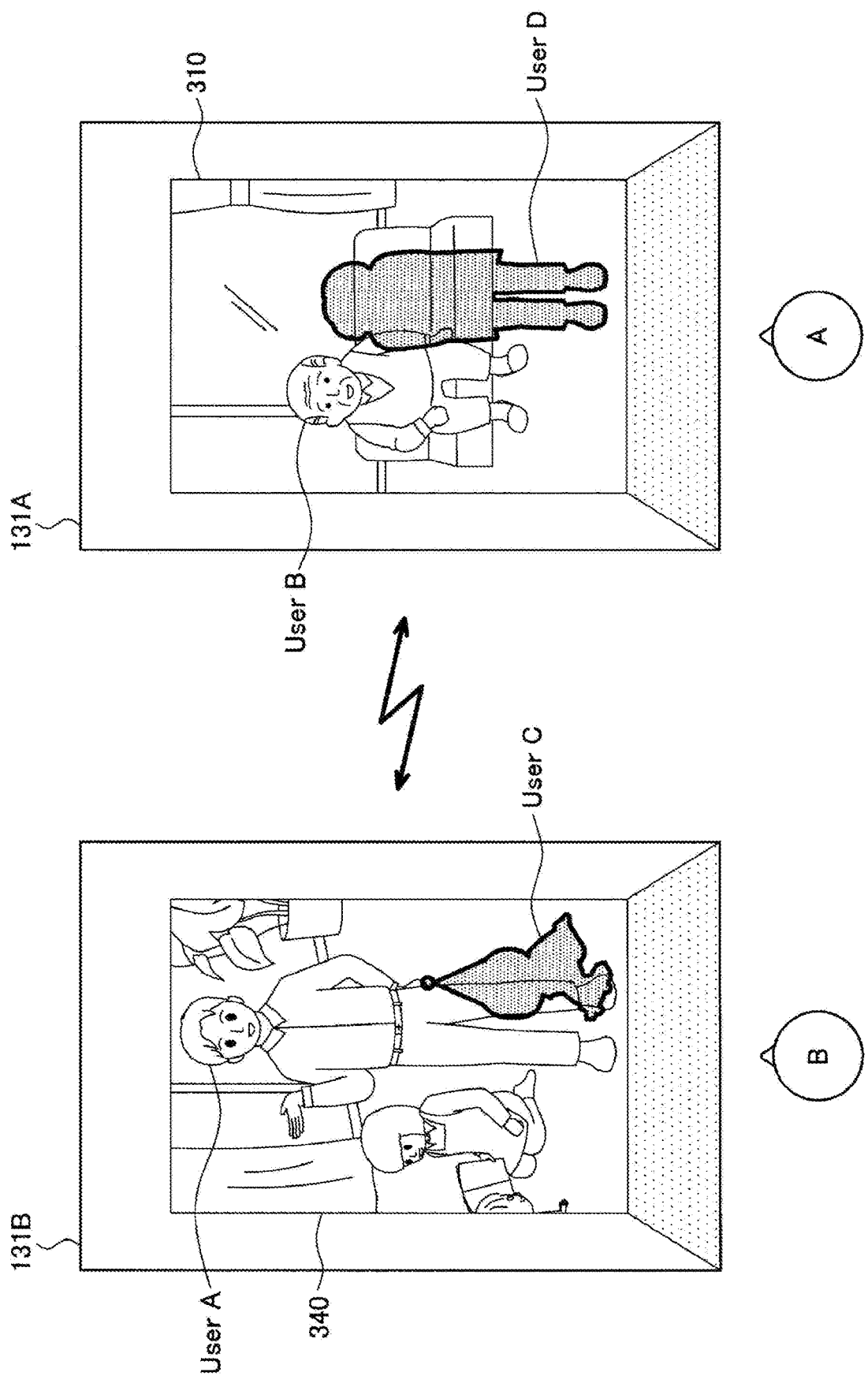
FIG. 13 is a diagram illustrating an example of displaying a silhouette of a person extracted from the past video as a display example of conveying an atmosphere of the past video using the recollection function according to the present embodiment.

FIG. 13 is a diagram illustrating an example of displaying a silhouette of a person extracted from the past video as a display example for conveying an atmosphere of the past video. In this case, as illustrated in FIG. 13, on the display 131B of space B where user B is, a silhouette image (for example, a silhouette of user C, a moving image) of a person extracted from the past video 333 of space A that has been seen from space B is synthesized with the current real-time video 340 of space B. Since a background of the space is the same, a movement or an atmosphere of a person who was in that space in the past can be sensed only by superimposing and displaying a silhouette of the past person on a current video. On the other hand, on the display 131A of space A where user A is, a silhouette image (for example, a silhouette of user D, a moving image) of a person extracted from the past video 335 of space B that has been seen from space A is synthesized with the current real-time video 310 of space B. These silhouette images are the past videos of the same time zone, and are played simultaneously in each space.

An expression of the person extracted from a past image may be a silhouette (shadow) as illustrated in FIG. 13, may be a blurred expression, or may be a bone expression (an expression of a stick figure generated by recognizing a skeleton of the body). Further, the extracted person may be displayed as it is or may be displayed transparently.

Further, a position where the image of the extracted person is synthesized may be arranged on the basis of which position he/she was in the room, for example, on the basis of depth information.

Figure 14:
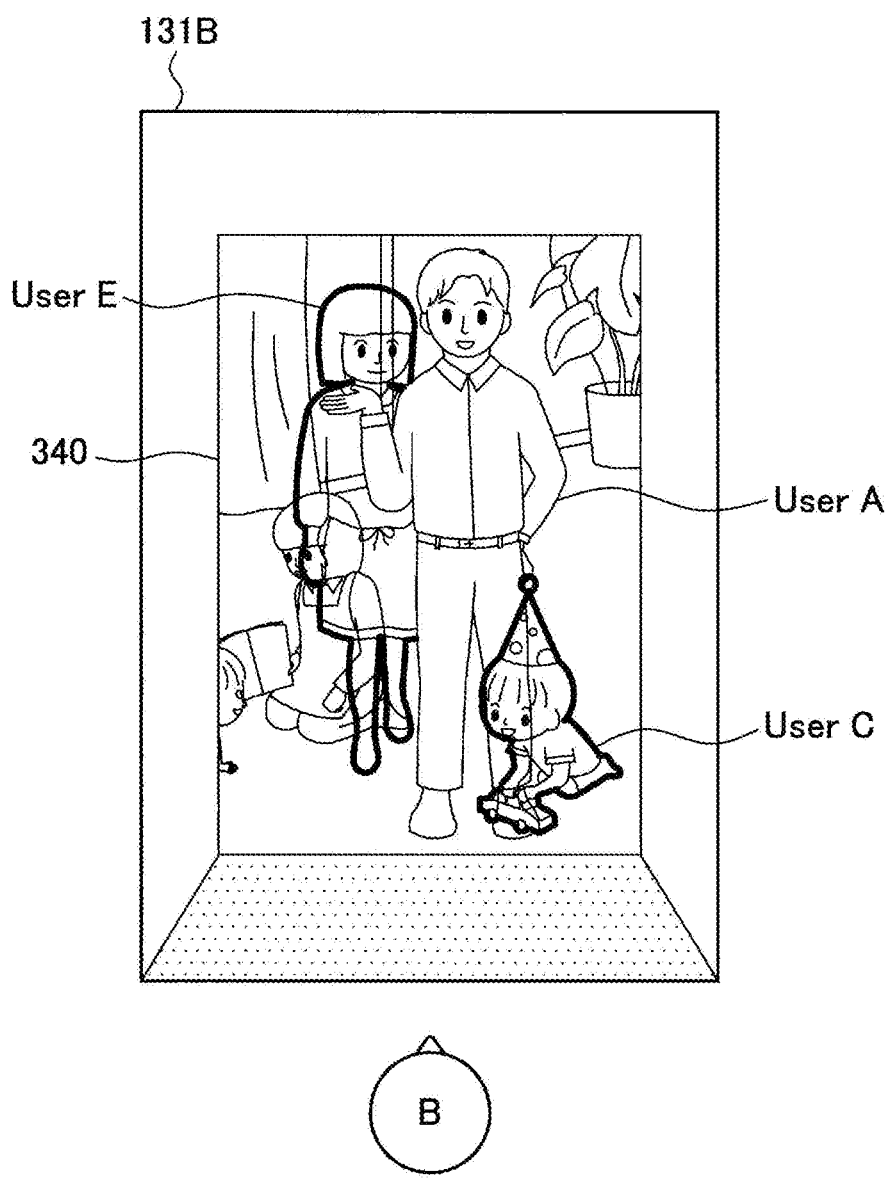
FIG. 14 is a diagram illustrating an example of arranging the person extracted from the past video using the recollection function according to the present embodiment with reference to depth information.

Further, the image of the extracted person may be displayed in front of a person appearing in a current video, or may be displayed in front of the person appearing in the current video in a case where the extracted person is located in front of the person appearing in the current video and be displayed so as to move to the rear of the person appearing in the current video in a case where the extracted person is located behind the person appearing in the current video, on the basis of the depth information. An example is illustrated in FIG. 14. In the example illustrated in FIG. 14, users C and E extracted from the past video of space A are appropriately arranged in the same background of space A on the basis of depth information of the past video. Therefore, it can be understood that in the past video, user C was located in front of a place where user A is currently located and user E was located behind user A.

Figure 15:
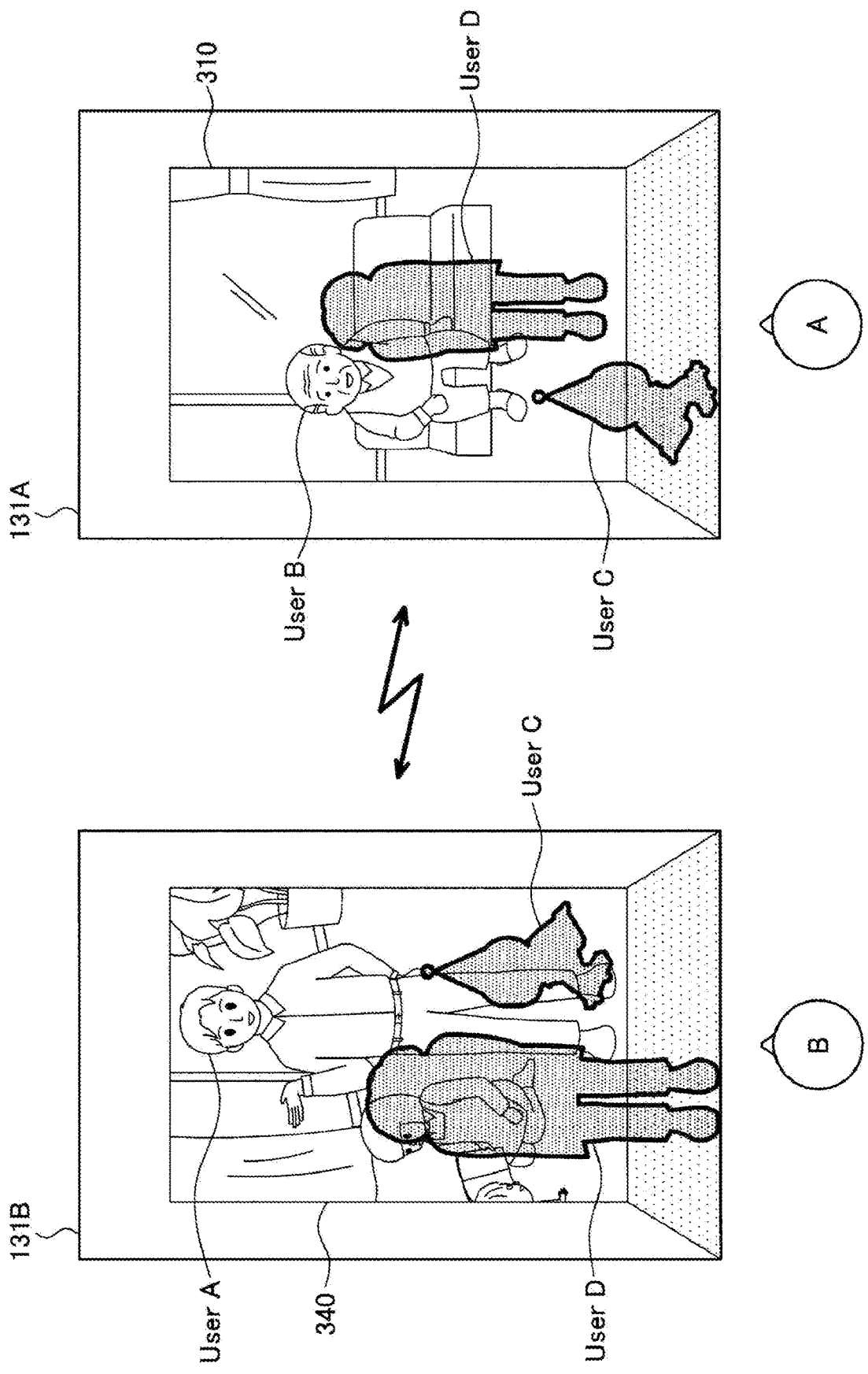
FIG. 15 is a diagram illustrating an example of synthesizing persons each extracted from the past videos of a counterpart side and an own side using the recollection function according to the present embodiment with each other on both sides.

Note that only the person extracted from the past video of the counterpart space has been synthesized in FIGS. 13 and 14, but the present embodiment is not limited thereto, and a person extracted from the past video of the space of the own side may be further synthesized. An example is illustrated in FIG. 15. In this case, as illustrated in FIG. 15, on the display 131B of space B where user B is, the silhouette image (for example, the silhouette of user C, the moving image) of the person extracted from the past video 333 of space A that has been seen from space B and the silhouette image (for example, the silhouette of user D, the moving image) of the person extracted from the past video 335 of space B that has been seen from space A are synthesized with the current real-time video 340 of space B. On the other hand, on the display 131A of space A where user A is, the silhouette image (for example, the silhouette of user D, the moving image) of the person extracted from the past video 335 of space B that has been seen from space A and the silhouette image (for example, the silhouette of user C, the moving image) of the person extracted from the past video 333 of space A that has been seen from space B are synthesized with the current real-time video 310 of space B. These silhouette images are the past videos of the same time zone, and are played simultaneously in each space. Further, the image of the person extracted from the past video of the space of the own side is arranged at the foremost side of the virtual space, as illustrated in FIG. 15, and moreover, may be a silhouette inverted in a horizontal direction in order to make the user perceive that the user is looking the person from behind. Alternatively, a back view of the person generated on the basis of a 3D model may be synthesized. Further, all the extracted persons have been displayed as silhouettes in the example illustrated in FIG. 15, but the present embodiment is not limited thereto. Display methods of the extracted persons may be different from each other, such as, for example, displaying a person of a front side (the person extracted from the past video of the space of the own side) as a silhouette and transparently displaying the person extracted from the past video of the counterpart space as illustrated in FIG. 14, or the like.

Figure 16:
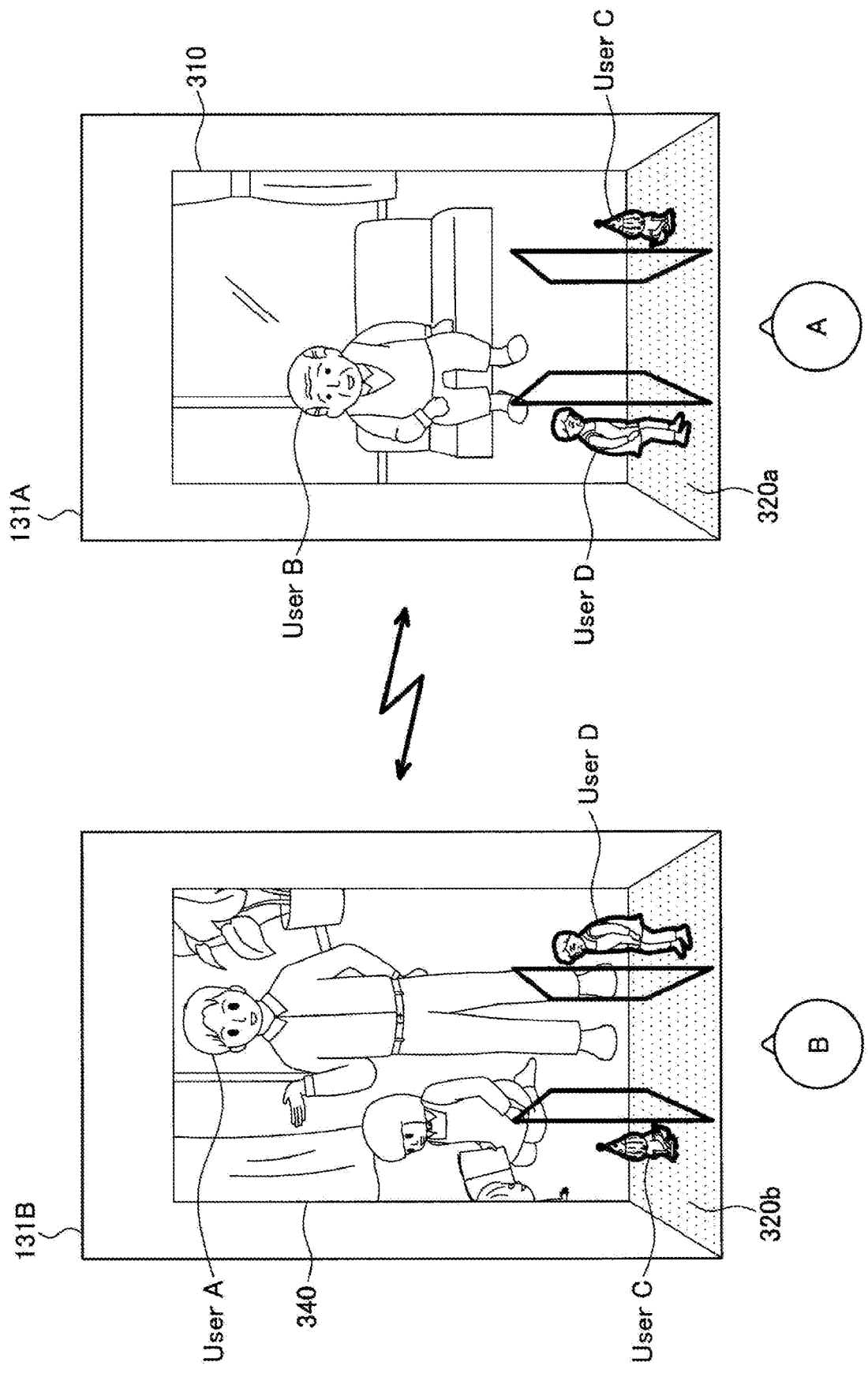
FIG. 16 is a diagram illustrating an example of generating 3D models of persons each extracted from the past videos of the counterpart side and the own side using the recollection function according to the present embodiment and arranging the 3D models on virtual spaces.

FIG. 16 is a diagram illustrating an example of generating 3D models of persons each extracted on the basis of the past videos of both spaces and arranging the 3D models so as to face each other through window frames on the virtual spaces. In this case, as illustrated in FIG. 16, on the display 131B of space B where user B is, a 3D image (for example, a 3D image of user C, a moving image) of the person extracted from the past video 333 of space A that has been seen from space B and a 3D image (for example, a 3D image of user D, a moving image) of the person extracted from the past video 335 of space B that has been seen from space A are arranged on a passage image 320b of the virtual space located in front of the current real-time video 340 of space B. In the passage image 320b of the virtual space, the 3D images of each person are arranged to face each other across virtual windows, and a relationship through windows expressing adjacent spaces is expressed. Further, positions of the 3D images of each person from the window frames may be appropriately arranged on the basis of depth information. On the other hand, also on the display 131A of space A where user A is, similarly, the silhouette image (for example, the silhouette of user D, the moving image) of the person extracted from the past video 335 of space B that has been seen from space A and the silhouette image (for example, the silhouette of user C, the moving image) of the person extracted from the past video 333 of space A that has been seen from space B are synthesized with the current real-time video 310 of space A. The 3D images of these extracted persons are generated on the basis of the past videos of the same time zone, and are played simultaneously in each space.

As such, it is possible to reproduce the past two-way communication on the virtual space while maintaining adjacency with the counterpart space to look back on states of both sides together with the counterpart user. In 3D modeling, not only persons but also states around the persons may be modeled. Further, a size of the entire 3D model arranged in the virtual space can be appropriately changed, and may be changed by, for example, a user using a remote controller or the like.

(Input Unit 110)

The input unit 110 has a function of inputting the space information to the control unit 100. For example, the input unit 110 is realized by a camera, a microphone, and a sensor. The number of cameras may be plural, and the cameras capture an image in a space (for example, a living room) to acquire a captured image. Further, the number of microphones may be plural, and the microphones collect sounds in a space (for example, sounds in the room, sounds that are heard from the outside of the room, or the like) to acquires audio data. Further, the sensor has a function of detecting various information in the space, and for example, a depth sensor (distance sensor), a human sensor, an infrared sensor, an illuminance sensor, and the like are assumed.

(Operation I/F 120)

The operation I/F 120 receives operation input by the user, and outputs operation information to the control unit 100. The operation I/F 120 is realized by, for example, a button, a switch, a keyboard, a touch sensor, and the like, and is provided around the display 131, or the like. Further, the operation I/F 120 is connected to a remote controller operated by the user by wireless/wired communication, and can obtain operation input information by the user. The remote controller may be an infrared (IR) remote controller, or may be a Bluetooth (registered trademark) remote controller. Further, the remote controller may be a dedicated terminal, may be realized by an information communication terminal such as a smartphone, a tablet terminal or the like, or may be substituted by a game device (a game pad or the like). Further, input of the user operation can also be made by a gesture such as a movement of a hand, or an uttered voice. The analysis of the gesture or the uttered voice can be performed by the control unit 100 on the basis of the captured image and the audio information obtained from the input unit 110.

(Communication Unit 140)

The communication unit 140 is connected to the network 30 in a wired or wireless manner, is connected to the server 20 or another information processing apparatus 10 through the network 30, and performs transmission and reception of data. The communication unit 140 is communicably connected to the network 30 by, for example, a wired/wireless local area network (LAN), Wi-Fi (registered trademark), long term evolution (LTE), third generation mobile communication system (3G), or the like. Further, as illustrated in FIG. 4, the communication unit 140 includes the transmitting unit 141 that performs transmission of information and the receiving unit 142 that performs reception of information, as functional configurations.

(Output Unit 130)

The output unit 130 outputs, for example, real-time space information of the counterpart space according to the control of the control unit 100. For example, the output unit 130 includes the display 131 and the speaker, and performs output of an image and output of an audio. Here, the display 131 is used as an example, but an image display apparatus is not limited to the display 131, and may be, for example, a projector. The information processing apparatus 10 may project a real-time video of the counterpart space on the wall of the room.

(Storage Unit 150)

The storage unit 150 is realized by a Read Only Memory (ROM) storing programs, operation parameters or the like, that are used for processing of the control unit 100 and a Random Access Memory (RAM) temporarily storing parameters or the like that are appropriately changed.

The configuration of the information processing apparatus 10 according to the present embodiment has been specifically described hereinabove. Note that a configuration of the information processing apparatus 10 is not limited to the example illustrated in FIG. 4, and for example, some of configurations may be realized by a separate body and may be connected to the information processing apparatus 10 in a wireless/wired manner. That is, the information processing apparatus 10 may be configured by a plurality of apparatuses. Further, some of processing performed by the control unit 100 of the information processing apparatus 10 may be performed by the server 20 or an intermediate server (not illustrated) located between the information processing apparatus 10 and the server 20. Therefore, a processing load of the information processing apparatus 10 is reduced.

2-2. Configuration of Server 20

Figure 17:
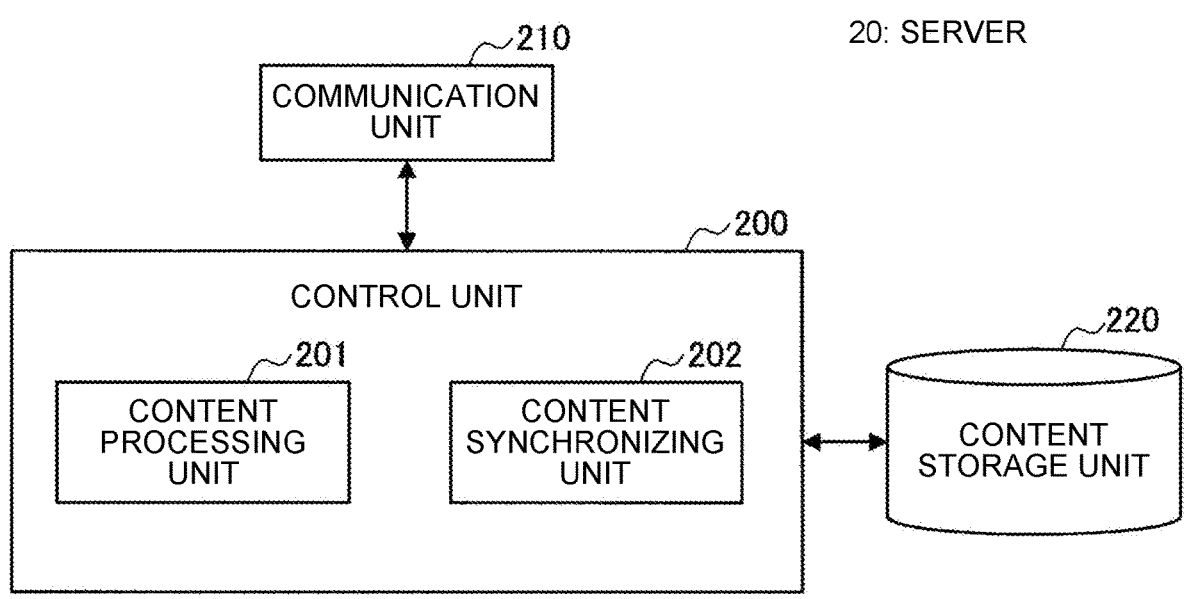
FIG. 17 is a block diagram illustrating an example of a configuration of a server according to the present embodiment.

FIG. 17 is a block diagram illustrating an example of a configuration of the server (information processing apparatus) 20 according to the present embodiment. As illustrated in FIG. 17, the server 20 includes a control unit 200, a communication unit 210, and a content storage unit 220.

(Control Unit 200)

The control unit 200 functions as an arithmetic processing device and a control device, and generally controls an operation in the server 2 according to various programs. The control unit 200 is realized by, for example, an electronic circuit such as a Central Processing Unit (CPU), a microprocessor or the like. Further, the control unit 200 may include a ROM storing programs, operation parameters or the like that are used and a RAM temporarily storing parameters or the like that are appropriately changed.

The control unit 200 performs control to accumulate the space information transmitted from each information processing apparatus 10 in the content storage unit 220. Further, the control unit 200 appropriately transmits necessary information to the information processing apparatus 10 or performs output control in the information processing apparatus 10 according to a request from the information processing apparatus 10.

For example, in a case where there is a request to execute the recollection function from the information processing apparatus 10, the control unit 200 extracts (retrieves) a content (that is, the past video and the past audio) of a designated date and time from the content storage unit 220 and transmits the content to the information processing apparatus 10, and performs control to display the content together with the current video of the counterpart space on the display 131.

Further, the control unit 200 according to the present embodiment also functions as a content processing unit 201 and a content synchronizing unit 202. The control unit 200 transmits a processed content obtained by processing the past video by the content processing unit 201 or a synchronized content obtained by synchronizing the past videos (past videos of space A and space B) of both sides with each other by the content synchronizing unit 202 to the information processing apparatus 10 and performs control to display the processed content or the synchronized content with the current video of the counterpart space on the display 131, according to a request from the information processing apparatus 10.

The content processing unit 201 generates a person image by extracting only a person from a predetermined past video or generates a 3D model of a person appearing in the past video from three-dimensional information based on the past video and corresponding sensor information (sensor information of the same time zone), in the use of the recollection function.

The content synchronizing unit 202 generates a content (also referred to as a synchronized content) in which the selected past videos of space A and space B of the same time zone are associated (synchronized) with each other on the same time axis, in a case of displaying the past videos of both sides in each space as described with reference to FIG. 8.

(Communication Unit 210)

The communication unit 210 is connected to the network 30 in a wire or wireless manner, and transmits and receives data to and from each information processing apparatus 10 through the network 30. The communication unit 210 is communicably connected to the network 30 by, for example, a wired/wireless Local Area Network (LAN), wireless fidelity (Wi-Fi) (registered trademark), or the like.

(Content Storage Unit 220)

The content storage unit 220 stores the space information transmitted from each information processing apparatus 10. Further, the content storage unit 220 may store the content processed by the content processing unit 201 on the basis of the predetermined past video extracted from the space information stored in the content storage unit 220 or the synchronized content generated by the content synchronizing unit 202. The content storage unit 220 is realized by a ROM storing programs, operation parameters or the like, that are used for processing of the control unit 200 and a RAM temporarily storing parameters or the like that are appropriately changed.

The configuration of the server 20 according to the present embodiment has been specifically described hereinabove. Note that the configuration of the server 20 illustrated in FIG. 17 is an example, and the present embodiment is not limited thereto. For example, at least some of configurations of the server 20 may be in an external apparatus, or at least some of respective functions of the control unit 200 may be realized by the information processing apparatus 10 or an information processing terminal (for example, a so-called edge server or the like) of which communication distance is relatively close to the information processing apparatus 10. As such, by appropriately distributing the respective configurations of the server 20, it is possible to improve a real-time property, reduce a processing load, and secure security.

3. Operation Processing

Figure 18:
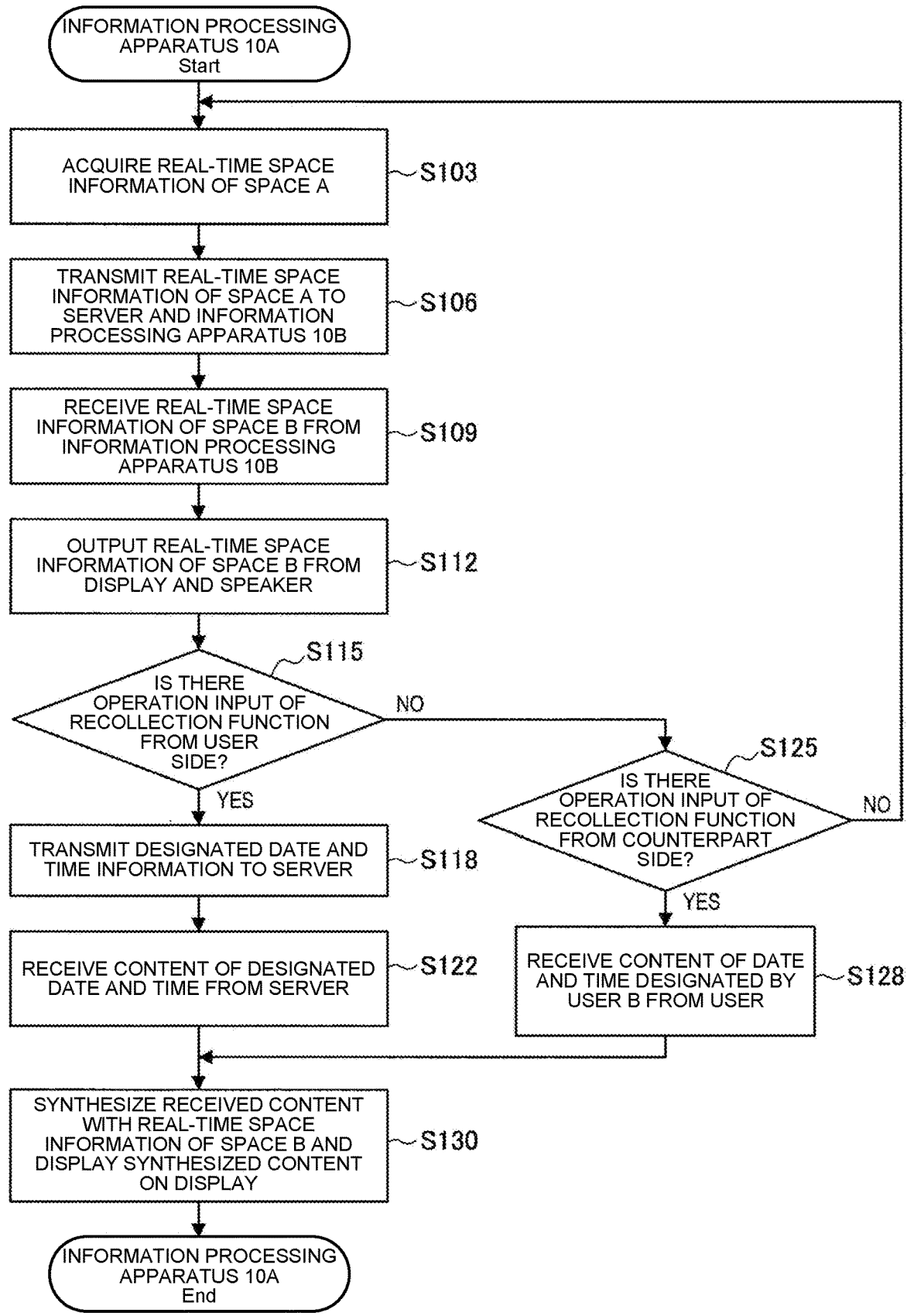
FIG. 18 is a flowchart illustrating operation processing of the information processing apparatus in a case of executing the recollection function according to the present embodiment.
Figure 19:
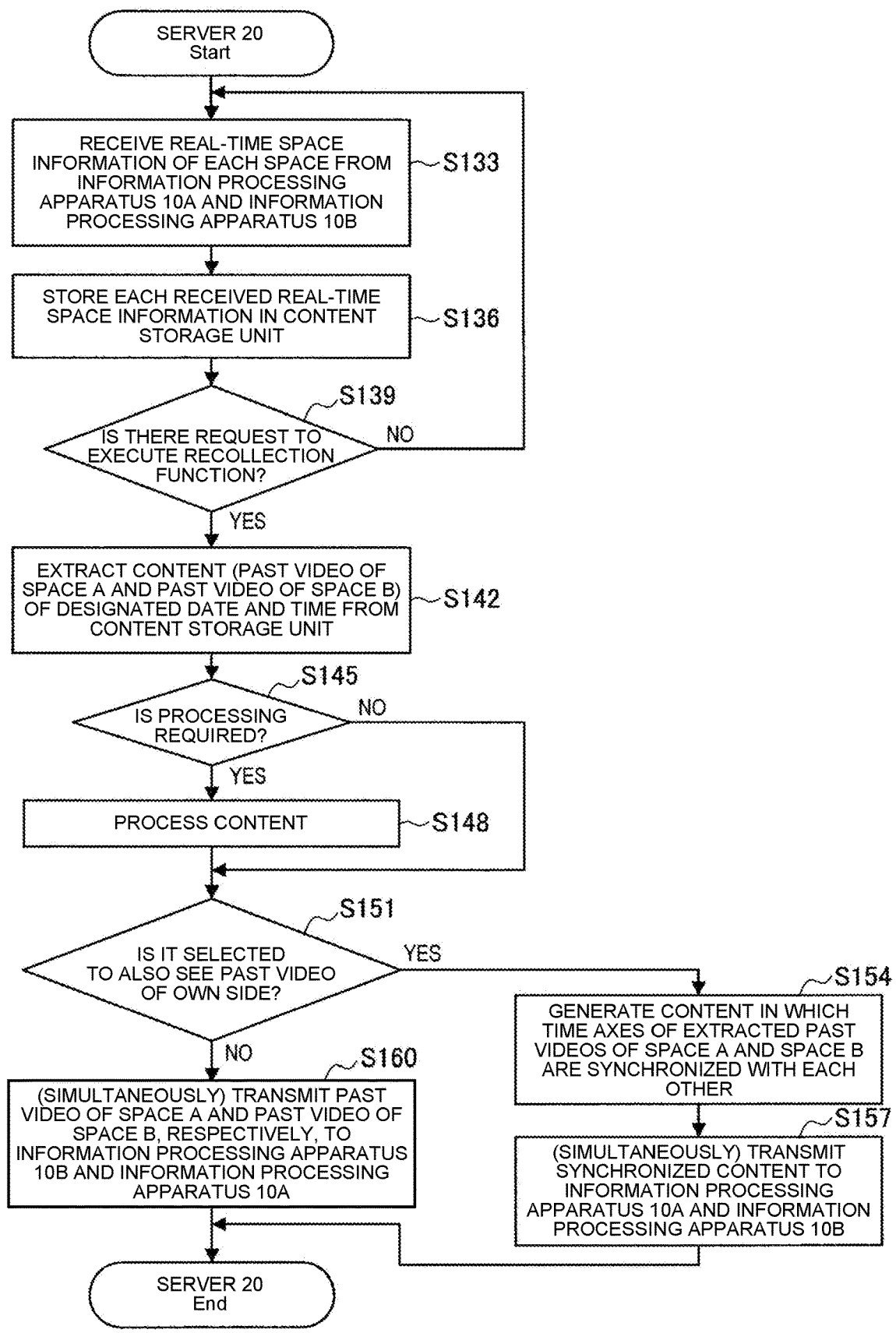
FIG. 19 is a flowchart illustrating operation processing of the server in a case of executing the recollection function according to the present embodiment.

Next, operation processing of the information processing system according to the present embodiment will be specifically described with reference to FIGS. 18 and 19. FIG. 18 is a flowchart illustrating operation processing of the information processing apparatus 10A in a case of executing the recollection function according to the present embodiment. Here, operation processing of the information processing apparatus 10A that performs input and output of the space information in space A as an example on the assumption that space A and space B are always connected to each other will be described, but the information processing apparatus 10B that performs input and output of the space information in space B can also perform similar operation processing. Further, FIG. 19 is a flowchart illustrating operation processing of the server 20 in a case of executing the recollection function according to the present embodiment.

3-1. Operation Processing of Information Processing Apparatus 10A Regarding Execution of Recollection Function As illustrated in FIG. 18, first, the information processing apparatus 10A acquires real-time space information (a video, an audio, and sensor information) of space A from the input unit 110 (step S103).

Next, the information processing apparatus 10A transmits the real-time space information of space A to the server 20 and the information processing apparatus 10B (step S106).

Next, the information processing apparatus 10A receives real-time space information of space B from the information processing apparatus 10B (step S109), and performs control to output the real-time space information of space B from the display 131A and the speaker in space A (step S112).

The information processing apparatus 10A repeats the processing of steps S103 to S112 to realize an always-on connection with space B. Note that similar processing is also performed in the information processing apparatus 10B, such that real-time space information of space A is output from the display 131B and the speaker of space B.

Next, in a case where there is an operation input of the recollection function from a user side (step S115: Yes), the information processing apparatus 10A transmits designated date and time information to the server 20 (step S118). That is, in a case where the icon 330c for the recollection function is selected and a predetermined date and time is designated by the user, as described with reference to FIGS. 5 and 6, the designated date and time are transmitted to the server 20 as a request to execute the recollection function.

Next, the information processing apparatus 10A receives the content of the designated date and time from the server 20 (step S122).

On the other hand, in a case where there is no operation input of the recollection function from the user side (step S115: No) and there is an operation input of the recollection function from the counterpart side (step S125: Yes), the information processing apparatus 10A receives a content of a date and time designated by user B (a user of the always connected counterpart space) from the server 20 (step S128).

Here, the content of the designated date and time received from the server 20 is, for example, the past video of the designated date and time of the counterpart space, a processed content processed on the basis of the past video of the designated date and time, or a synchronized content in which the past video of the space of the own side and the past video of the counterpart space in the same time zone are synchronized with each other.

Next, the information processing apparatus 10A synthesizes the received content with real-time space information (current video of space B) continuously received from space B, and displays the synthesized content on the display 131A (step S130). Examples of synthesizing the contents are as illustrated in FIGS. 7 to 16. The information processing apparatus 10A may output an audio of the past video together from the speaker.

3-2. Operation Processing of Server 20 Regarding Execution of Recollection Function Next, operation processing of the server 20 will be described with reference to FIG. 18.

As illustrated in FIG. 18, first, the server 20 receives real-time space information (a video, an audio, and sensor information) of each space (space A and space B) from the information processing apparatus 10A and the information processing apparatus 10B, respectively (step S133).

Next, the server 20 stores each received real-time space information in the content storage unit 220 (step S136).

Next, in a case where there is a request to execute the recollection function from the information processing apparatus 10A or the information processing apparatus 10B (step S139: Yes), the server 20 extracts the content (the past video of space A and the past video of space B) of the designated date and time from the content storage unit 220 (step S142).

Next, in a case where processing of the past video is required (step S145: Yes), the server 20 processes the content by the content processing unit 201 (step S148). Specifically, for example, in a case where a silhouette display is selected by the user as a display method of the recollection function, the content processing unit 201 performs processing for extracting a person from the past video and processing a silhouette of the person.

Next, in a case where it is selected for the user to also see the past video of the own side (step S151: Yes) as a display method of the recollection function, the content synchronizing unit 202 of the server 20 generates a content (synchronized content) in which time axes of the extracted past videos of space A and space B are synchronized with each other (step S154). "In a case where it is selected for the user to also see the past video of the own side", it is assumed that a display method of simultaneously seeing the past videos in the counterpart space and the space of the own side is selected, as described with reference to FIGS. 8 to 12, 15, and 16.

Then, the server 20 (simultaneously) transmits the generated synchronized content to the information processing apparatus 10A and the information processing apparatus 10B (step S157). The information processing apparatus 10A and information processing apparatus 10B display the received synchronized content (content in which the past video of space A and the past video of space B are synchronized with each other on the time axis in a designated time zone) together with the real-time videos of the counterpart spaces (see FIGS. 8 to 12, 15, and 16).

On the other hand, in a case where it is not selected for the user to also see the past video of the own side (step S151: No), the server 20 (simultaneously) transmits the extracted past video (or processed content) of space A and the extracted past video (or processed content) of space B, respectively, to the information processing apparatus 10B and the information processing apparatus 10A (step S160). The information processing apparatus 10A and the information processing apparatus 10B display the received past videos (or processed contents) together with the real-time videos of the counterpart spaces (see FIGS. 7, and 11 to 14).

Therefore, it is possible to look back on the past two-way communication together while maintaining a state where a plurality of spaces are adjacently connected to each other. Further, since the past videos and the like are simultaneously transmitted from the server 20 to the information processing apparatus 10A and the information processing apparatus 10B, playing timings of the past videos in each information processing apparatus 10 are synchronized with each other, and at the same time, the past videos and the like of the same time zone can be played back, respectively.

4. Another System Configuration Example

Figure 20:
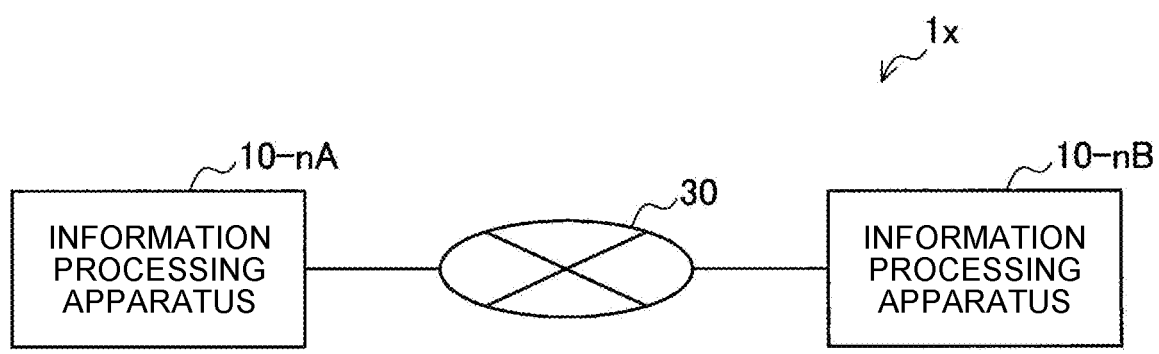
FIG. 20 is a diagram illustrating another system configuration example according to the present embodiment.

The configuration and the operation processing of the information processing system according to the embodiment of the present disclosure have been described hereinabove, but the configuration of the information processing system according to the present embodiment is not limited to the configuration illustrated in FIG. 3, that is, a server-client type system configuration including the server 20, the information processing apparatus 10A, and the information processing apparatus 10B. For example, the information processing system may be realized by a configuration that does not include the server 20, specifically, a system configuration including an information processing apparatus 10-$n$A and an information processing apparatus 10-$n$B as illustrated in FIG. 20. A configuration example and operation processing of information processing apparatuses 10-$n$ (10-1 to 10-4) in a case of such an information processing system 1x will be specifically described below using a plurality of embodiments.

4-1. First Embodiment (Configuration)

Figure 21:
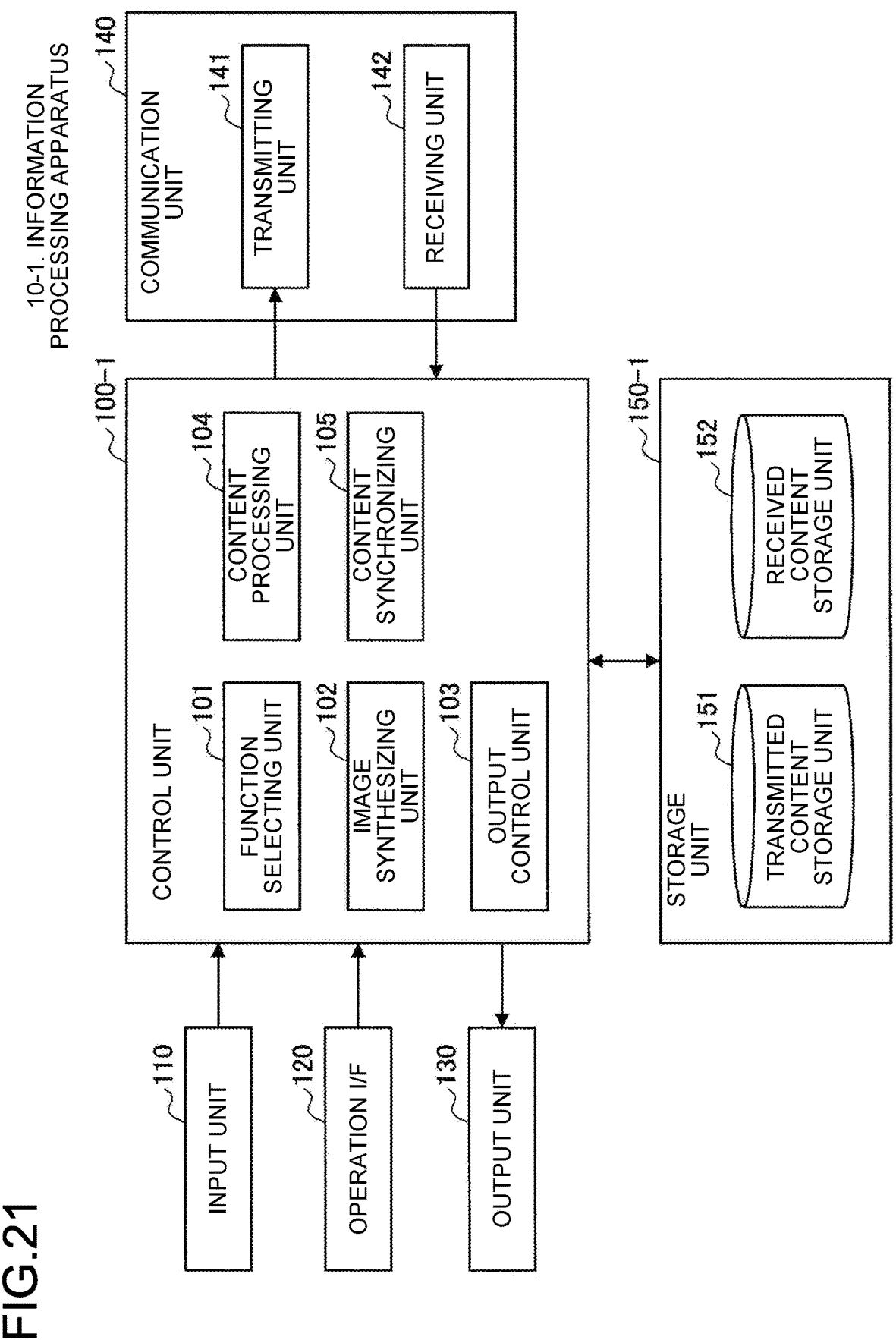
FIG. 21 is a diagram illustrating an example of a configuration of an information processing apparatus according to a first embodiment of another system configuration example.

FIG. 21 is a diagram illustrating an example of a configuration of an information processing apparatus 10-1 according to a first embodiment of another system configuration example. Note that in the first embodiment, the information processing apparatuses 10-1 in each space have the same configuration. That is, an information processing system 1-1 according to the first embodiment includes information processing apparatuses 10-1A and 10-1B. In the following description, the information processing apparatus 10-1B is simply referred to as an information processing apparatus 10B.

As illustrated in FIG. 21, the information processing apparatus 10-1 includes a control unit 100-1, an input unit 110, an operation I/F 120, an output unit 130, a communication unit 140, and a storage unit 150-1. Note that the same components as those of the configuration of the information processing apparatus 10 illustrated in FIG. 3 are denoted by the same reference numerals and a detailed description thereof are omitted. Further, here, portions different from those of the configuration described with reference to FIG. 3 will be mainly described.

The control unit 100-1 according to the present embodiment performs control to transmit real-time space information (a video, an audio, and sensor information) of a space of an own side obtained from the input unit 110 to the information processing apparatus 10B in an always connected counterpart space, and performs control to accumulate the transmitted space information in a transmitted content storage unit 151. Further, the control unit 100-1 performs control to accumulate real-time space information of the counterpart space received from the information processing apparatus 10B in a received content storage unit 152, and performs control to output the real-time space information from the output unit 130. Further, in a case where there is a recollection function execution instruction, the control unit 100-1 extracts (retrieves) a content (that is, the past video, the past audio and the like) of a designated date and time from the storage unit 150-1. Further, the control unit 100-1 also functions as a function selecting unit 101, an image synthesizing unit 102, an output control unit 103, a content processing unit 104, and a content synchronizing unit 105, as illustrated in FIG. 21.

The content processing unit 104 has a function of generating a person image by extracting only a person from a predetermined extracted past video or generating a 3D model of a person appearing in the past video from three-dimensional information based on the past video and corresponding sensor information (sensor information of the same time zone), in the use of a recollection function, similar to the content processing unit 201 described with reference to FIG. 17.

The content synchronizing unit 105 generates a content (also referred to as a synchronized content) in which the extracted predetermined past videos of space A and space B are associated (synchronized) with each other on the same time axis, in a case of displaying the past videos of both sides in each space, similar to the content synchronizing unit 202 described with reference to FIG. 17.

The storage unit 150-1 includes the transmitted content storage unit 151 and the received content storage unit 152.

In the transmitted content storage unit 151, a content transmitted to another information processing apparatus 10, specifically, space information obtained from the input unit 110 of the space of the own side, a processed content processed by the content processing unit 104, or a synchronized content synchronized by the content synchronizing unit 105 can be stored. In the received content storage unit 152, a content received from another information processing apparatus 10, specifically, real-time space information of the counterpart space, a processed content, or a synchronized content can be stored.

(Operation Processing)

Figure 22:
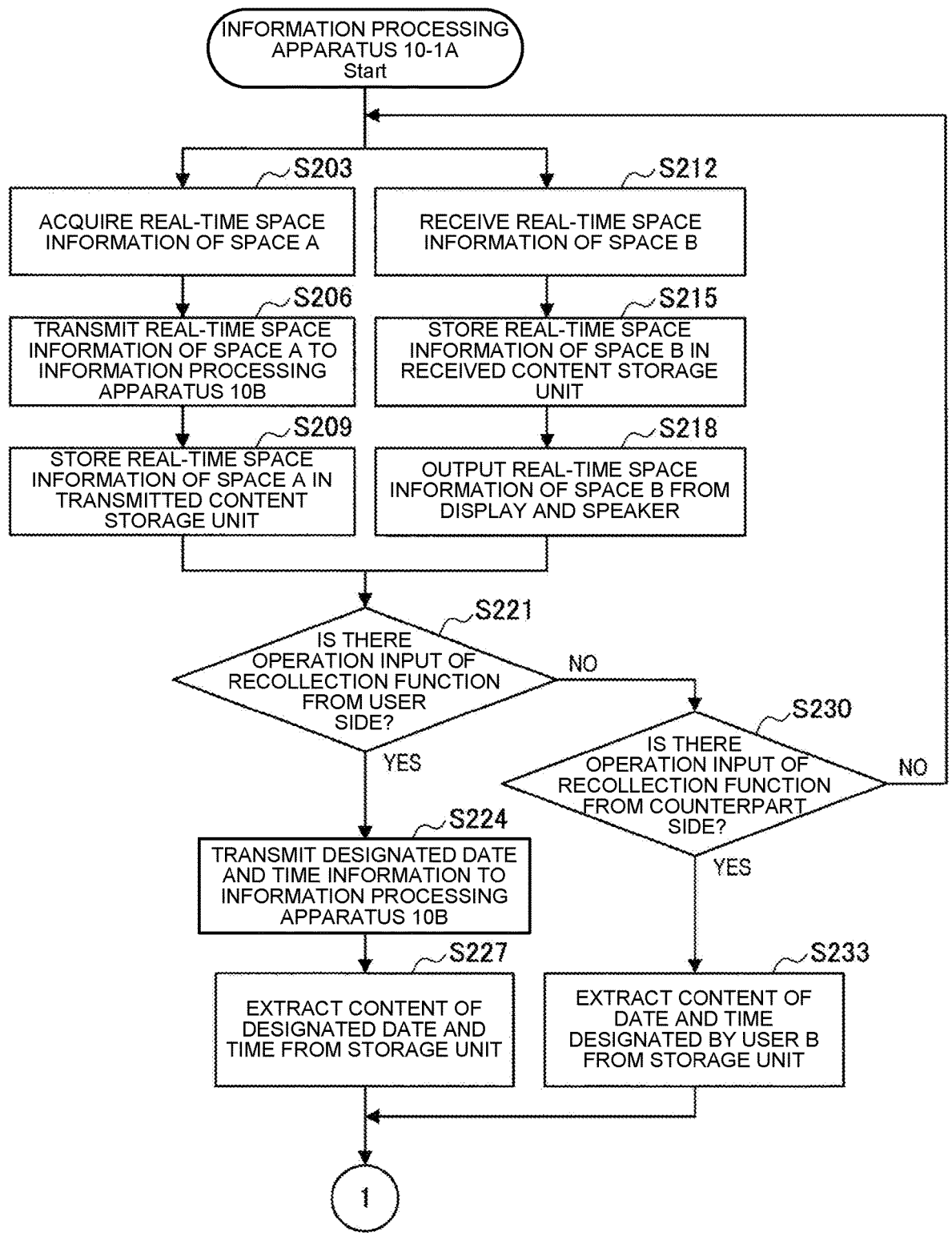
FIG. 22 is a flowchart illustrating operation processing of the information processing apparatus according to the first embodiment of another system configuration example.
Figure 23:
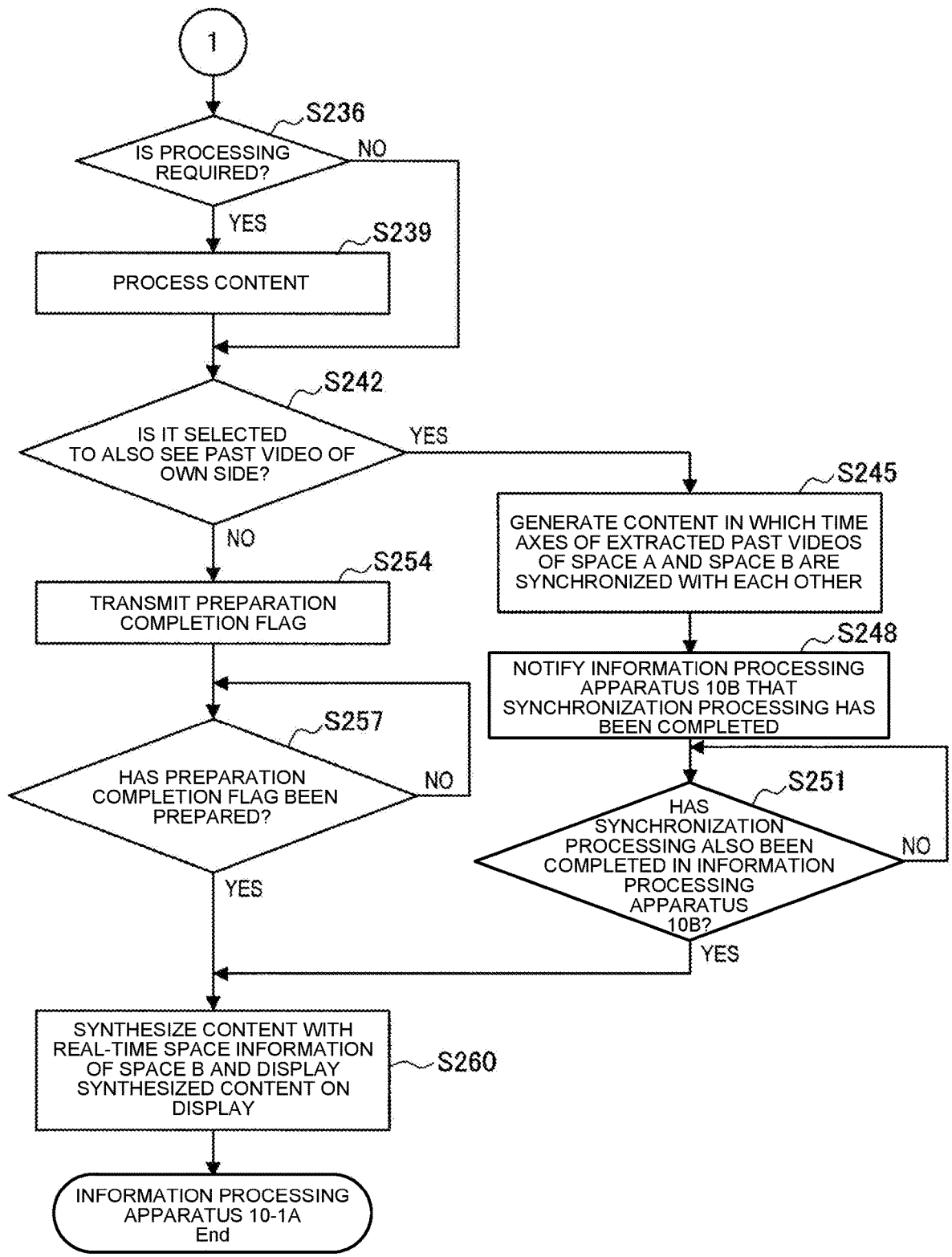
FIG. 23 is a flowchart illustrating operation processing of the information processing apparatus according to the first embodiment of another system configuration example.

FIGS. 22 and 23 are flowcharts illustrating operation processing of the information processing apparatus 10-1A according to the first embodiment of another system configuration example.

As illustrated in FIG. 22, first, the information processing apparatus 10-1A acquires real-time space information (a video, an audio, and sensor information) of space A (step S203), transmits the real-time space information of space A to the information processing apparatus 10B in space B that is an always connected adjacent space (step S206), and stores the real-time space information transmitted to the information processing apparatus 10B in the transmitted content storage unit 151 (step S209).

Further, the information processing apparatus 10-1A receives real-time space information (a video, an audio, and sensor information) of space B from the information processing apparatus 10B (step S212), and stores the real-time space information of space B in the received content storage unit 152 (step S215).

Next, the information processing apparatus 10-1A outputs the real-time space information of space B from a display 131A and a speaker of space A (step S218).

The information processing apparatus 10-1A repeats the processing of steps S203 to S218 to realize an always-on connection with space B. Further, similar processing is also performed in the information processing apparatus 10B, such that real-time space information of space A is output from a display 131B and a speaker of space B.

As such, in the information processing apparatus 10-1 according to the first embodiment, the content transmitted to the counterpart space, that is, the space information of the space of the own side, and the content received from the counterpart space, that is, the space information of the counterpart space are accumulated in the storage unit 150-1.

Next, in a case where there is an operation input of the recollection function from a user side (step S221: Yes), the information processing apparatus 10-1A transmits designated date and time information to the information processing apparatus 10B (step S224).

Next, the information processing apparatus 10-1A extracts a content (past video) of the designated date and time from the storage unit 150-1 (step S227).

On the other hand, in a case where there is no operation input of the recollection function from the user side (step S221: No) and there is an operation input of the recollection function from the counterpart side (step S230: Yes), the information processing apparatus 10-1A extracts a content (past video) of a date and time designated by user B (a user of the always connected counterpart space) from the storage unit 150-1 (step S233).

Here, the content of the designated date and time extracted from the storage unit 150-1 is the past video of the counterpart space stored in the received content storage unit 152, or is the past video of the space of the own side stored in the transmitted content storage unit 151 if necessary.

Next, in a case where processing of the past video is required (step S236: Yes), the information processing apparatus 10-1A processes the content by the content processing unit 104 (step S239). Specifically, for example, in a case where a silhouette display is selected by the user as a display method of the recollection function, the content processing unit 104 performs processing for extracting a person from the past video and processing a silhouette of the person.

Next, in a case where it is selected for the user to also see the past video of the own side (step S242: Yes) as a display method of the recollection function, the information processing apparatus 10-1A generates a content (synchronized content) in which time axes of the extracted past videos of space A (own side) and space B (counterpart side) are synchronized with each other by the content synchronizing unit 105 (step S245).

Next, the information processing apparatus 10-1A notifies the information processing apparatus 10B that synchronization processing has been completed (step S248).

Next, the information processing apparatus 10-1A confirms whether or not the synchronization processing has also been completed in the information processing apparatus 10B (step S257). In the present embodiment, the information processing apparatus 10B also has a similar configuration, and performs operation processing similar to the processing illustrated in FIGS. 22 and 23. Therefore, when it is selected for the user to also see the past video of the own side, the synchronization processing is also performed in the information processing apparatus 10B. Then, in a case where the synchronization processing has been completed in the information processing apparatus 10B, a notification indicating that the synchronization processing has been completed is transmitted from the information processing apparatus 10B. Therefore, the information processing apparatus 10B can also confirm whether or not the synchronization processing has been completed.

On the other hand, in a case where it is not selected for the user to also see the past video of the own side (step S242: No), the information processing apparatus 10-1A transmits a preparation completion flag to the information processing apparatus 10B (step S254).

Next, the information processing apparatus 10-1A confirms whether or not the preparation completion flag has been prepared (step S257). As described above, the information processing apparatus 10B also performs the operation processing similar to the processing illustrated in FIGS. 22 and 23, and thus, a preparation completion flag is also transmitted from the information processing apparatus 10B. The information processing apparatus 10-1A transmits the preparation completion flag to the information processing apparatus 10B, and determines that the preparation completion flags has been prepared in a case where the preparation completion flag is also transmitted from the information processing apparatus 10B.

Then, in a case where the synchronization processing has also been completed in the information processing apparatus 10B (step S251: Yes) or in a case where the preparation completion flag has been prepared (step S257: Yes), the information processing apparatus 10-1A displays the extracted past video (or the processed content or the synchronized content) of the counterpart space (space B) together with the real-time video of the counterpart space (or in a state of synthesizing the extracted past video (or the processed content or the synchronized content) of the counterpart space (space B) with the real-time video of the counterpart space) (step S260).

Therefore, it is possible to look back on the past two-way communication together while maintaining a state where the counterpart spaces are adjacently connected to each other. Further, since the display of the past videos and the like is performed at a timing when both of the information processing apparatus 10-1A and the information processing apparatus 10-1B have completed preparation (or have completed the synchronization processing), playing timings of the past videos in each information processing apparatus 10-1 are synchronized with each other, and at the same time, the past videos and the like of the same time zone can be played back, respectively.

4-2. Second Embodiment (Configuration)

Figure 24:
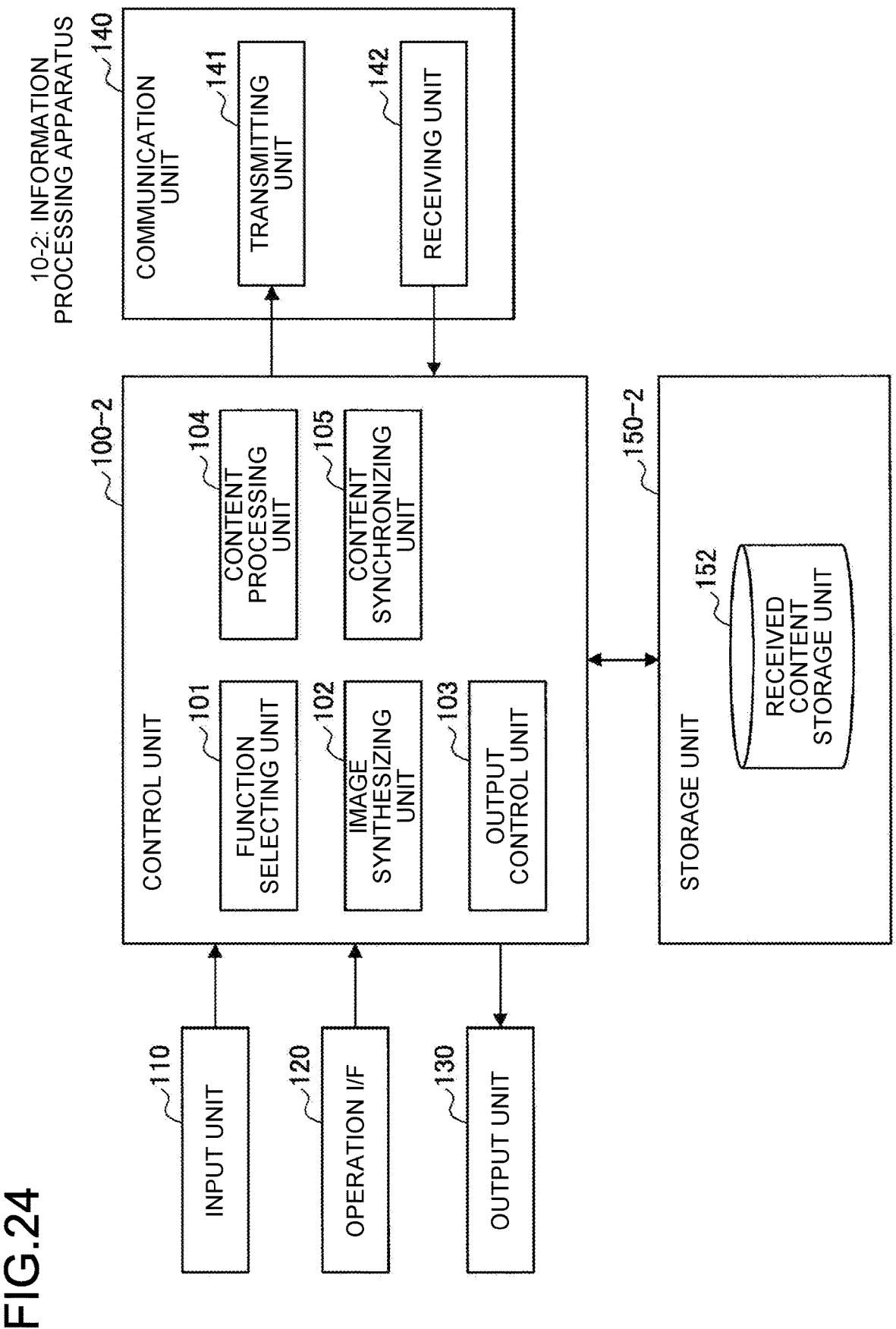
FIG. 24 is a diagram illustrating an example of a configuration of an information processing apparatus according to a second embodiment of another system configuration example.

FIG. 24 is a diagram illustrating an example of a configuration of an information processing apparatus 10-2 according to a first embodiment of another system configuration example. Note that in the second embodiment, the information processing apparatuses 10-2 in each space have the same configuration. That is, an information processing system 1-2 according to the second embodiment includes information processing apparatuses 10-2A and 10-2B. In the following description, the information processing apparatus 10-2B is simply referred to as an information processing apparatus 10B.

As illustrated in FIG. 24, the information processing apparatus 10-2 includes a control unit 100-2, an input unit 110, an operation I/F 120, an output unit 130, a communication unit 140, and a storage unit 150-2. Note that the same components as those of the configuration of the information processing apparatus 10 illustrated in FIG. 3 are denoted by the same reference numerals and a detailed description thereof are omitted. Further, here, portions different from those of the configuration described with reference to FIG. 3 will be mainly described.

The control unit 100-2 according to the present embodiment performs control to transmit real-time space information (a video, an audio, and sensor information) of a space of an own side obtained from the input unit 110 to the information processing apparatus 10B in an always connected counterpart space. Further, the control unit 100-2 performs control to accumulate real-time space information of the counterpart space received from the information processing apparatus 10B in a received content storage unit 152, and performs control to output the real-time space information from the output unit 130. Further, in a case where there is a recollection function execution instruction, the control unit 100-2 extracts (retrieves) a content (that is, the past video, the past audio and the like) of a designated date and time from the received content storage unit 152.

Further, the control unit 100-2 also functions as a function selecting unit 101, an image synthesizing unit 102, an output control unit 103, a content processing unit 104, and a content synchronizing unit 105, as illustrated in FIG. 24. The content processing unit 104 and the content synchronizing unit 105 are as described with reference to FIG. 21.

The storage unit 150-2 includes the received content storage unit 152. In the received content storage unit 152, similar to FIG. 21, a content received from another information processing apparatus 10, specifically, real-time space information of the counterpart space, a processed content, or a synchronized content can be stored.

(Operation Processing)

Figure 25:
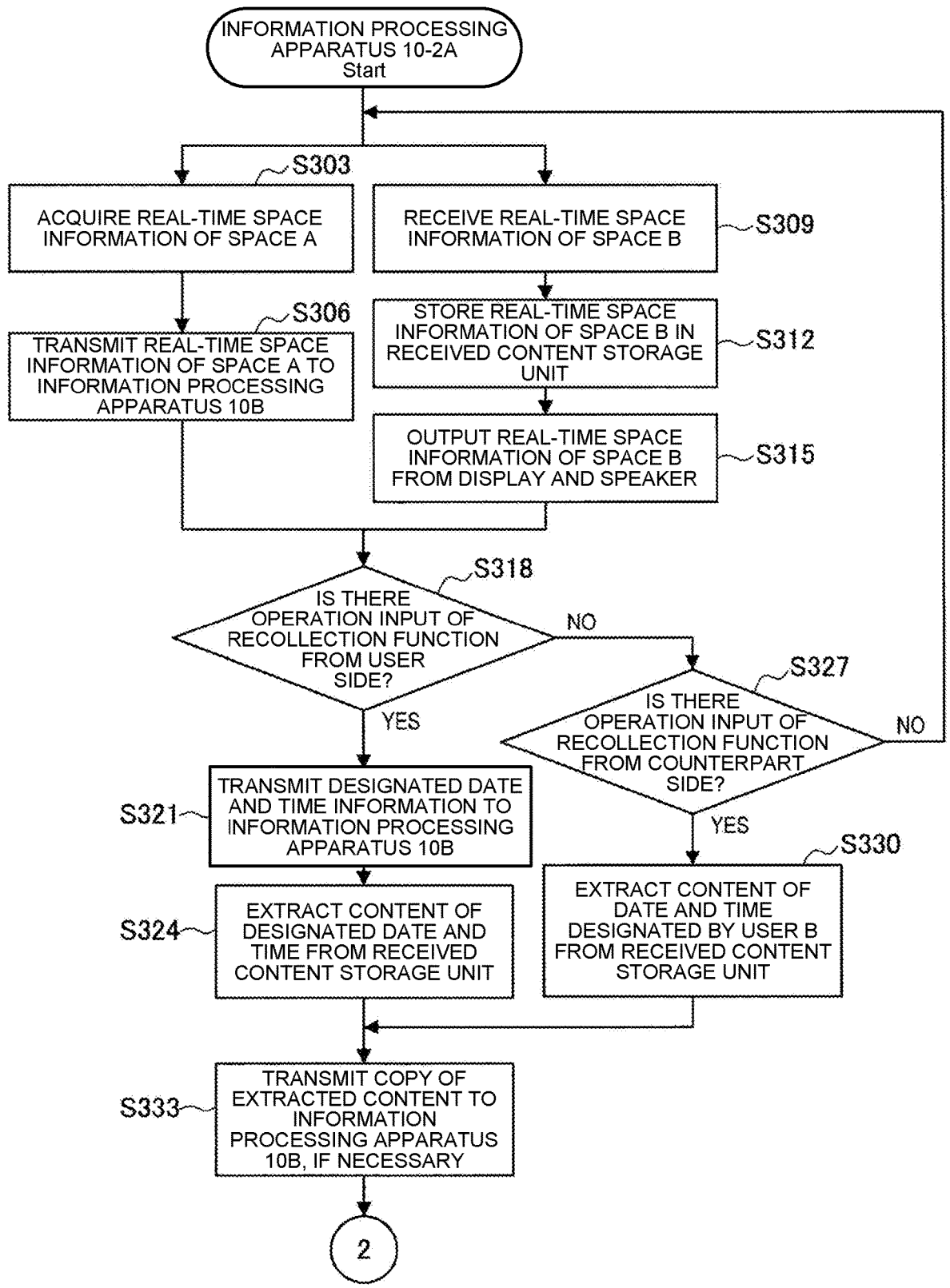
FIG. 25 is a flowchart illustrating operation processing of the information processing apparatus according to the second embodiment of another system configuration example.
Figure 26:
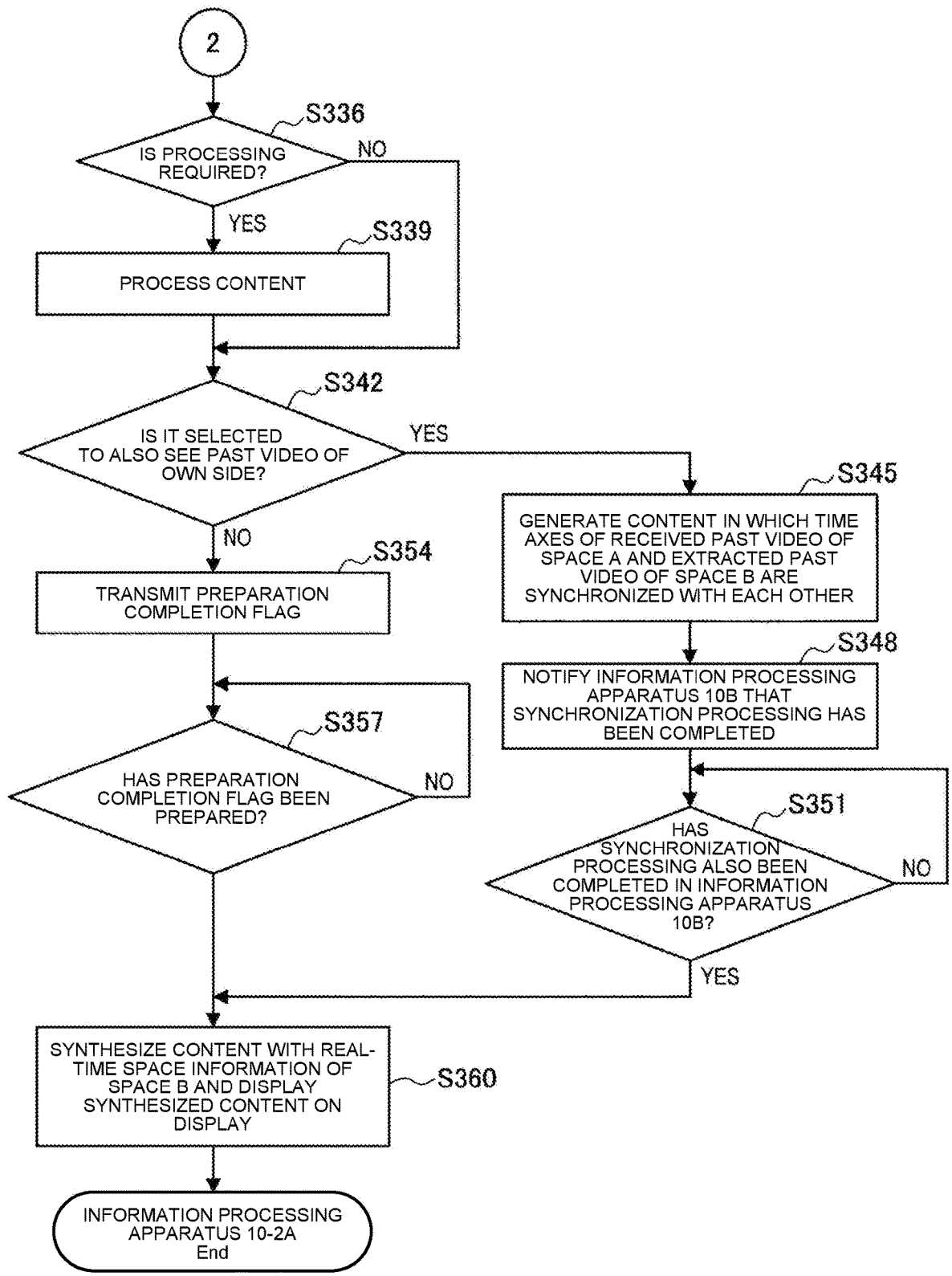
FIG. 26 is a flowchart illustrating operation processing of the information processing apparatus according to the second embodiment of another system configuration example.

FIGS. 25 and 26 are flowcharts illustrating operation processing of the information processing apparatus 10-2A according to the second embodiment of another system configuration example.

As illustrated in FIG. 25, first, the information processing apparatus 10-2A acquires real-time space information (a video, an audio, and sensor information) of space A (step S303), and transmits the real-time space information of space A to the information processing apparatus 10B in space B that is an always connected adjacent space (step S306).

Further, the information processing apparatus 10-2A receives real-time space information (a video, an audio, and sensor information) of space B from the information processing apparatus 10B (step S309), and stores the real-time space information of space B in the received content storage unit 152 (step S312).

Next, the information processing apparatus 10-2A outputs the real-time space information of space B from a display 131A and a speaker of space A (step S315).

The information processing apparatus 10-2A repeats the processing of steps S303 to S315 to realize an always-on connection with space B. Further, similar processing is also performed in the information processing apparatus 10B, such that real-time space information of space A is output from a display 131B and a speaker of space B.

As such, in the information processing apparatus 10-2 according to the second embodiment, the content transmitted to the counterpart space, that is, the space information of the space of the own side is not stored, and the content received from the counterpart space, that is, the space information of the counterpart space is accumulated in the storage unit 150-2.

Next, in a case where there is an operation input of the recollection function from a user side (step S318: Yes), the information processing apparatus 10-2A transmits designated date and time information to the information processing apparatus 10B (step S321).

Next, the information processing apparatus 10-2A extracts a content (the past video of the counterpart space) of the designated date and time from the received content storage unit 152 (step S324).

On the other hand, in a case where there is no operation input of the recollection function from the user side (step S318: No) and there is an operation input of the recollection function from the counterpart side (step S327: Yes), the information processing apparatus 10-2A extracts a content (the past video of the counterpart space) of a date and time designated by user B (a user of the always connected counterpart space) from the received content storage unit 152 (step S330).

Next, if necessary, a copy of the extracted content (the past video of the counterpart space) is transmitted to the information processing apparatus 10B (step S333). In a phrase "if necessary", specifically, it is assumed that in a display method of the recollection function, it is selected to also see the past video of the own side. In this case, as described with reference to FIGS. 8 to 12, 15, and 16, the past videos of both of the counterpart space and the space of the own side are required, but in the present embodiment, only the past video of the counterpart space is stored, and the past video of the space of the own side, that is, the past video of space B is thus required in the information processing apparatus 10B. Therefore, the information processing apparatus 10-1A performs control to transmit a copy of the past video of the counterpart space (that is, the past video of space B) to the information processing apparatus 10B. Since such control is similarly performed also in the information processing apparatus 10B, the information processing apparatus 10-1A can receive the past video of the space of the own side, that is, the past video of space A, from the information processing apparatus 10B.

Next, in a case where processing of the past video is required (step S336: Yes), the information processing apparatus 10-2A processes the content by the content processing unit 104 (step S339). Specifically, for example, in a case where a silhouette display is selected by the user as a display method of the recollection function, the content processing unit 104 performs processing for extracting a person from the past video and processing a silhouette of the person.

Next, in a case where it is selected for the user to also see the past video of the own side (step S342: Yes) as a display method of the recollection function, the information processing apparatus 10-2A generates a content (synchronized content) in which time axes of the received past video of space A (own side) and the extracted past video of space B (counterpart side) are synchronized with each other by the content synchronizing unit 105 (step S345).

Next, the information processing apparatus 10-2A notifies the information processing apparatus 10B that synchronization processing has been completed (step S348).

Next, the information processing apparatus 10-2A confirms whether or not the synchronization processing has also been completed in the information processing apparatus 10B (step S351).

On the other hand, in a case where it is not selected for the user to also see the past video of the own side (step S342: No), the information processing apparatus 10-2A transmits a preparation completion flag to the information processing apparatus 10B (step S354).

Next, the information processing apparatus 10-2A confirms whether or not the preparation completion flag has been prepared (step S357).

Then, in a case where the synchronization processing has also been completed in the information processing apparatus 10B (step S351: Yes) or in a case where the preparation completion flag has been prepared (step S357: Yes), the information processing apparatus 10-2A displays the extracted past video (or the processed content or the synchronized content) of the counterpart space (space B) together with the real-time video of the counterpart space (or in a state of synthesizing the extracted past video (or the processed content or the synchronized content) of the counterpart space (space B) with the real-time video of the counterpart space) (step S360).

Therefore, it is possible to look back on the past two-way communication together while maintaining a state where the counterpart spaces are adjacently connected to each other. Further, since the display of the past videos and the like is performed at a timing when both of the information processing apparatus 10-2A and the information processing apparatus 10-2B have completed preparation (or have completed the synchronization processing), playing timings of the past videos in each information processing apparatus 10-2 are synchronized with each other, and at the same time, the past videos and the like of the same time zone can be played back, respectively.

4-3. Third Embodiment (Configuration)

Figure 27:
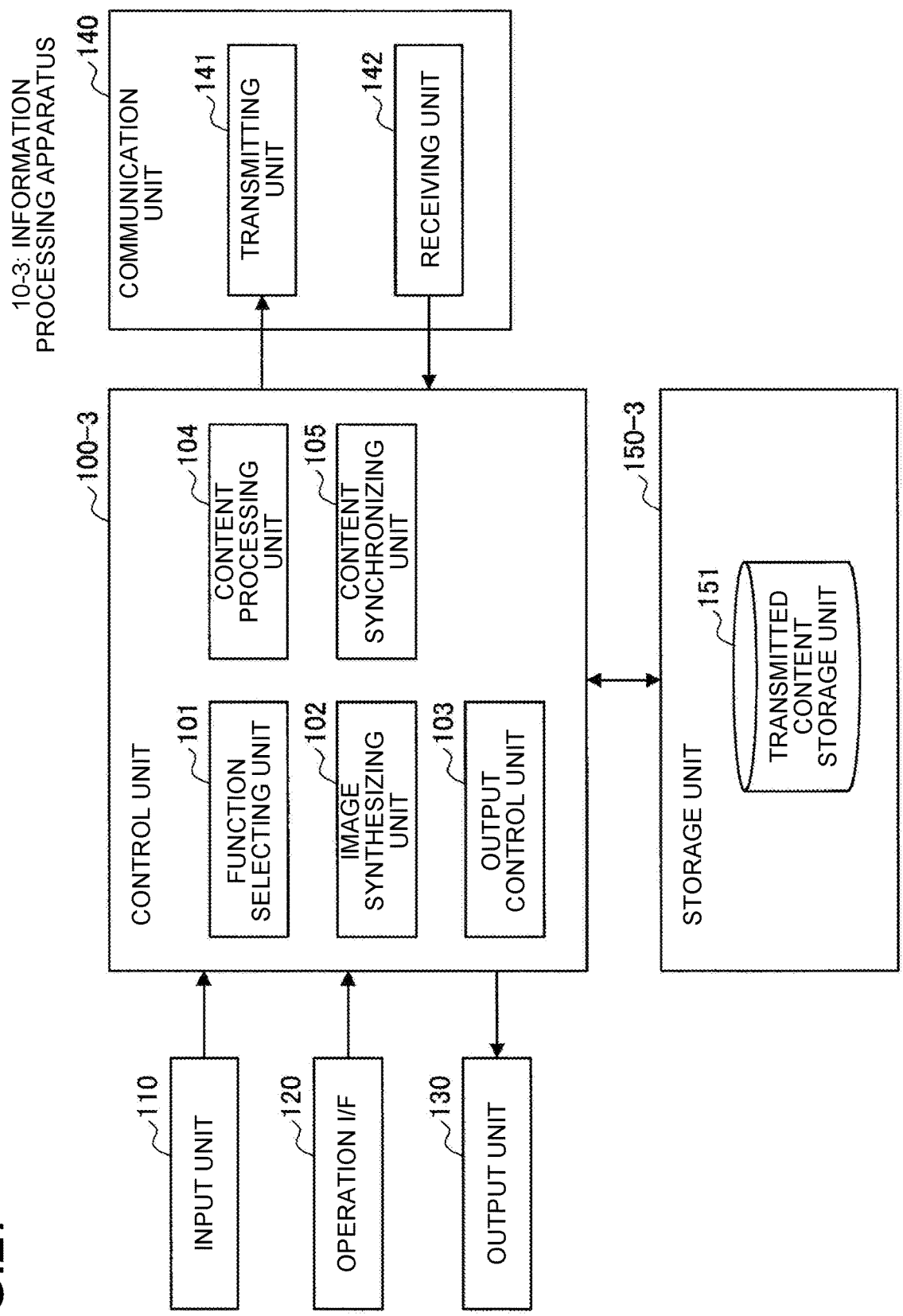
FIG. 27 is a diagram illustrating an example of a configuration of an information processing apparatus according to a third embodiment of another system configuration example.

FIG. 27 is a diagram illustrating an example of a configuration of an information processing apparatus 10-3 according to a third embodiment of another system configuration example. Note that in the third embodiment, the information processing apparatuses 10-3 in each space have the same configuration. That is, an information processing system 1-3 according to the third embodiment includes information processing apparatuses 10-3A and 10-3B. In the following description, the information processing apparatus 10-3B is simply referred to as an information processing apparatus 10B.

As illustrated in FIG. 27, the information processing apparatus 10-3 includes a control unit 100-3, an input unit 110, an operation I/F 120, an output unit 130, a communication unit 140, and a storage unit 150-3. Note that the same components as those of the configuration of the information processing apparatus 10 illustrated in FIG. 3 are denoted by the same reference numerals and a detailed description thereof are omitted. Further, here, portions different from those of the configuration described with reference to FIG. 3 will be mainly described.

The control unit 100-3 according to the present embodiment performs control to transmit real-time space information (a video, an audio, and sensor information) of a space of an own side obtained from the input unit 110 to the information processing apparatus 10B in an always connected counterpart space, and performs control to accumulate the transmitted space information in a transmitted content storage unit 151. Further, the control unit 100-3 performs control to output real-time space information of the counterpart space received from the information processing apparatus 10B from the output unit 130. Further, in a case where there is a recollection function execution instruction, the control unit 100-2 extracts (retrieves) a content (that is, the past video, the past audio and the like) of a designated date and time from the transmitted content storage unit 151.

Further, the control unit 100-3 also functions as a function selecting unit 101, an image synthesizing unit 102, an output control unit 103, a content processing unit 104, and a content synchronizing unit 105, as illustrated in FIG. 27. The content processing unit 104 and the content synchronizing unit 105 are as described with reference to FIG. 21.

The storage unit 150-3 includes the transmitted content storage unit 151. In the transmitted content storage unit 151, a content transmitted to another information processing apparatus 10, specifically, space information obtained from the input unit 110 of the space of the own side, a processed content processed by the content processing unit 104, or a synchronized content synchronized by the content synchronizing unit 105 can be stored.

(Operation Processing)

Figure 28:
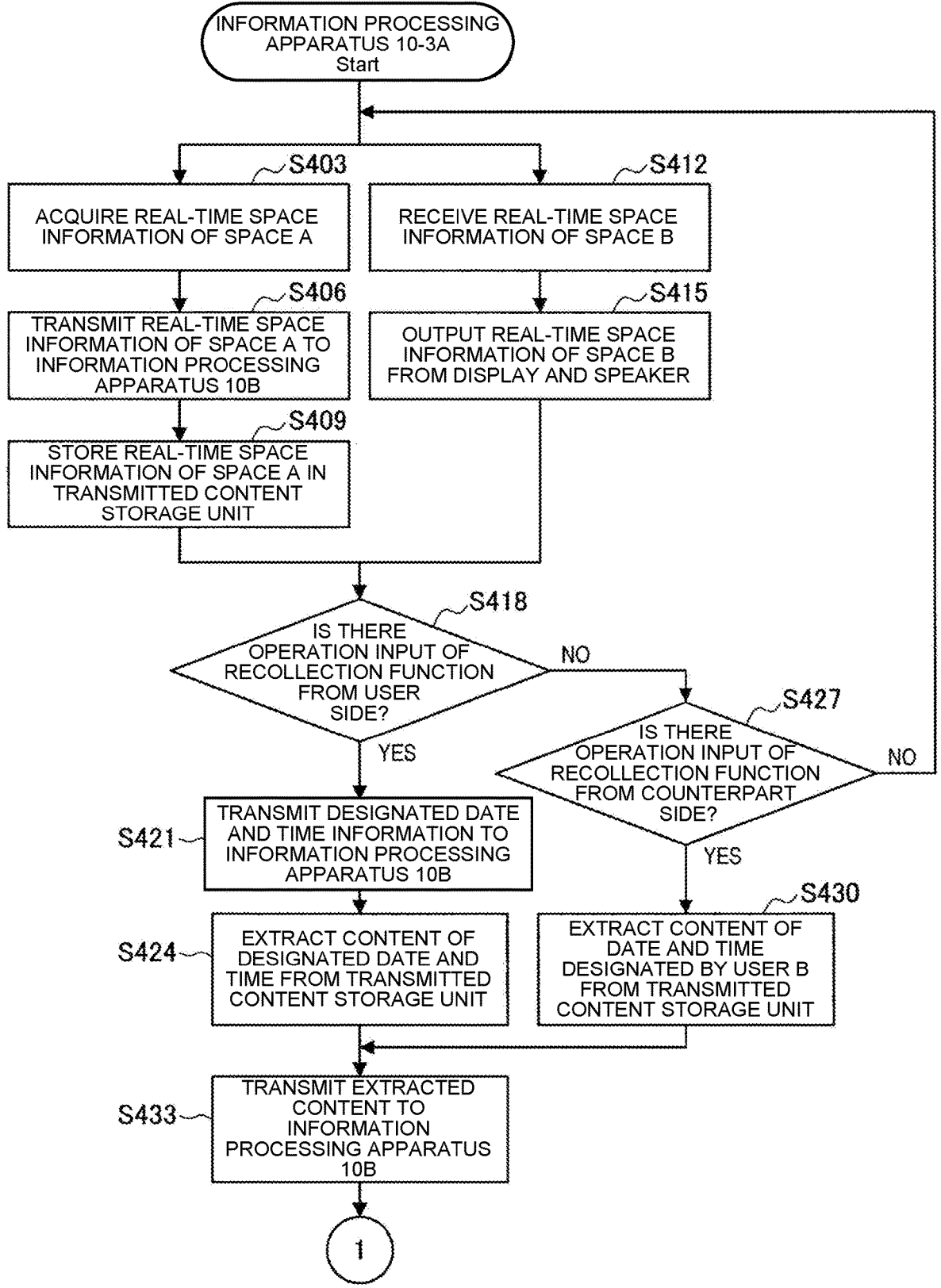
FIG. 28 is a flowchart illustrating operation processing of the information processing apparatus according to the third embodiment of another system configuration example.
Figure 29:
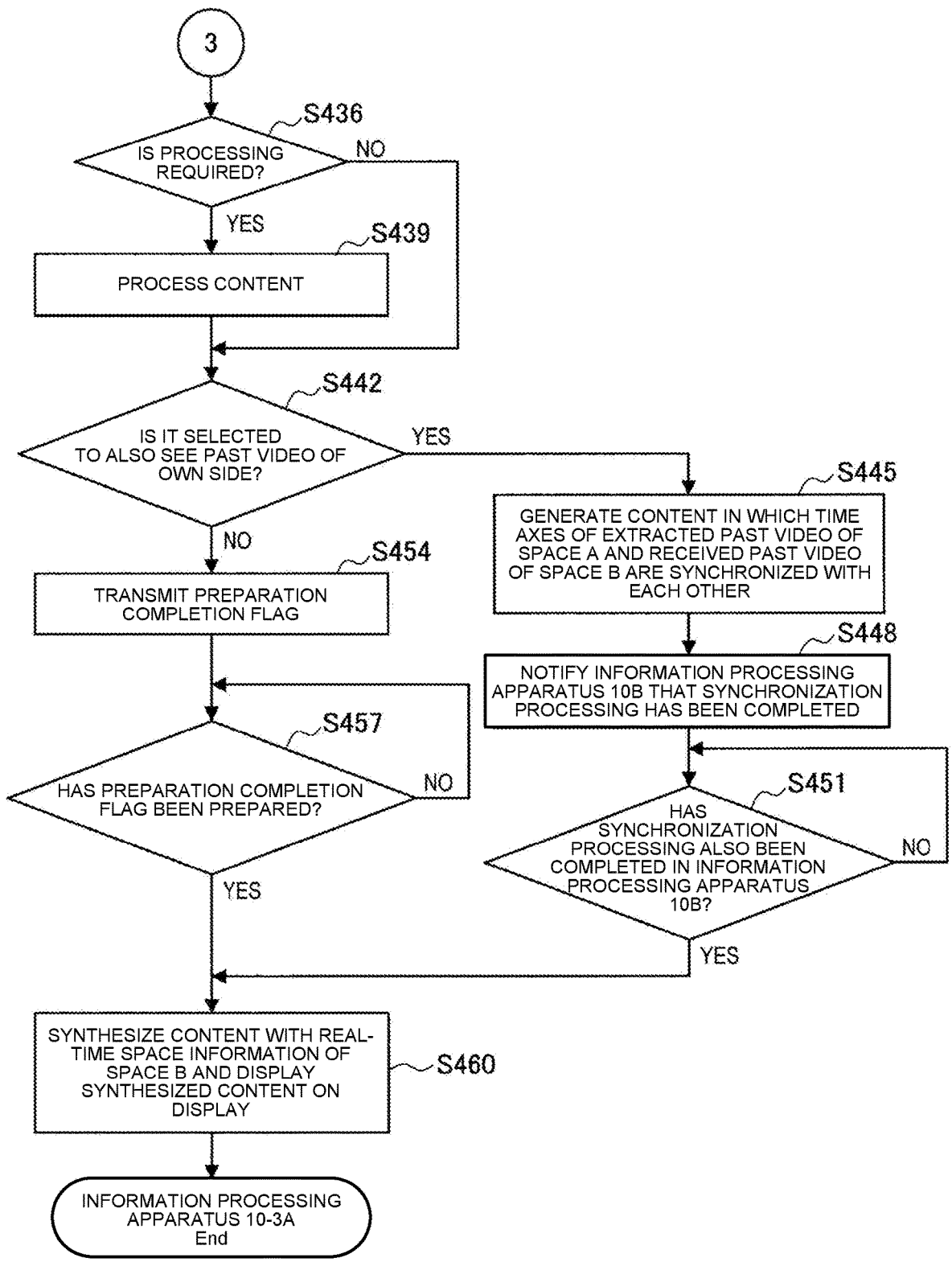
FIG. 29 is a flowchart illustrating operation processing of the information processing apparatus according to the third embodiment of another system configuration example.

FIGS. 28 and 29 are flowcharts illustrating operation processing of the information processing apparatus 10-3A according to the third embodiment of another system configuration example.

As illustrated in FIG. 28, first, the information processing apparatus 10-3A acquires real-time space information (a video, an audio, and sensor information) of space A (step S403), transmits the real-time space information of space A to the information processing apparatus 10B in space B that is an always connected adjacent space (step S406), and stores the real-time space information transmitted to the information processing apparatus 10B in the transmitted content storage unit 151 (step S409).

Further, the information processing apparatus 10-3A receives real-time space information (a video, an audio, and sensor information) of space B from the information processing apparatus 10B (step S412), and outputs the real-time space information of space B from a display 131A and a speaker of space A (step S415).

The information processing apparatus 10-1A repeats the processing of steps S403 to S415 to realize an always-on connection with space B. Further, similar processing is also performed in the information processing apparatus 10B, such that real-time space information of space A is output from a display 131B and a speaker of space B.

As such, in the information processing apparatus 10-3 according to the third embodiment, the content transmitted to the counterpart space, that is, the space information of the space of the own side is stored in the transmitted content storage unit 151, and the content received from the counterpart space is not stored.

Next, in a case where there is an operation input of the recollection function from a user side (step S418: Yes), the information processing apparatus 10-3A transmits designated date and time information to the information processing apparatus 10B (step S421).

Next, the information processing apparatus 10-3A extracts a content (the past video of the space of the own side) of the designated date and time from the transmitted content storage unit 151 (step S424).

On the other hand, in a case where there is no operation input of the recollection function from the user side (step S418: No) and there is an operation input of the recollection function from the counterpart side (step S427: Yes), the information processing apparatus 10-3A extracts a content (the past video of the space of the own side) of a date and time designated by user B (a user of the always connected counterpart space) from the transmitted content storage unit 151 (step S430).

Next, the extracted content (the past video of the space of the own side) is transmitted to the information processing apparatus 10B (step S433). At least the past video of the counterpart space is required to display the recollection function, but in the present embodiment, only the past video of the space of the own side is stored, and the past video of the counterpart space, that is, the past video of space A is thus required in the information processing apparatus 10B. Therefore, the information processing apparatus 10-3A performs control to transmit the past video of the space of the own side (that is, the past video of space A) to the information processing apparatus 10B. Since such control is similarly performed also in the information processing apparatus 10B, the information processing apparatus 10-3A can receive the past video of the counterpart space, that is, the past video of space B, from the information processing apparatus 10B.

Next, in a case where processing of the past video is required (step S436: Yes), the information processing apparatus 10-3A processes the content by the content processing unit 104 (step S439).

Next, in a case where it is selected for the user to also see the past video of the own side (step S442: Yes) as a display method of the recollection function, the information processing apparatus 10-3A generates a content (synchronized content) in which time axes of the extracted past video of space A (own side) and the received past video of space B (counterpart side) are synchronized with each other by the content synchronizing unit 105 (step S445).

Next, the information processing apparatus 10-3A notifies the information processing apparatus 10B that synchronization processing has been completed (step S448).

Next, the information processing apparatus 10-3A confirms whether or not the synchronization processing has also been completed in the information processing apparatus 10B (step S451).

On the other hand, in a case where it is not selected for the user to also see the past video of the own side (step S442: No), the information processing apparatus 10-3A transmits a preparation completion flag to the information processing apparatus 10B (step S454).

Next, the information processing apparatus 10-3A confirms whether or not the preparation completion flag has been prepared (step S457).

Then, in a case where the synchronization processing has also been completed in the information processing apparatus 10B (step S451: Yes) or in a case where the preparation completion flag has been prepared (step S457: Yes), the information processing apparatus 10-3A displays the received past video (or the processed content or the synchronized content) of the counterpart space (space B) together with the real-time video of the counterpart space (or in a state of synthesizing the received past video (or the processed content or the synchronized content) of the counterpart space (space B) with the real-time video of the counterpart space) (step S460).

Therefore, it is possible to look back on the past two-way communication together while maintaining a state where the counterpart spaces are adjacently connected to each other. Further, since the display of the past videos and the like is performed at a timing when both of the information processing apparatus 10-3A and the information processing apparatus 10-3B have completed preparation (or have completed the synchronization processing), playing timings of the past videos in each information processing apparatus 10-3 are synchronized with each other, and at the same time, the past videos and the like of the same time zone can be played back, respectively.

4-4. Fourth Embodiment (Configuration)

Figure 30:
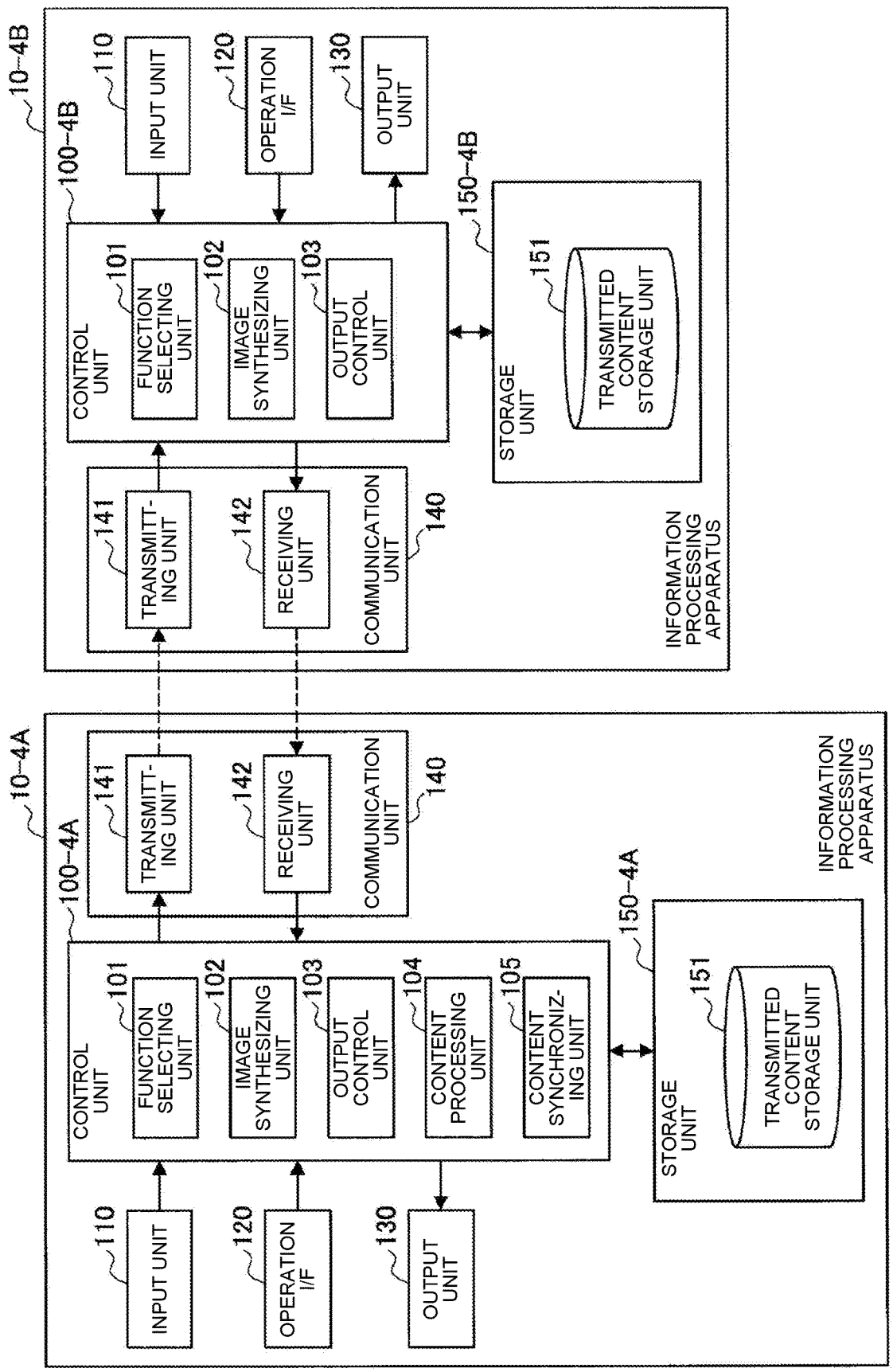
FIG. 30 is a diagram illustrating an example of a configuration of an information processing apparatus according to a fourth embodiment of another system configuration example.

FIG. 30 is a diagram illustrating an example of a configuration of an information processing apparatus 10-4 according to a fourth embodiment of another system configuration example. An information processing system 1-4 according to the fourth embodiment includes information processing apparatuses 10-4A and 10-4B. Here, one information processing apparatus 10-4 includes a "content processing unit" and a "content synchronizing unit".

As illustrated in FIG. 30, the information processing apparatus 10-4A includes a control unit 100-4A, an input unit 110, an operation I/F 120, an output unit 130, a communication unit 140, and a storage unit 150-4A, and the control unit 100-4A also functions as a content processing unit 104 and a content synchronizing unit 105.

On the other hand, the information processing apparatus 10-4B includes a control unit 100-4B, an input unit 110, an operation I/F 120, an output unit 130, a communication unit 140, and a storage unit 150-4B, and the control unit 100-4B does not have a content processing function or a content synchronizing function.

Figure 31:
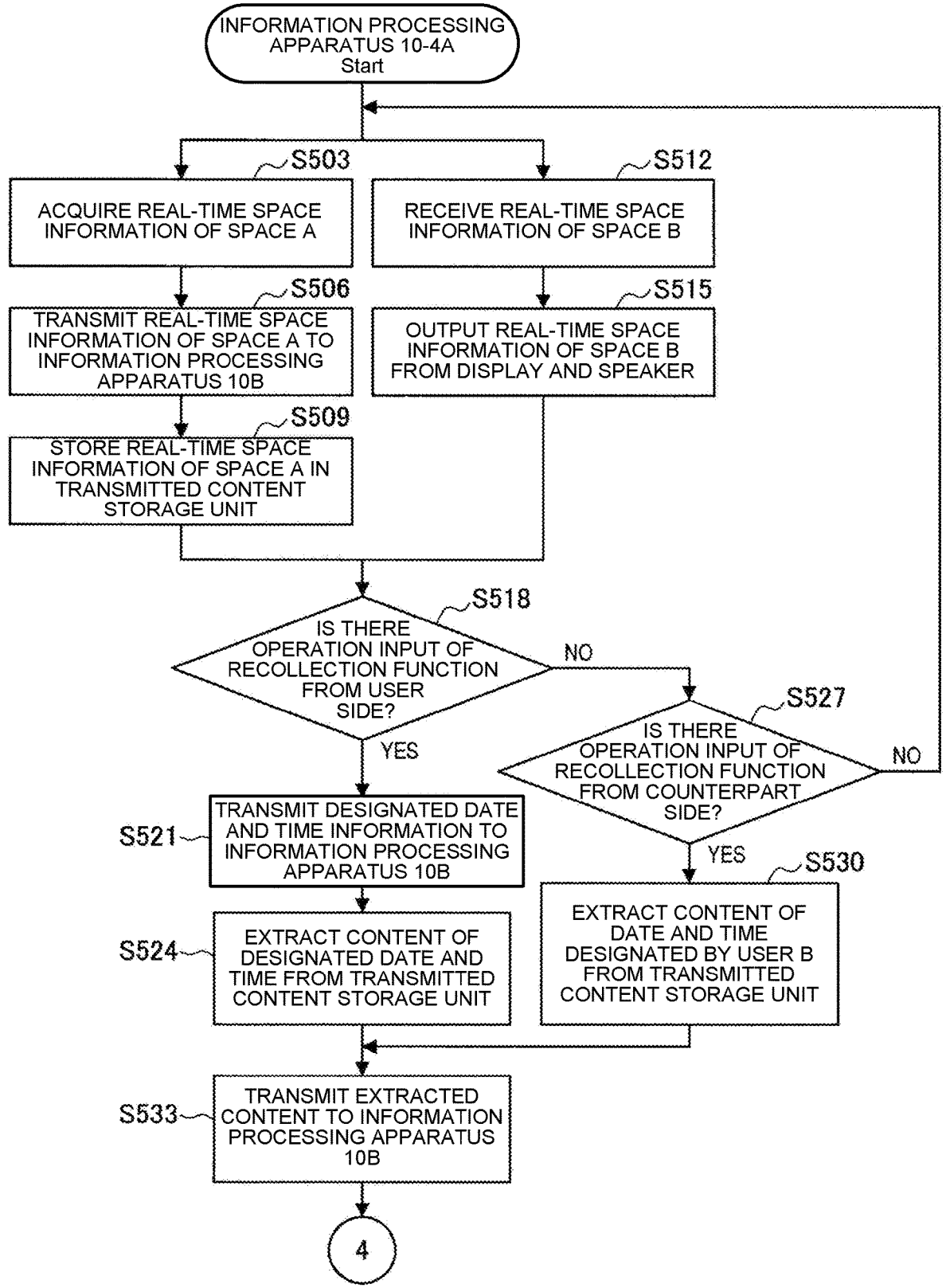
FIG. 31 is a flowchart illustrating operation processing of a first information processing apparatus according to the fourth embodiment of another system configuration example.
Figure 32:
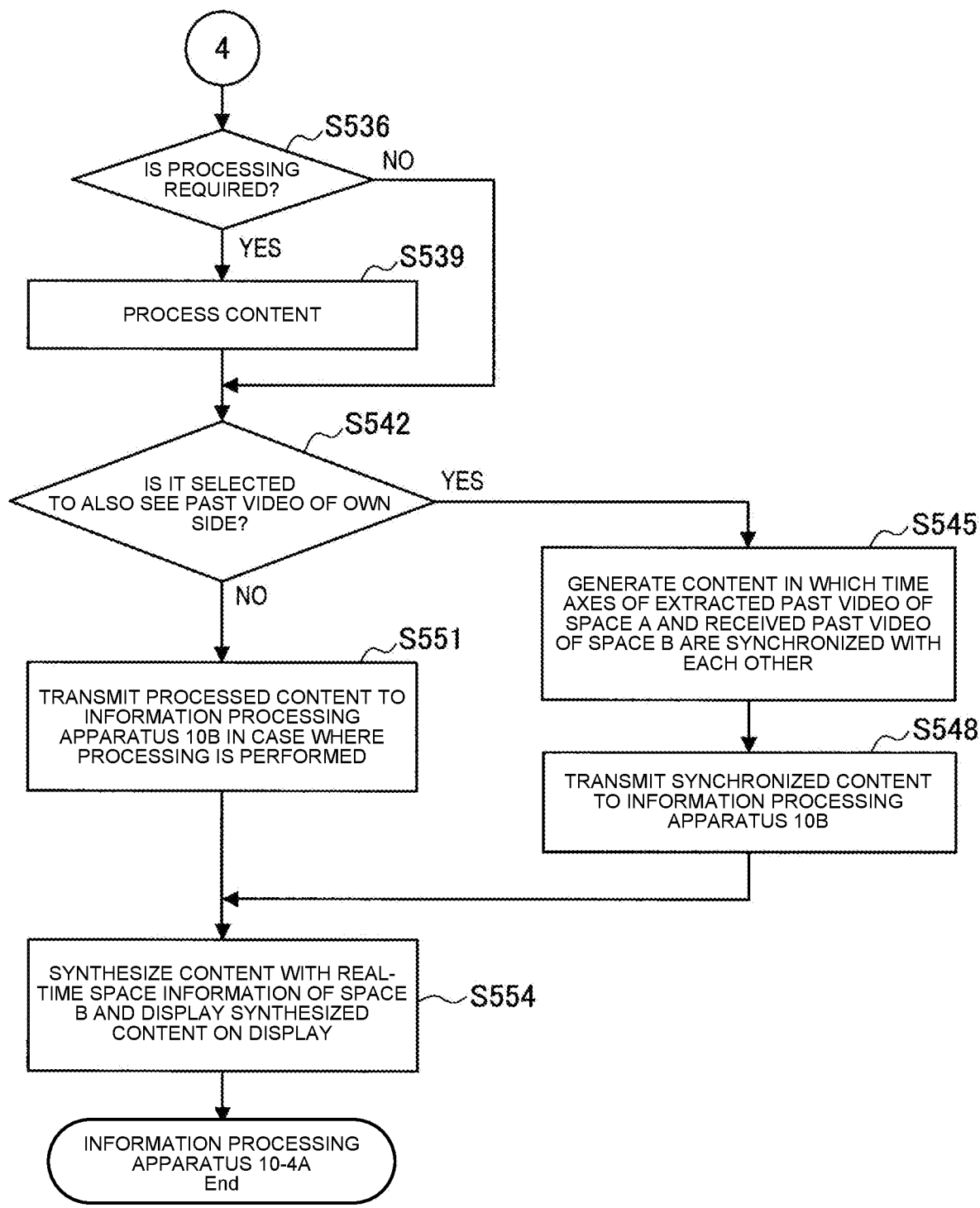
FIG. 32 is a flowchart illustrating operation processing of the first information processing apparatus according to the fourth embodiment of another system configuration example.
Figure 33:
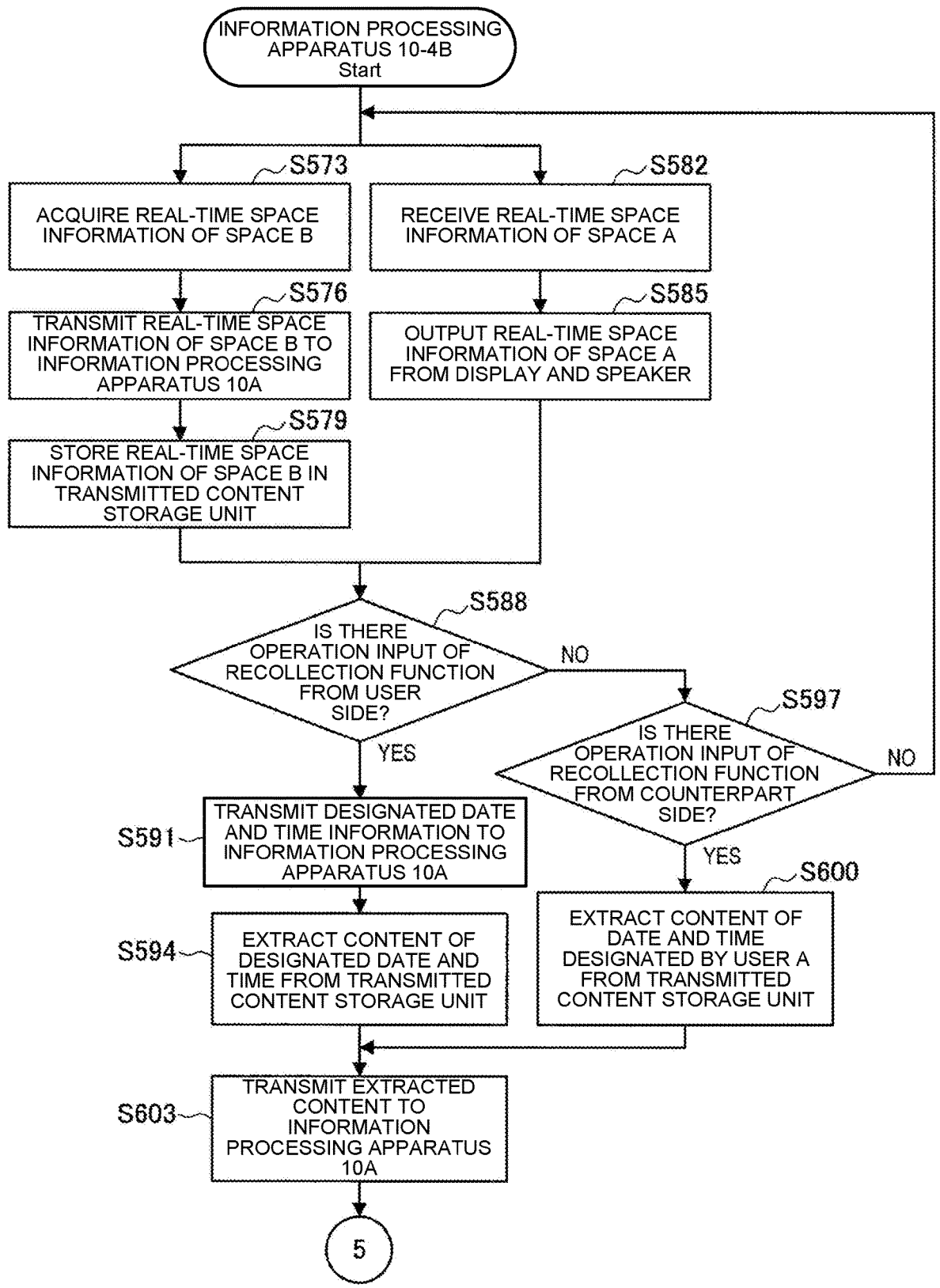
FIG. 33 is a flowchart illustrating operation processing of a second information processing apparatus according to the fourth embodiment of another system configuration example.
Figure 34:
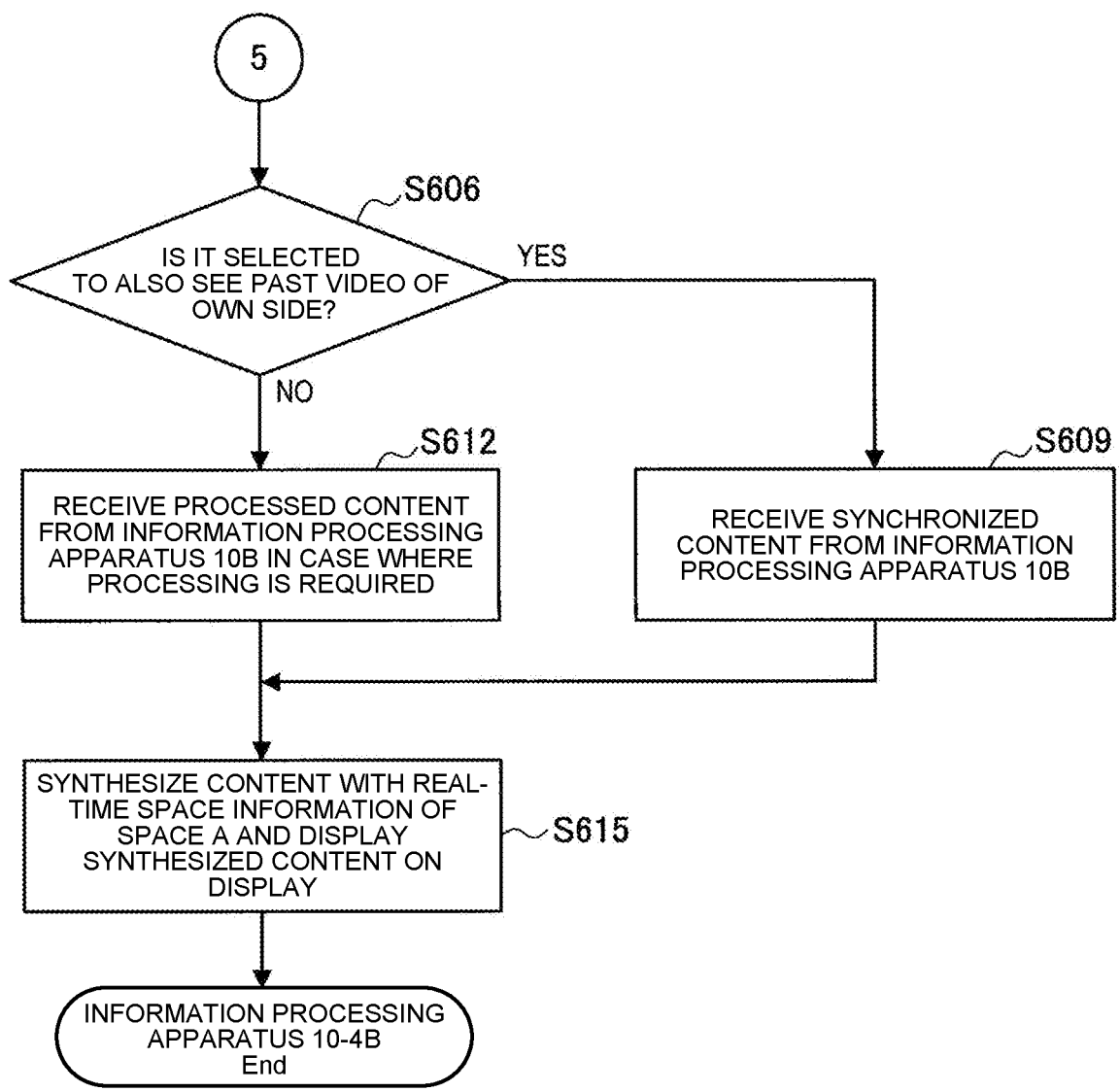
FIG. 34 is a flowchart illustrating operation processing of the second information processing apparatus according to the fourth embodiment of another system configuration example.

Operation processing of the information processing system in a case where one information processing apparatus 10-4A has the content processing function or the content synchronizing function as described above will be described below with reference to FIGS. 31 to 34. FIGS. 31 and 32 are flowcharts illustrating operation processing of the information processing apparatus 10-4A having the content processing function or the content synchronizing function. Further, FIGS. 33 and 34 are flowcharts illustrating operation processing of the information processing apparatus 10-4B that does not have the content processing function or the content synchronizing function. In the following description, the information processing apparatus 10-4B is simply referred to as an information processing apparatus 10B.

(Operation Processing of Information Processing Apparatus 10-4A)

As illustrated in FIG. 31, first, the information processing apparatus 10-4A acquires real-time space information (a video, an audio, and sensor information) of space A (step S503), transmits the real-time space information of space A to the information processing apparatus 10B in space B that is an always connected adjacent space (step S506), and stores the real-time space information transmitted to the information processing apparatus 10B in the transmitted content storage unit 151 (step S509).

Further, the information processing apparatus 10-4A receives real-time space information (a video, an audio, and sensor information) of space B from the information processing apparatus 10B (step S512), and outputs the real-time space information of space B from a display 131A and a speaker of space A (step S515).

The information processing apparatus 10-4A repeats the processing of steps S503 to S515 to realize an always-on connection with space B. Further, similar processing is also performed in the information processing apparatus 10B, such that real-time space information of space A is output from a display 131B and a speaker of space B.

As such, in the information processing apparatus 10-4A according to the fourth embodiment, the content transmitted to the counterpart space, that is, the space information of the space of the own side is stored in the transmitted content storage unit 151, and the content received from the counterpart space is not stored.

Next, in a case where there is an operation input of the recollection function from a user side (step S518: Yes), the information processing apparatus 10-4A transmits designated date and time information to the information processing apparatus 10B (step S521).

Next, the information processing apparatus 10-4A extracts a content (the past video of the space of the own side) of the designated date and time from the transmitted content storage unit 151 (step S524).

On the other hand, in a case where there is no operation input of the recollection function from the user side (step S518: No) and there is an operation input of the recollection function from the counterpart side (step S527: Yes), the information processing apparatus 10-4A extracts a content (the past video of the space of the own side) of a date and time designated by user B (a user of the always connected counterpart space) from the transmitted content storage unit 151 (step S530).

Next, the extracted content (the past video of the space of the own side) is transmitted to the information processing apparatus 10B (step S533). Details are similar to those of step S433 described in the third embodiment.

Next, in a case where processing of the past video is required (step S536: Yes), the information processing apparatus 10-4A processes the content by the content processing unit 104 (step S539).

Next, in a case where it is selected for the user to also see the past video of the own side (step S542: Yes) as a display method of the recollection function, the information processing apparatus 10-4A generates a content (synchronized content) in which time axes of the extracted past video of space A (own side) and the received past video of space B (counterpart side) are synchronized with each other by the content synchronizing unit 105 (step S545).

Next, the information processing apparatus 10-4A transmits a copy of the synchronized content to the information processing apparatus 10B (step S548). In the present embodiment, since the information processing apparatus 10B does not have the content synchronizing function, the synchronized content generated by the information processing apparatus 10A is transmitted.

On the other hand, in a case where it is not selected for the user to also see the past video of the own side (step S542: No), the information processing apparatus 10-4A transmits the processed content to the information processing apparatus 10B (step S551) in a case where the processing is performed. In the present embodiment, since the information processing apparatus 10B does not have the content processing function, the processed content generated by the information processing apparatus 10A is transmitted. Note that in a case where the processing is not performed, similar to the third embodiment, a preparation completion flag may be transmitted and it may be confirmed whether or not the preparation completion flag has been prepared.

Then, the information processing apparatus 10-4A displays the received past video (or the processed content or the synchronized content) of the counterpart space (space B) together with the real-time video of the counterpart space (or in a state of synthesizing the received past video (or the processed content or the synchronized content) of the counterpart space (space B) with the real-time video of the counterpart space) (step S554).

(Operation Processing of Information Processing Apparatus 10-4B)

Next, operation processing of the information processing apparatus 10-4B that does not have the content processing function or the content synchronizing function will be described with reference to FIGS. 33 and 34. Here, the information processing apparatus 10-4A is simply referred to as an information processing apparatus 10A.

As illustrated in FIG. 33, first, the information processing apparatus 10-4B acquires real-time space information (a video, an audio, and sensor information) of space B (step S573), transmits the real-time space information of space B to the information processing apparatus 10A in space A that is an always connected adjacent space (step S576), and stores the real-time space information transmitted to the information processing apparatus 10A in the transmitted content storage unit 151 (step S579).

Further, the information processing apparatus 10-4B receives real-time space information (a video, an audio, and sensor information) of space A from the information processing apparatus 10A (step S582), and outputs the real-time space information of space A from a display 131B and a speaker of space B (step S585).

The information processing apparatus 10-4B repeats the processing of steps S573 to S585 to realize an always-on connection with space A.

As such, in the information processing apparatus 10-4B according to the fourth embodiment, the content transmitted to the counterpart space, that is, the space information of the space of the own side is stored in the transmitted content storage unit 151, and the content received from the counterpart space is not stored.

Next, in a case where there is an operation input of the recollection function from a user side (step S588: Yes), the information processing apparatus 10-4B transmits designated date and time information to the information processing apparatus 10A (step S591).

Next, the information processing apparatus 10-4B extracts a content (the past video of the space of the own side) of the designated date and time from the transmitted content storage unit 151 (step S594).

On the other hand, in a case where there is no operation input of the recollection function from the user side (step S588: No) and there is an operation input of the recollection function from the counterpart side (step S597: Yes), the information processing apparatus 10-4B extracts a content (the past video of the space of the own side) of a date and time designated by user A (a user of the always connected counterpart space) from the transmitted content storage unit 151 (step S600).

Next, the extracted content (the past video of the space of the own side) is transmitted to the information processing apparatus 10A (step S603). Details are similar to those of step S433 described in the fourth embodiment.

Next, in a case where it is selected for the user to also see the past video of the own side (step S606: Yes) as a display method of the recollection function, the information processing apparatus 10-4B receives the synchronized content from the information processing apparatus 10A (step S609).

On the other hand, in a case where it is not selected for the user to also see the past video of the own side (step S606: No), the information processing apparatus 10-4B receives the processed content from the information processing apparatus 10A (step S612) in a case where processing of the past video is required. Note that in a case where the processing is not required, similar to the third embodiment, a preparation completion flag may be transmitted and it may be confirmed whether or not the preparation completion flag has been prepared.

In the present embodiment, since the information processing apparatus 10B does not have the content synchronizing function or the content processing function, in a case where of processing or synchronization is required in a display method of the memory function, the information processing apparatus 10B receives the processed content or the synchronized content generated by the information processing apparatus 10A.

Then, the information processing apparatus 10-4B displays the received past video (or the processed content or the synchronized content) of the counterpart space (space A) together with the real-time video of the counterpart space (or in a state of synthesizing the received past video (or the processed content or the synchronized content) of the counterpart space (space A) with the real-time video of the counterpart space) (step S615).

As described above, also in the fourth embodiment, it is possible to look back on the past two-way communication together while maintaining a state where the counterpart spaces are adjacently connected to each other. Further, since the display of the past videos and the like is performed at a timing when the synchronized content or the processed content is transmitted from the information processing apparatus 10-4A to the information processing apparatus 10-4B or a timing when both of the information processing apparatus 10-4A and the information processing apparatus 10-4B have completed preparation, playing timings of the past videos in each information processing apparatus 10-4 are synchronized with each other, and at the same time, the past videos and the like of the same time zone can be played back, respectively.

5. Hardware Configuration

Figure 35:
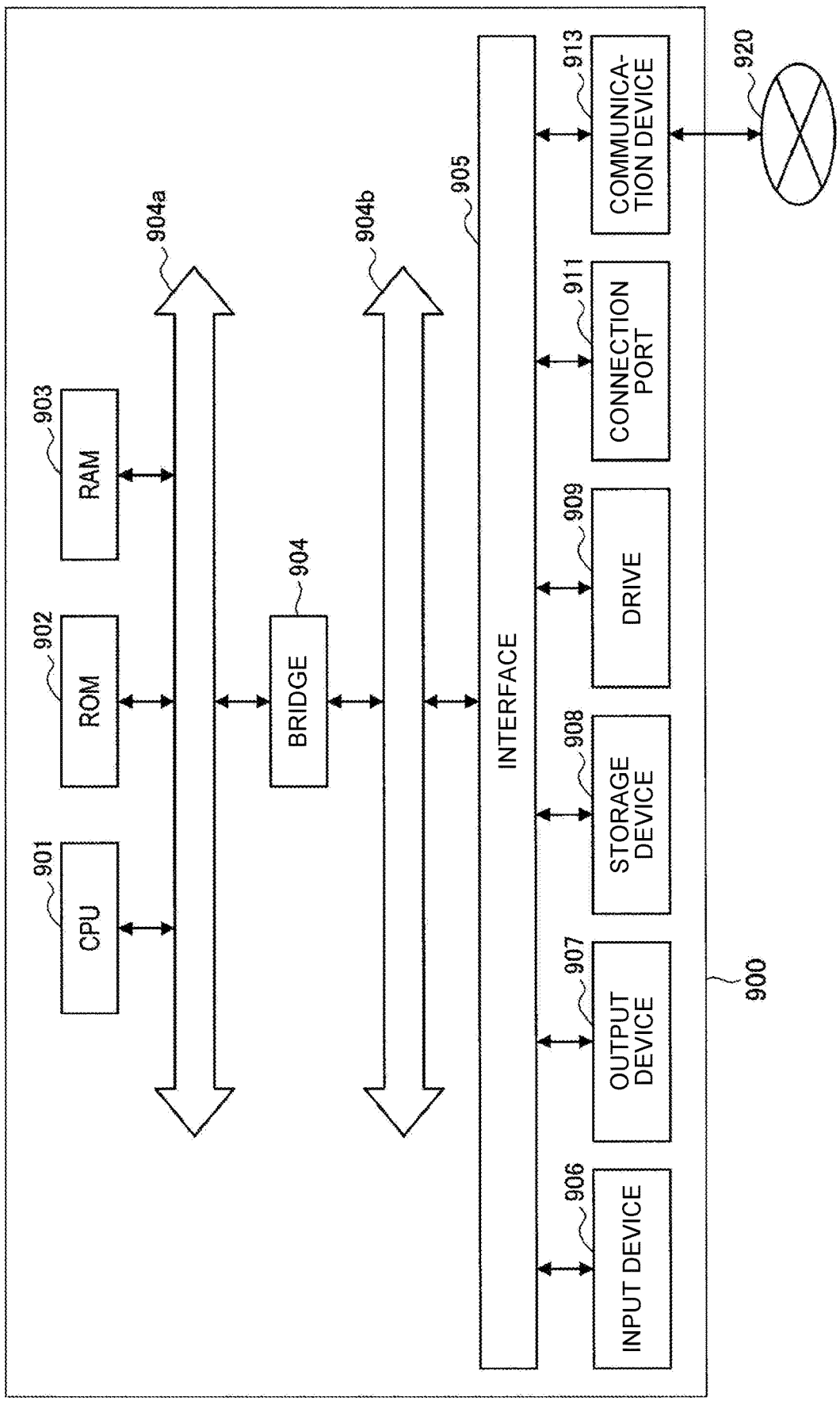
FIG. 35 is a block diagram illustrating an example of a hardware configuration of the information processing apparatus according to the present embodiment.

Finally, a hardware configuration of the information processing apparatus according to the present embodiment will be described with reference to FIG. 35. FIG. 35 is a block diagram illustrating an example of a hardware configuration of the information processing apparatus according to the present embodiment. Note that the information processing apparatus 900 illustrated in FIG. 35 can realize, for example, the information processing apparatus 10 illustrated in FIG. 4, the information processing apparatus 10-1 illustrated in FIG. 21, the information processing apparatus 10-2 illustrated in FIG. 24, the information processing apparatus 10-3 illustrated in FIG. 27, the information processing apparatus 10-4 (10-4A and 10-4B) illustrated in FIG. 30, or the server 20 illustrated in FIG. 17. Information processing by the information processing apparatuses 10 and 10-1 to 10-4 or the server 20 according to the present embodiment is realized by cooperation between software and hardware as described later.

As illustrated in FIG. 9, the information processing apparatus 900 includes a CPU 901, a ROM 902, a RAM 903, and a host bus 904a. Further, the information processing apparatus 900 includes a bridge 904, an external bus 904b, an interface 905, an input device 906, an output device 907, a storage device 908, a drive 909, a connection port 911, and a communication device 913. The information processing apparatus 900 may have a processing circuit such as an electric circuit, a digital signal processor (DSP), an application specific integrated chip (ASIC), or the like, instead of or together with the CPU 901.

The CPU 901 functions as an arithmetic processing device and a control device, and generally controls an operation in the information processing apparatus 900 according to various programs. Further, the CPU 901 may be a microprocessor. The ROM 902 stores programs, operation parameters, or the like used by the CPU 901. The RAM 903 temporarily stores programs used in execution of the CPU 901, parameters appropriately changed in the execution, or the like. The CPU 901 can form, for example, the control unit 100 illustrated in FIG. 4, the control unit 200 illustrated in FIG. 17, the control unit 100-1 illustrated in FIG. 21, the control unit 100-2 illustrated in FIG. 24, the control unit 100-3 illustrated in FIG. 27, or the control unit 100-4 illustrated in FIG. 30.

The CPU 901, the ROM 902, and the RAM 903 are connected to each other by the host bus 904a including a CPU bus or the like. The host bus 904a is connected to the external bus 904b such as a peripheral component interconnect/interface (PCI) bus or the like through the bridge 904. Note that the host bus 904a, the bridge 904, and the external bus 904b do not necessarily need to be separately configured, and functions of the host bus 904a, the bridge 904, and the external bus 904b may be mounted on a single bus.

The input device 906 is realized by, for example, a device such as a mouse, a keyboard, a touch panel, a button, a microphone, a switch, a lever, or the like, to which information is input by a user. Further, the input device 906 may be, for example, a remote control device using infrared rays or other electric waves, or may be an external connection device such as a mobile phone, a personal digital assistants (PDA) or the like corresponding to an operation of the information processing apparatus 900. Moreover, the input device 906 may include, for example, an input control circuit or the like that generates an input signal on the basis of the information input by the user using the input means and outputs the generated input signal to the CPU 901. The user of the information processing apparatus 900 can input various data to the information processing apparatus 900 or instruct the information processing apparatus 900 to perform a processing operation by operating the input device 906.

The output device 907 is a device that can visually or auditorily notify the user of the acquired information. Such a device includes a display device such as a cathode ray tube (CRT) display device, a liquid crystal display device, a plasma display device, an electroluminescence (EL) display device, a laser projector, a light emitting diode (LED) projector, a lamp or the like, an audio output device such as a speaker, a headphone or the like, a printer device, or the like. The output device 907 outputs, for example, results obtained by various processing performed by the information processing apparatus 900. Specifically, the display device visually displays the results obtained by the various processing performed by the information processing apparatus 900 in various formats such as a text, an image, a table, a graph, and the like. On the other hand, the audio output device converts an audio signal including played audio data, acoustic data or the like into an analog signal and auditorily outputs the analog signal.

The storage device 908 is a device for data storage formed as an example of a storage unit of the information processing apparatus 900. The storage device 908 is realized by, for example, a magnetic storage unit device such as a hard disk drive (HDD), a semiconductor storage device, an optical storage device, a magneto-optical storage device, or the like. The storage device 908 may include a storage medium, a recording device recording data in the storage medium, a reading device reading data from the storage medium, a deleting device deleting data recorded in the storage medium, and the like. The storage device 908 stores programs executed by the CPU 901 or various data, various data acquired from the outside, and the like. The storage device 908 can form, for example, the storage unit 150 illustrated in FIG. 4, the storage unit 220 illustrated in FIG. 17, the storage unit 150-1 illustrated in FIG. 21, the storage unit 150-2 illustrated in FIG. 24, the storage unit 150-3 illustrated in FIG. 27, or the storage unit 150-4 illustrated in FIG. 30.

The drive 909 is a reader/writer for the storage medium, and is embedded in or externally mounted on the information processing apparatus 900. The drive 909 reads information recorded in a removable storage medium such as a magnetic disk, an optical disk, a magneto-optical disk, a semiconductor memory, or the like, that is mounted, and outputs the read information to the RAM 903. Further, the drive 909 can write information to the removable storage medium.

The connection port 911 is an interface connected to an external device, and is a connection port to an external device capable of transmitting data by, for example, a universal serial bus (USB), infrared rays, Bluetooth (registered trademark), Wi-Fi (registered trademark), or the like. The connection port 911 can form, for example, the operation I/F 120 illustrated in FIG. 4.

The communication device 913 is, for example, a communication interface including a communication device or the like for being connected to a network 920. The communication device 913 is, for example, a communication card or the like for wired or wireless local area network (LAN), long term evolution (LTE), Bluetooth (registered trademark), or wireless USB (WUSB). Further, the communication device 913 may be a router for optical communication, a router for asymmetric digital subscriber line (ADSL modems for various types of communications, or the like. The communication device 913 can transmit and receive a signal or the like, for example, to or from the Internet or another communication device according to a predetermined protocol such as, for example, transmission control protocol/

Internet protocol (TCP/IP) or the like. The communication device 913 can form, for example, the communication unit 140 illustrated in FIG. 4, FIG. 21, FIG. 24, FIG. 27, or FIG. 30, or the communication unit 210 illustrated in FIG. 17.

Note that the network 920 is a wired or wireless transmission path of information transmitted from a device connected to the network 920. For example, the network 920 may include a public network such as the Internet, a telephone network, a satellite communication network or the like, various local area networks (LANs) including Ethernet (registered trademark), a wide area network (WAN), or the like. Further, the network 920 may include a dedicated line network such as the Internet protocol-virtual private network (IP-VPN) or the like.

An example of the hardware configuration capable of realizing the information processing apparatus 900 according to the present embodiment has been described hereinabove. Each component described above may be realized using a general-purpose member or may be realized by hardware specialized for the function of each component. Therefore, it is possible to appropriately change the hardware configuration to be used according to a technical level at the time of carrying out the present embodiment.

Note that a computer program for realizing each function of the information processing apparatus 900 according to the present embodiment as described above can be created and mounted in a personal computer (PC) or the like. Further, a computer readable recording medium in which such a computer program is stored can be provided. The computer readable recording medium is, for example, a magnetic disk, an optical disk, a magneto-optical disk, a flash memory or the like. Further, the computer program described above may be distributed through, for example, a network without using the computer readable recording medium.

6. Summary

As described above, in the information processing system according to the embodiment of the present disclosure, it is possible to look back on the past two-way communication while maintaining connection between spaces in real time.

Further, by extracting and playing back only the person from the past video, a difference between the present and the past can be felt, and the past can thus be recollected more intuitively. Since the past person is superimposed and displayed on a video of a current space, it is possible to intuitively grasp growth of a child, or the like.

Further, by providing a function of looking back on the past, performance of communication with an always connected counterpart is triggered, such that a communication opportunity is increased.

Hereinabove, the preferred embodiments of the present disclosure have been described in detail with reference to the accompanying drawings, but the present technology is not limited to such embodiments. It will be apparent to those skilled in the art of the present disclosure that various modifications or alterations can be conceived within the scope of the technical idea described in the claims, and it is naturally understood that these modifications or alterations also fall within the technical scope of the present disclosure.

For example, it is also possible to create a computer program for causing hardware such as the CPU, the ROM, the RAM, and the like, embedded in the information processing apparatus 10 or the server 20 described above to exert a function of the information processing apparatus 10 or the server 20. Further, a computer readable recording medium in which the computer program is stored is also provided.

Further, the effects described in the present specification are only illustrative or exemplary rather than being restrictive. That is, the technology according to the present disclosure can accomplish other effects apparent to those skilled in the art from the description of the present specification, in addition to or instead of the effects described above.

Note that the present technology can also have the following configuration.

(1)

An information processing apparatus that controls two-way communication between a first space and a second space, comprising:

a control unit that performs control to display first image information and second image information in the first space and performs control to display third image information and fourth image information in the second space, wherein the first image information is current image information regarding the second space, the second image information is past image information regarding the second space, the third image information is current image information regarding the first space, and the fourth image information is past image information regarding the first space in the same time zone as that of the second image information.

(2)

An information processing apparatus in which control of two-way communication between a first space and a second space is performed, comprising:

a control unit that performs control to display first image information and second image information in the first space, wherein the first image information is current image information regarding the second space, and the second image information is past image information regarding the second space and is image information of the same time zone as that of past image information regarding the first space displayed in the second space.

(3)

The information processing apparatus according to (2), wherein the control unit performs control to display the second image information on a virtual space provided in front of the first image information.

(4)

The information processing apparatus according to (2) or (3), wherein the control unit performs control to display a content in which the past image information regarding the first space and the second image information are synchronized with each other on a time axis, together with the first image information.

(5)

The information processing apparatus according to any one of (2) to (4), wherein the control unit performs control to superimpose and display a content processed based on the second image information, on the first image information.

(6)

The information processing apparatus according to (5), wherein the processed content is a processed image of a person extracted from the second image information.

(7)

The information processing apparatus according to (6), wherein the control unit controls a position at which the processed image of the extracted person is superimposed and displayed on the first image information based on depth information of the person.

(8)

The information processing apparatus according to (6) or (7), wherein the processed image of the person is a silhouette image of the extracted person.

(9)

The information processing apparatus according to (6), wherein the processed image of the person is a 3D modeled image of the extracted person, and is displayed on a virtual space provided in front of the first image information in a display unit of the first space.

(10)

An information processing method that controls two-way communication between a first space and a second space, comprising:

performing control to display first image information and second image information in the first space and performing control to display third image information and fourth image information in the second space, by a processor, wherein the first image information is current image information regarding the second space, the second image information is past image information regarding the second space, the third image information is current image information regarding the first space, and the fourth image information is past image information regarding the first space in the same time zone as that of the second image information.

(11)

A program that causes a computer to function as an information processing apparatus that controls two-way communication between a first space and a second space, wherein the program causes the computer to further function as a control unit that performs control to display first image information and second image information in the first space and performs control to display third image information and fourth image information in the second space, the first image information being current image information regarding the second space, the second image information being past image information regarding the second space, the third image information being current image information regarding the first space, and the fourth image information being past image information regarding the first space in the same time zone as that of the second image information.

(12)

An information processing method in which control of two-way communication between a first space and a second space is performed, comprising:

performing control to display first image information and second image information in the first space, by a processor, wherein the first image information is current image information regarding the second space, and the second image information is past image information regarding the second space and is image information of the same time zone as that of past image information regarding the first space displayed in the second space.

(13)

A program that causes a computer to function as an information processing apparatus in which control of two-way communication between a first space and a second space is performed and causes the computer to further function as a control unit that performs control to display first image information and second image information in the first space, wherein the first image information is current image information regarding the second space, and the second image information is past image information regarding the second space and is image information of the same time zone as that of past image information regarding the first space displayed in the second space.

REFERENCE SIGNS LIST

1 INFORMATION PROCESSING SYSTEM
10(10A, 10B), 10-1 to 10-4 INFORMATION PROCESSING APPARATUS
20 SERVER
30 NETWORK
100 CONTROL UNIT
101 FUNCTION SELECTING UNIT
102 IMAGE SYNTHESIZING UNIT
103 OUTPUT CONTROL UNIT
104 CONTENT PROCESSING UNIT
105 CONTENT SYNCHRONIZING UNIT
110 INPUT UNIT
120 OPERATION I/F
130 OUTPUT UNIT
131 DISPLAY
140 COMMUNICATION UNIT
150 STORAGE UNIT
151 TRANSMITTED CONTENT STORAGE UNIT
152 RECEIVED CONTENT STORAGE UNIT
200 CONTROL UNIT
201 CONTENT PROCESSING UNIT
202 CONTENT SYNCHRONIZING UNIT
210 COMMUNICATION UNIT
220 CONTENT STORAGE UNIT

The invention claimed is:

1. An information processing apparatus configured to control two-way communication between a first space and a second space, comprising:

a control unit configured to
perform control to display first image information and second image information in the first space, and
perform control to display third image information and fourth image information in the second space,
wherein the first image information includes current image information regarding the second space,
wherein the second image information includes past image information regarding the second space captured during a selected time zone,
wherein the third image information includes current image information regarding the first space,
wherein the fourth image information includes past image information regarding the first space captured during the selected time zone, and
wherein the control unit is implemented via at least one processor.

2. An information processing apparatus in which control of two-way communication between a first space and a second space is performed, comprising:

a control unit configured to perform control to display first image information and second image information in the first space, wherein the first image information includes current image information regarding the second space, wherein the second image information includes past image information regarding the second space captured during a selected time zone, wherein the selected time zone is a same time zone as that of past image information regarding the first space displayed in the second space, and wherein the control unit is implemented via at least one processor.

3. The information processing apparatus according to claim 2, wherein the control unit performs control to display the second image information on a virtual space provided in front of the first image information.

4. The information processing apparatus according to claim 2, wherein the control unit performs control to display a content in which the past image information regarding the first space and the second image information are synchronized with each other on a time axis, together with the first image information.

5. The information processing apparatus according to claim 2, wherein the control unit performs control to superimpose and display a content processed based on the second image information, on the first image information.

6. The information processing apparatus according to claim 5, wherein the processed content is a processed image of a person extracted from the second image information.

7. The information processing apparatus according to claim 6, wherein the control unit controls a position at which the processed image of the extracted person is superimposed and displayed on the first image information based on depth information of the person.

8. The information processing apparatus according to claim 6, wherein the processed image of the person is a silhouette image of the extracted person.

9. The information processing apparatus according to claim 6, wherein the processed image of the person is a 3D modeled image of the extracted person, and is displayed on a virtual space provided in front of the first image information in a display unit of the first space.

10. An information processing method that controls two-way communication between a first space and a second space, the method comprising:

displaying first image information and second image information in the first space; and displaying third image information and fourth image information in the second space, by a processor, wherein the first image information includes current image information regarding the second space, wherein the second image information includes past image information regarding the second space captured during a selected time zone, wherein the third image information includes current image information regarding the first space, and wherein the fourth image information includes past image information regarding the first space captured during the selected time zone.

11. A non-transitory computer-readable storage medium having embodied thereon a program, which when executed by a computer causes the computer to execute a method, the method comprising:

controlling two-way communication between a first space and a second space;

displaying first image information and second image information in the first space; and displaying third image information and fourth image information in the second space, wherein the first image information includes current image information regarding the second space, wherein the second image information includes past image information regarding the second space captured during a selected time zone, wherein the third image information includes current image information regarding the first space, and wherein the fourth image information includes past image information regarding the first space captured during the selected time zone.

12. An information processing method in which control of two-way communication between a first space and a second space is performed, the method comprising:

performing control to display first image information and second image information in the first space, by a processor, wherein the first image information includes current image information regarding the second space, and wherein the second image information includes past image information regarding the second space captured during a selected time zone, and wherein the selected time zone is a same time zone as that of past image information regarding the first space displayed in the second space.

13. A non-transitory computer-readable storage medium having embodied thereon a program, which when executed by a computer causes the computer to execute a method, the method comprising:

performing control of two-way communication between a first space and a second space; and performing control to display first image information and second image information in the first space, wherein the first image information is current image information regarding the second space, and wherein the second image information includes past image information regarding the second space captured during a selected time zone, and wherein the selected time zone is a same time zone as that of past image information regarding the first space displayed in the second space.

* * * * *